US011600027B2

(12) United States Patent
Sobolev et al.

(10) Patent No.: US 11,600,027 B2
(45) Date of Patent: Mar. 7, 2023

(54) AUGMENTED REALITY SYSTEM AND METHOD FOR SUBSTRATES, COATED ARTICLES, INSULATING GLASS UNITS, AND/OR THE LIKE

(71) Applicant: GUARDIAN GLASS, LLC, Auburn Hills, MI (US)

(72) Inventors: Alexander Sobolev, Auburn Hills, MI (US); Vijayen S. Veerasamy, Ann Arbor, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 0 days.

(21) Appl. No.: 16/583,881

(22) Filed: Sep. 26, 2019

(65) Prior Publication Data
US 2020/0098150 A1  Mar. 26, 2020

Related U.S. Application Data

(60) Provisional application No. 62/736,538, filed on Sep. 26, 2018.

(51) Int. Cl.
*G06T 11/00* (2006.01)
*G06F 3/0482* (2013.01)
*G06F 3/04847* (2022.01)

(52) U.S. Cl.
CPC .......... *G06T 11/001* (2013.01); *G06F 3/0482* (2013.01); *G06F 3/04847* (2013.01); *G06T 2200/24* (2013.01)

(58) Field of Classification Search
None
See application file for complete search history.

(56) References Cited

U.S. PATENT DOCUMENTS 8,046,719 B2   10/2011   Skourup et al.
9,483,143 B2   11/2016   Malkin et al.
(Continued)

FOREIGN PATENT DOCUMENTS

RU   2015127905 A   1/2017

OTHER PUBLICATIONS

Radikovic (A True Virtual Window, 2004) (Year: 2004).*
(Continued)

*Primary Examiner* — Kyle Zhai

(57) ABSTRACT

Certain example embodiments relate to an electronic device, including a user interface, and processing resources including at least one processor and a memory. The memory stores a program executable by the processing resources to simulate a view of an image through at least one viewer-selected product that is virtually interposed between a viewer using the electronic device and the image by performing functionality including: acquiring the image; facilitating viewer selection of the at least one product in connection with the user interface; retrieving display properties associated with the at least one viewer-selected product; generating, for each said viewer-selected product, a filter to be applied to the acquired image based on retrieved display properties; and generating, for display via the electronic device, an output image corresponding to the generated filter(s) being applied to the acquired image. The electronic device in certain example embodiments may be a smartphone, tablet, and/or the like.

29 Claims, 58 Drawing Sheets

(56) References Cited

U.S. PATENT DOCUMENTS

| | | | |
|---|---|---|---|
| 9,586,141 | B2 | 3/2017 | Hardy et al. |
| 10,217,242 | B1* | 2/2019 | Pytel ................. G06T 11/60 |
| 2012/0054337 | A1 | 3/2012 | Moritz et al. |
| 2012/0105487 | A1 | 5/2012 | Son et al. |
| 2012/0249587 | A1 | 10/2012 | Anderson et al. |
| 2013/0267295 | A1 | 10/2013 | Frabbiele et al. |
| 2014/0043321 | A1* | 2/2014 | Matjasko ............... G06T 15/00 345/419 |
| 2014/0118255 | A1 | 5/2014 | Billerbeck |
| 2014/0267177 | A1 | 9/2014 | Bathiche et al. |
| 2014/0300634 | A1 | 10/2014 | Cho et al. |
| 2015/0049304 | A1 | 2/2015 | Cussac |
| 2015/0054850 | A1 | 2/2015 | Tanaka |
| 2015/0085076 | A1* | 3/2015 | Lockhart ............. H04N 13/376 348/46 |
| 2015/0317956 | A1 | 11/2015 | Lection et al. |
| 2016/0366344 | A1* | 12/2016 | Pan .................. H04N 5/232945 |
| 2017/0249745 | A1 | 8/2017 | Fiala |
| 2017/0285737 | A1 | 10/2017 | Khalid et al. |
| 2020/0258278 | A1* | 8/2020 | Mirhosseini ............ G06F 3/011 |

OTHER PUBLICATIONS

International Search Report and Written Opinion for International Application No. PCT/IB2019/058191, dated Mar. 2, 2020, pp. 14.

"Developing a RAW photo file 'by hand'—Part 1", accessed at https://web.archive.org/web/20190807150047/http://www.odelama.com/photo/Developing-a-RAW-Photo-by-hand/, last edited on May 3, 2018, pp. 29.

"Developing a RAW photo file 'by hand'—Part 2", accessed at http://www.odelama.com/photo/Developing-a-RAW-Photo-by-hand/Developing-a-RAW-Photo-by-hand_Part-2/, last edited on Apr. 1, 2015, pp. 27.

Abeln, M.S., "White Balance, Part 2: The Gray World Assumption and the Retinex Theory", accessed at http://therefractedlight.blogspot.com/2011/09/white-balance-part-2-gray-world.html, Sep. 15, 2011, pp. 20.

Borg, I., "Color is a Slippery Trickster", accessed at https://www.rawdigger.com/howtouse/color-is-a-slippery-trickster, Feb. 27, 2017, pp. 17.

"Digital photography", accessed at https://web.archive.org/web/20190902234800/https://en.wikipedia.org/wiki/Color_temperature#Digital_photography, last modified on Aug. 21, 2019, pp. 16.

"Color balance", accessed at https://web.archive.org/web/20190924054536/https://en.wikipedia.org/wiki/Color_balance, last edited on Sep. 16, 2019, pp. 6.

"White point", accessed at https://web.archive.org/web/20190620123436/https://en.wikipedia.org/wiki/White_point, last edited on Jun. 1, 2019, pp. 2.

"Image Processing Toolbox", accessed at https://www.mathworks.com/help/images/examples/comparison-of-autowhite-balance-algorithms.html, accessed on Mar. 19, 2020, pp. 2.

Fraser, B., "Understanding Digital Raw Capture", accessed at https://web.archive.org/web/20190804104559/https://www.adobe.com/digitalimag/pdfs/understanding_digitalrawcapture.pdf, retrieval date Aug. 4, 2019, pp. 4.

"Relative luminance", accessed at https://web.archive.org/web/20190810121458/https://en.wikipedia.org/wiki/Relative_luminance, last modified on Apr. 7, 2019, pp. 2.

"CIE 1931 colorspace", accessed at https://web.archive.org/web/20190925182712/https://en.wikipedia.org/wiki/CIE_1931_color_space, last edited on Sep. 16, 2019, pp. 12.

Bourke, P., "Fisheye lens correction", accessed at https://web.archive.org/web/20190428063237/http://paulbourke.net/dome/fisheyecorrect/, Nov. 2016, pp. 17.

International Preliminary Report on Patentability and Written Opinion dated Mar. 23, 2021 in International Application No. PCT/IB2019/058191, 9 pages.

J.B. Haurum et al., "Pixel Reprojection of 360 Degree Renderings for Small Parallax Effects," Jun. 2017, pp. 253-262.

Che-Hao Hsu et al., "A Mixed-Reality Showcase for Multiple Users from Unconstrained Viewing Angles," SIGGRAPH Asia, Nov. 2013, 2 pages.

Office Action and Search Report received for RU application No. 2021109521, dated Apr. 4, 2022, 15 pages. (7 pages of English translation and 8 pages of Official copy).

* cited by examiner

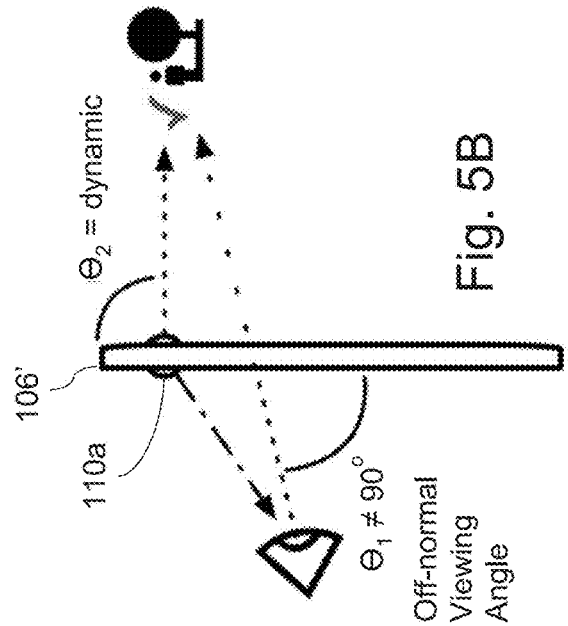
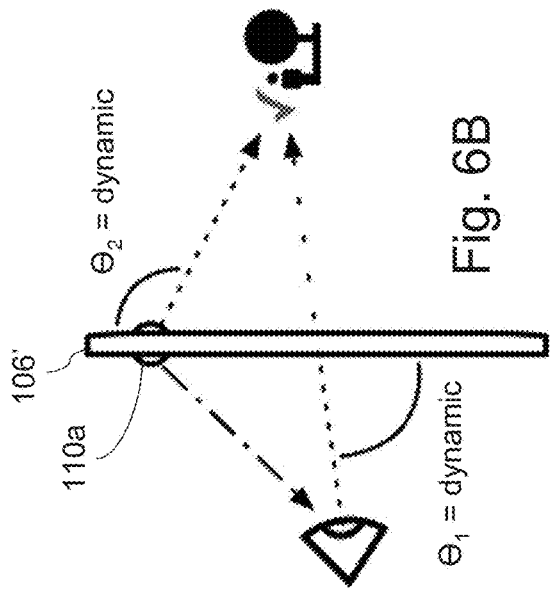
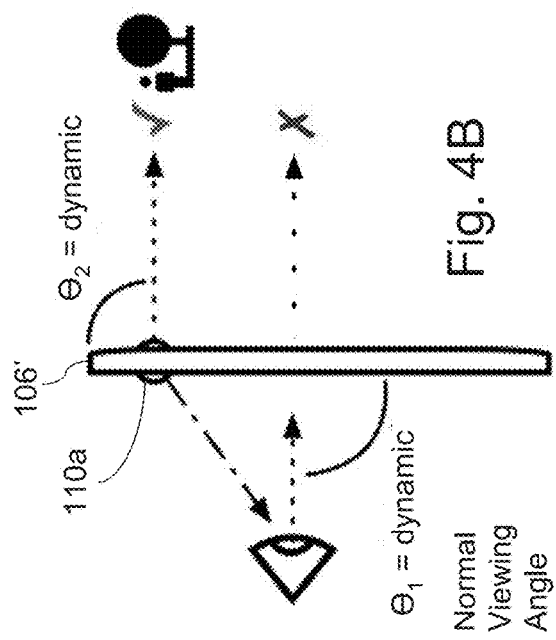

Choose a Float Glass

Substrate

Guardian offers a variety of float glass to expand your design possibilities.

| CrystalBlue | Clear | UltraClear | CrystalGray | Gray | Green |

Choose a SunGuard Coating

SuperNeutral Low-E

SuperNeutral products deliver high light transmittance while reducing solar heat gain. Their neutral appearance is the most similar to clear uncoated glass.

| SuperNeutral 68 | SuperNeutral 54 | SNX 62/27 | SNX 51/23 | SNR 43 |

High Performance Low-E

High Performance products offer a variety of appearances combining medium to high visible light transmission with low solar heat gain.

| Neutral 78/65 | Neutral 61 (discontinued) | Neutral 50 | Neutral 40 | AG 50 | AG 43 |

Fig. 13P

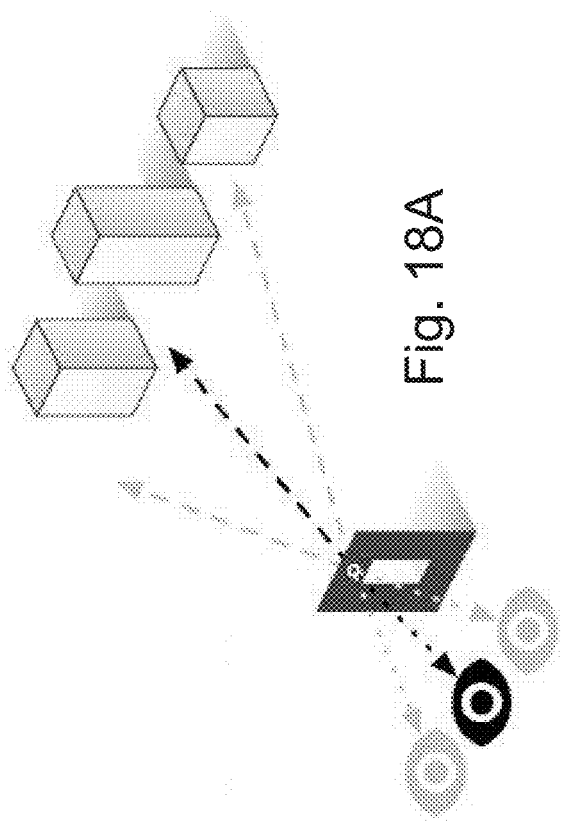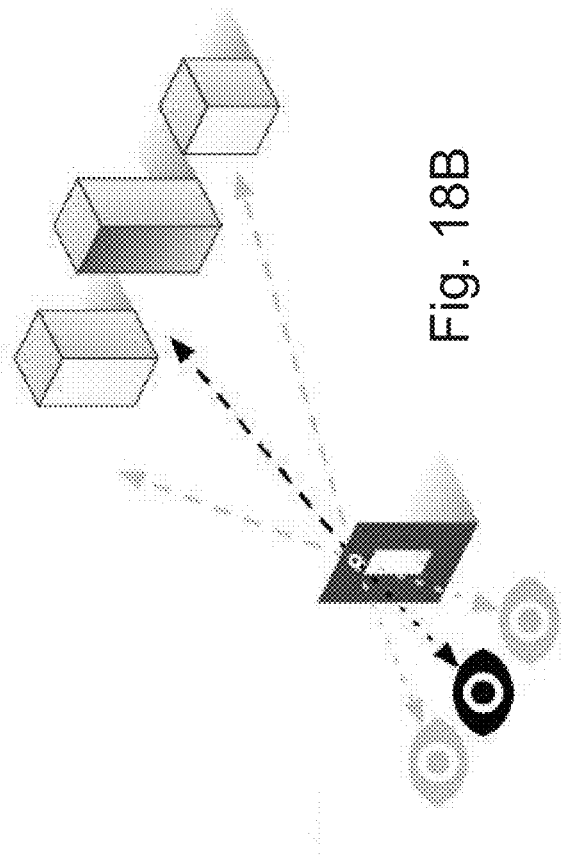

AUGMENTED REALITY SYSTEM AND METHOD FOR SUBSTRATES, COATED ARTICLES, INSULATING GLASS UNITS, AND/OR THE LIKE

This application claims priority to U.S. Application Ser. No. 62/736,538 filed on Sep. 26, 2018, the entire contents of which are hereby incorporated herein by reference.

TECHNICAL FIELD

Certain example embodiments of this invention relate to augmented reality systems and methods for substrates, coated articles, insulating glass units, and/or the like.

BACKGROUND AND SUMMARY

Glass has long been incorporated into buildings and other structures for aesthetic purposes. For example, design architects designing buildings oftentimes will desire a particular coloration, amount of visible light transmission, amount of visible light reflection, and/or other aesthetic properties for a given project, e.g., to enhance its aesthetic appeal, set it apart from other projects, comport with a particular "neighborhood feel," etc.

Glass exhibits multiple effects, many of which are subtle. Yet even subtle effects can have a profound impact on aesthetics if magnified over a broad area as in the case of, for example, an office building with many stories. Although more easily perceivable aspects such as stated coloration can at some level be grasped by design architects, it oftentimes is difficult to gauge how minor changes in transmission and/or reflection might affect a project. Of course, even with a property as seemingly simple as coloration, there are many fine gradations that may not be readily appreciated.

Moreover, "off-axis" properties related to transmission, reflection, coloration, haze, and the like, also can have a profound impact on the overall aesthetics of a project. In other words, although properties such as coloration, transmission, and reflection typically are reported as nominal values, such nominal values generally assume an orthogonal viewpoint and thus do not fully and accurately reflect how a façade (for example) might be perceived when viewed at an angle, or how the outside of a building might be viewed when standing or looking at an angle.

To help combat these issues, design architects may have on-hand a collection of sample products. Additionally, some architects order sample products that are built to their specifications. Unfortunately, however, it oftentimes is difficult to maintain a large collection of samples. For example, such collections can become outdated fairly quickly, e.g., as technology related to functional coatings (e.g., low-emissivity, antireflection, and/or other coatings) continues to advance, as building certifications and standards change, etc. The storage requirements for a meaningful collection of samples also may be problematic.

When it comes to ordering sample products, and even those that are built to precise specifications, there is unfortunate waste created. It also has been found that there oftentimes is a large divergence between what a design architect thinks is being ordered and what actually is being delivered. It has been observed that this discrepancy has led to increasing frustration on the part of architects in terms of the sample delivery and disposal approach. It also has been observed that architecture firms across the board are moving to eliminate their sample libraries.

The assignee of the instant application has developed a "glass calculator" that provides precise optical information for a range of configurable products. This glass calculator allows users to specify types of glass, glass thicknesses, coatings, coating locations, spacer configurations for insulating glass (IG) units, etc. Once specified, the glass calculator generates and displays detailed information about the optical properties expected for the custom configuration. The glass calculator has proven to be a valuable tool for glass fabricators. Unfortunately, however, design architects may not be able to fully understand the detailed output of the glass calculator. Moreover, in the design realm, "seeing is believing"—and the calculator cannot take the place of actual samples in this respect. And because the glass calculator was created with fabricators in mind, it is not easy or intuitive for design architects to quickly solve design challenges in a format and "language" that is meaningful to them.

Thus, it will be appreciated that there is a need in the art for tools designed to help design architects visualize the performance of windows, including when standing "outside" the window and "looking in," and when standing "inside" the window and "looking out."

Certain example embodiments help address these and/or other concerns. For instance, certain example embodiments apply augmented reality (AR) techniques so that an electronic device can be used as if it were a window. In certain example embodiments, the user can select aspects of the window. The user uses the device to "frame" an object or objects, e.g., by placing the device between the user and the object or objects and looking "through" the device (using cameras, displays, and/or other hardware elements of and/or coupled to the device) as if the device were a frame for the object or objects. "Framing" in certain example embodiments involves image processing based on a determination of the orientation of the user's gaze relative to the device and an object. One or more cameras (e.g., a 360 degree camera, two 180 degree cameras, and/or the like) are used to help determine where a human user is looking and what a human user is looking at, e.g., using face and/or eye-tracking algorithms. Once determined, the object(s) being imaged is/are displayed on a display, with a custom filter being applied thereon to simulate the effects of the window. The filter is custom-generated in some instances based on specifications related to the selected aspects of the window, as well as the user's position and/or orientation relative to the virtual window (and may in some instances be driven by or at least involve spectrum data).

It is noted that the use of two-sided fish eye cameras on mobile devices in general is rare, and that certain example embodiments make use of this rare arrangement. For instance, certain example embodiments isolate processing of the transmitted image of a glass sample through a filter that is applied only to the target-facing camera (or camera view), and likewise isolate processing of the reflected properties related to the image from the user-facing camera (or camera view).

Certain example embodiments relate to an electronic device, comprising a user interface, and processing resources including at least one processor and a memory. The memory stores a program executable by the processing resources to simulate a view of an image through at least one viewer-selected product that is virtually interposed between a viewer using the electronic device and the image by performing functionality comprising: acquiring the image; facilitating viewer selection of the at least one product in connection with the user interface; retrieving display properties associated with the at least one viewer-selected product; generating, for each said viewer-selected product, a filter to be applied to the acquired image based on retrieved display properties; and generating, for display via the electronic device, an output image corresponding to the generated filter(s) being applied to the acquired image. The electronic device in certain example embodiments may be a smartphone, tablet, and/or the like.

Certain example embodiments relate to methods of using the electronic device described herein. Similarly, certain example embodiments relate to non-transitory computer readable storage media tangibly storing a program that, when executed by a processor of a computing device, performs such methods. Still other example embodiments relate to the program per se.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 4B shows the user-facing camera identifying the user's perspective given the FIG. 4A setup, e.g., as represented by the dash-dot line, in accordance with certain example embodiments;

FIG. 5B shows the user-facing camera identifying the user's perspective given the FIG. 5A setup, e.g., as represented by the dash-dot line, in accordance with certain example embodiments;

FIG. 6B shows the user-facing camera identifying the user's perspective given the FIG. 6A setup, e.g., as represented by the dash-dot line, in accordance with certain example embodiments;

FIGS. 18A-18B provide a description of how visual information can be overlaid on a perspective-dependent scene, in certain example embodiments;

DETAILED DESCRIPTION

Certain example embodiments of this invention relate to augmented reality (AR) systems and methods for substrates, coated articles, insulating glass units, and/or the like. For instance, certain example embodiments may be used to simulate the performance of glass simulation including, for example, reflection, transmission, coloration, haze, and/or the like. In certain example embodiments, streaming composite images that replicate the unique optical characteristics of windows (e.g., uncoated substrates, coated articles such as float glass supporting sputtered and/or other coatings, insulating glass (IG) units, etc.). Such renderings may be created in real-time, e.g., in dependence on the user's perspective (including position and/or orientation), as well as the user's surroundings. This approach may create an experience that is similar to the user holding a "real" window or piece of glass. Certain example embodiments enable an earlier-photographed scene to be selected, e.g., enabling the technology disclosed herein to be used to showcase (for example) how the glass looks in locations that are different from the user's current location. Motion in this predetermined scene can be driven by the same face-tracking system disclosed herein; using gyroscopes, accelerometers, and/or other inertial sensors of and/or coupled to the device; and/or the like.

Figure 1:
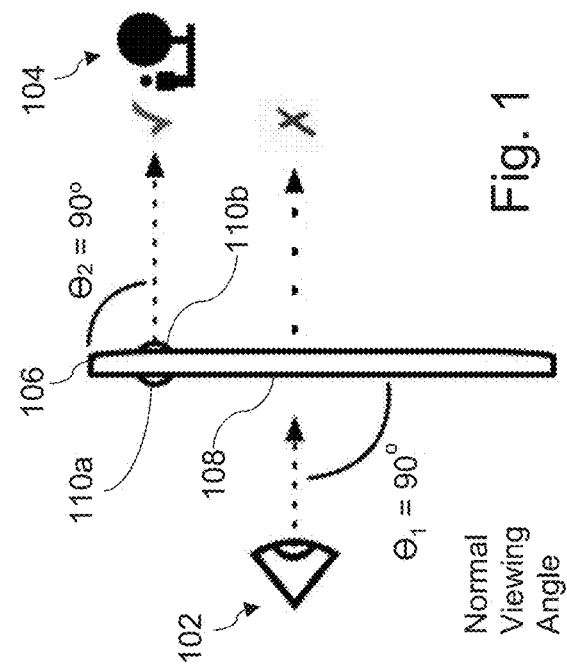
FIG. 1 shows a user viewing a real-world scene using an electronic computing device, in a case where the user and the scene both are orthogonal to the device.

Referring now more particularly to the drawings, FIG. 1 shows a user 102 viewing a real-world scene of interest 104 using an electronic computing device 106. The electronic device 106 includes a front-facing display 108, together with forward (user-facing) and rearward (target-facing) cameras 110*a* and 110*b*. Here and in the examples that follow, "front" refers to the "user-facing" side of the device on which the display is located and/or with which the user interacts. As is standard in many devices (including, for example, laptop computers, smart devices such as mobile phones and tablet computers, etc.), the forward (user-facing) and rearward (target-facing) cameras 110*a* and 110*b* are fixed in position and generally have focuses that extend orthogonally outwardly from the device's display 108. This common arrangement provides a natural viewing experience when both the user 102 and the scene of interest 104 are orthogonal to the device, which is the case in FIG. 1, as denoted with angles $\theta_1$ and $\theta_2$ both equaling 90 degrees. FIG. 1 indicates that there is some displacement between the perspective of the user and the perspective of the target-facing camera 110*b*.

Figure 2:
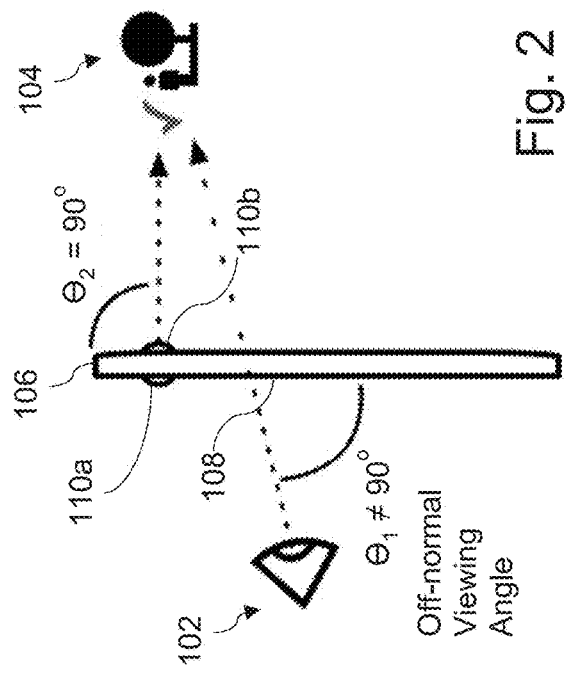
FIG. 2 is similar to FIG. 1 but shows the user taking an off-normal viewing angle relative to the display of the electronic device, while the device's camera remains at a normal view to an object.

FIG. 2 is similar to FIG. 1 but shows the user taking an off-normal viewing angle relative to the display 108 of the electronic device 106. FIG. 2 thus also demonstrates that the perspective of the cameras 110*a* and 110*b* of the electronic device 106 are independent from the perspective of the user 102 and of the scene 104. When the user 102 aligns the user's gaze with the scene 104 as if looking through the device 106 at the scene 104, and aligns the target-facing camera 110*b* with the scene 104, the user's gaze is no longer orthogonal to the device. This is reflected in $\theta_1$ not equaling 90 degrees. In this situation, the scene 104 can still be perceived by the user 102 via the display 108 because the there is an alignment with the target-facing camera 110*b* and the scene 104. In these situations, even though the display 108 may output an image of the scene 104, it may be "distorted" because of the off-normal viewing angle taken by the user 102 (e.g., in the sense that the image on the display will not overlay or correlate with the view of the scene from the user). For many applications, such as casual picture taking for example, this is not seen as problematic, even though the image is not precisely "true" to what is being or could be viewed from a more idealized perspective. The prior illustrations help reinforce this point.

Figure 3:
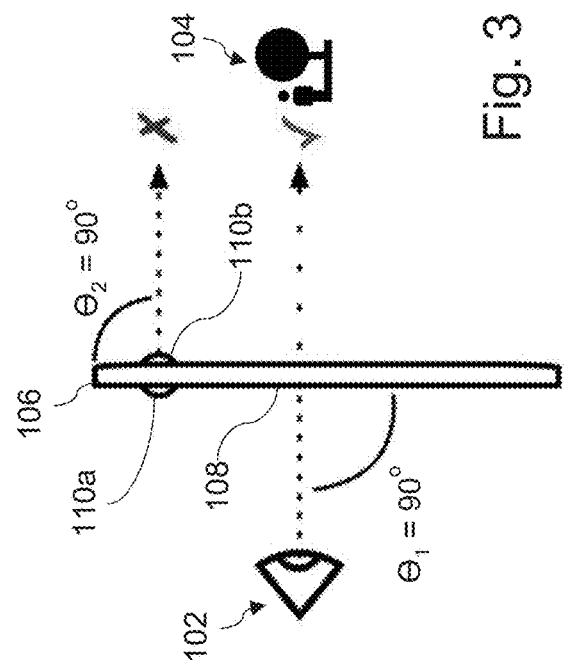
FIG. 3 also is similar to FIG. 1 but shows how a problem can occur when the user's gaze is aligned with the scene of interest but the target-facing camera is not.

FIG. 3 also is similar to FIG. 1 but shows how a problem can occur when the user's gaze is aligned with the scene of interest 104 but the target-facing camera 110*b* is not. It is noted the user has to point the device at the object in order to fix this, but then the display is no longer orthogonal to the user's view. In FIG. 3, the user's gaze is orthogonal to the scene 104, as is the target-facing camera 110*b*, as reflected in $\theta_1$ and $\theta_2$ both equaling 90 degrees. However, even though user's gaze is lined up with the scene of interest 104, the target-facing camera 110*b* is not, and the scene 104 is outside of the field of view. Here, there is a problem in that the user 102 cannot even perceive the scene 104, despite being aligned with it, especially in a context where the user is trying to overlay the displayed device image with the user's "real" personal perspective.

It will be appreciated that the situations shown in FIGS. 1-3 can become problematic because of the target-facing camera 110*b* being fixed in position relative to the device 106 together with its fixed angle $\theta_2$, while the user 102 may move (or move the device 106), adjust the viewing angle, etc. In many real-world scenarios, the movement of the user 102 relative to the device 106 and/or the changing viewing angle, will occur. However, the fixed angles $\theta_1$ and $\theta_2$ can create problems.

FIGS. 4A-6B may be thought of as demonstrating aspects of principles underlying certain example embodiments. These drawings illustrate how the cameras 110*a* and 110*b* can be used develop a "device view" and a "user view" respectively. Those views can be processed to determine an alignment strategy so that the improved electronic computing device 106' can show on its display 108 the scene of interest 104 in a perspective relevant to the user's gaze, even when there are off-normal viewing angles and/or positional misalignments. Thus, in these examples, $\theta_1$ and $\theta_2$ are determined dynamically and taken into account when showing the image of the real-world scene of interest 104 on the display 108 of the electronic device 106'. It is noted that "standard" cameras' dynamic determinations of $\theta$ typically will be extremely limited given their narrow fields of view and orthogonal positioning of the front and rear cameras thereon. More particularly, it will be appreciated that typical smart devices and current AR solutions involve "standard" cameras that typically have fields of view between 25 degrees and 75 degree (at the extremes). By contrast, certain example embodiments use a closer to "full 360 degree" system for AR and/or other purposes. For instance, certain example embodiments make use of two cameras that each have a wide field of view (such as, for example, 150-180 degrees) for a total of (for example) a 300-360 degree field of view, one camera with a nearly 360 degree field of view, etc. In certain example embodiments, lenses with a field of view of greater than 180 degrees may be used on one or both sides of the device. Such lenses may be useful in helping to reduce distortion that can be problematic in terms of face-tracking and the like. In such scenarios, a wider field-of-view advantageously allows more of the relevant visual information to fall in the center of the frame, an area that has fewer extreme distortions, and thus can help improve the accuracy of the image processing. Certain example embodiments may involve the forward (user-facing) and rearward (target-facing) cameras being fixed in position and generally having focuses that extend orthogonally outwardly from the device's display. In certain example embodiments, the device camera(s) may be an attachment that is connected thereto. For example, one or more 360 degree cameras (or similar) may be used in certain example embodiments. A number of different commercially available 360 degree cameras that use arrays of sensors/lenses to capture an image in the round also may be used in some instances. This kind of camera may be advantageous in certain example embodiments, e.g., by enabling higher image quality and/or fewer distortions to be captured. In the case of a 360 degree image capture technology, separate front and rear cameras need not be used.

Figure 4A:
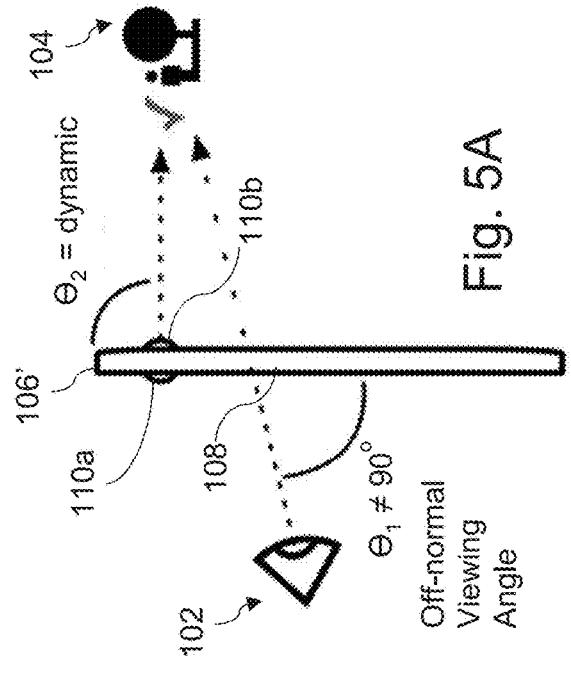
FIG. 4A shows a situation in which the user view and the device view both are orthogonal to the improved device of certain example embodiments.

More particularly, FIG. 4A shows a situation in which the user view and the device view both are orthogonal to the improved device 106' of certain example embodiments. Both the user view and the device view are determined dynamically using device 106' (e.g., as described in greater detail below) and, thus, the $\theta_1$ and $\theta_2$ can be dynamic as well. FIG. 4B shows the user-facing camera 110a identifying the user's perspective given the FIG. 4A setup, e.g., as represented by the dash-dot line, in accordance with certain example embodiments.

Figure 5A:
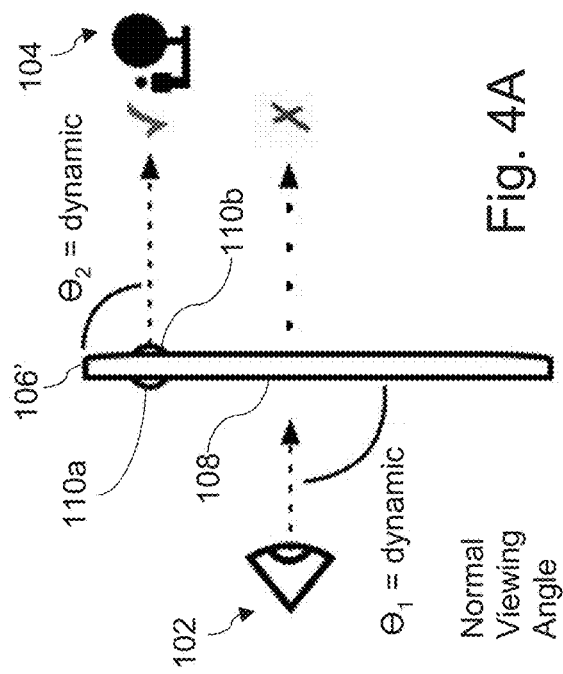
FIG. 5A shows a situation in which the device view is orthogonal to the improved device of certain example embodiments, whereas the user view is not.

FIG. 5A is like FIG. 4A, except that it shows a situation in which the device view is orthogonal to the improved device 106' of certain example embodiments, whereas the user view is not. Both the user view and the device view are determined dynamically using device 106' (e.g., as described in greater detail below) and, thus, the $\theta_1$ and $\theta_2$ can be dynamic as well (although an off-normal viewing angle for the user 102 is assumed in this example). FIG. 5B shows the user-facing camera 110a identifying the user's perspective given the FIG. 5A setup, e.g., as represented by the dash-dot line, in accordance with certain example embodiments.

Figure 6A:
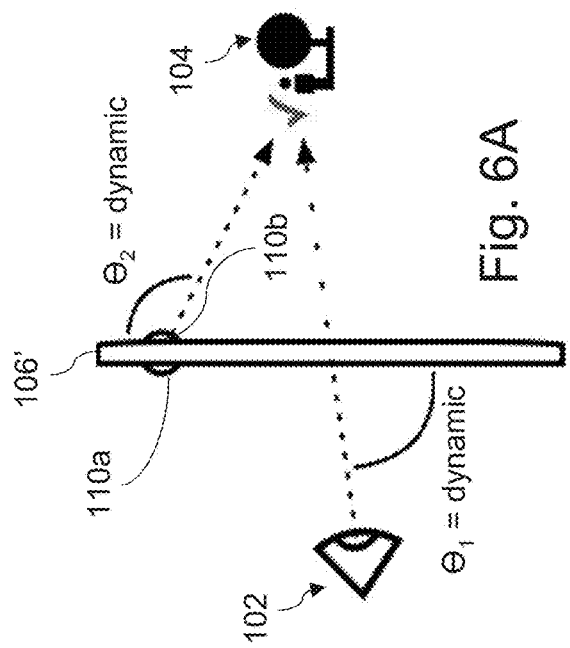
FIG. 6A shows a situation in which neither the device view nor the user view is orthogonal to the improved device of certain example embodiments.

FIG. 6A also is like FIG. 4A, except that it shows a situation in which neither the device view nor the user view is orthogonal to the improved device 106' of certain example embodiments. Both the user view and the device view are determined dynamically using device 106' (e.g., as described in greater detail below) and, thus, the $\theta_1$ and $\theta_2$ can be dynamic as well (although off-normal angles are assumed in this example). FIG. 6B shows the user-facing camera 110a identifying the user's perspective given the FIG. 6A setup, e.g., as represented by the dash-dot line, in accordance with certain example embodiments.

Although certain example viewing angles and positions are shown and described in connection with FIGS. 4A-6B, it will be appreciated that the example embodiments described herein may work with other scenarios.

Figure 7:
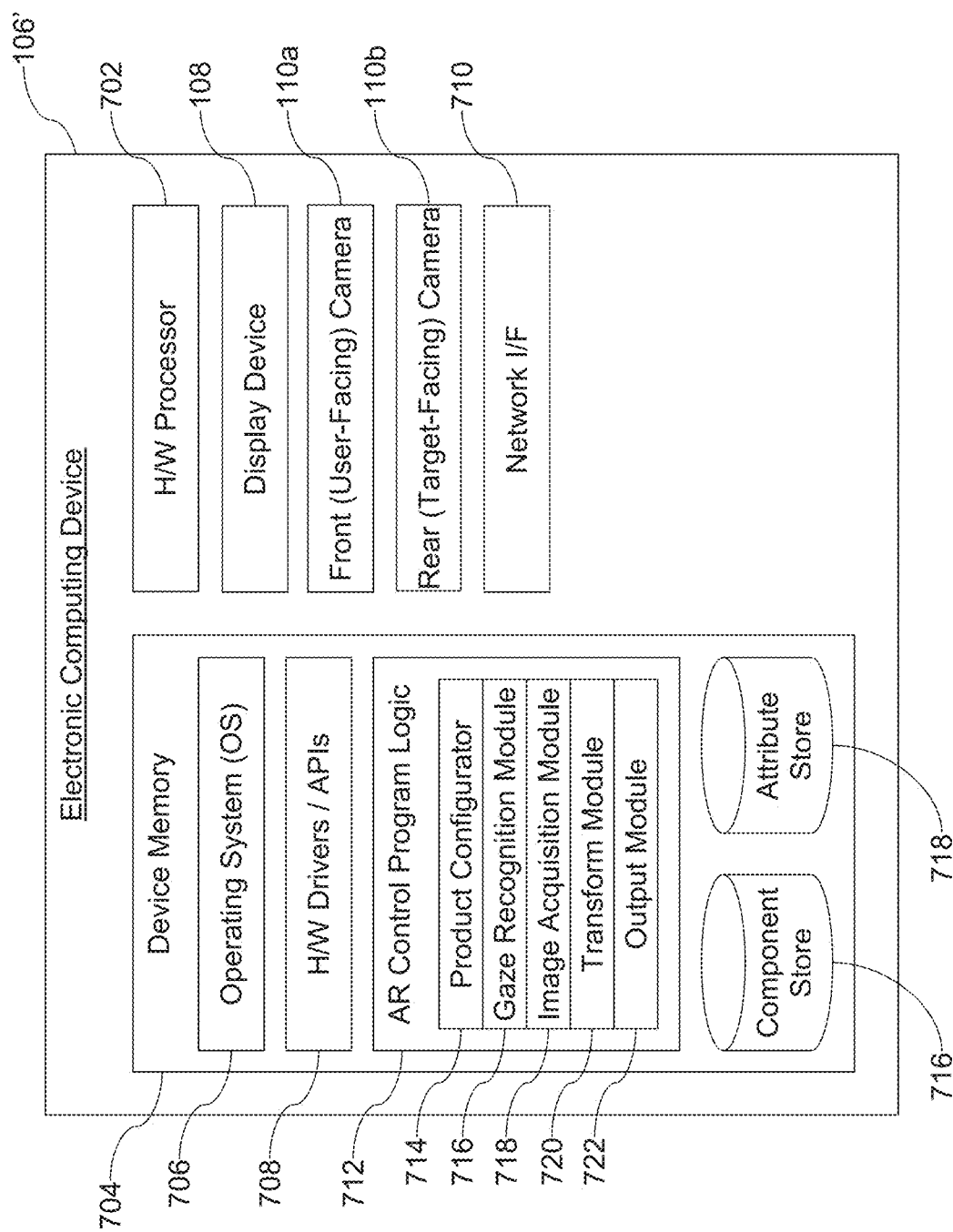
FIG. 7 is a block diagram of an example electronic device that may be configured in connection with certain example embodiments.

FIG. 7 is a block diagram of an example electronic device 106' that may be configured in connection with certain example embodiments. As will be appreciated from the above, the device 106' includes user-facing and target-facing cameras 110a and 110b, as well as a display device 108 (e.g., which may include a touchscreen interface, an LCD panel, an OLED display panel, and/or the like). As noted above, a single camera (e.g., with a 360 degree view) may be provided in place of these two cameras 110a-110b. As noted above, in contrast with many standard cameras on smart devices, certain example embodiments disclosed herein may make use of one or more wide field of view cameras, e.g., for a combined 300-360 degree field of view in some implementations. In such cases, a single camera may be integral with the device 106', or removably connected thereto. The device 106' also includes a network interface 710, which may include a network card, chipsets enabling 802.11 type communications, IR, NFC, 3G/4G/5G or other mobile and/or cellular service capabilities, etc.

The hardware processor 702 of device 106' is operably coupled to a device memory 704, which may be any suitable combination of transitory and/or non-transitory storage media (including, for example, flash memory, a solid state drive, a hard disk drive, RAM, and/or the like). The memory 704 include an operating system (OS) 706 that helps the device 106' run. The OS 706 may be an embedded OS in some instances, and it may, for example, provide for other capabilities of the device such as, for example, camera functionality, telephone calls, Internet browsing, game playing, etc.

Hardware drivers and/or application programming interfaces (APIs) 708 enable program modules stored to the device 106' to access at least the hardware features thereof. For example, the hardware drivers and/or APIs 708 may enable the AR control program logic program module 712 to access the user-facing and/or target-facing camera 110a/110b so that it can take pictures or otherwise receive video input, provide output to the display device 108, download updates via the network interface 710, etc.

The AR control program 712 includes a number of modules or sub-modules that may be customized for or otherwise related to the desired application. For the AR window use case, for example, a product configurator 714 may be provided so that the user can specify the component of the window to be simulated. In certain example embodiments, the AR control program logic 712 will present a user interface in connection with the display device 108 that guides the user through the selection of predefined configurations, the selection of parts for a "build-your-own" arrangement, and/or the selection of aesthetic properties.

The component store 716 may store information about the user-selectable components that may be selected using the product configurator 714. In this regard, the component store 716 may be arranged as a database (e.g., a relational database, XML database, or the like). In certain example embodiments, different database structures may be used for the different design configuration options. In certain example embodiments, separate tables may be provided for each of predefined configurations, substrate types (e.g., with specification of materials such as glass, plastic, etc.; thickness; product or trade name; etc.), spacer types (e.g., warm edge or cool edge, aluminum, trade name, etc.), coating types (e.g., specific low-emissivity, antireflection, antifouling, and/or other coatings), laminating material (e.g., PVB, EVA, PET, PU, etc.), and/or the like. Different database structures storing performance metrics (e.g., coloration, transmission, reflection, etc.) additionally or alternatively may be provided and linked to the predefined and/or component information. In certain example embodiments, these performance metrics may be stored in the attribute store 718 (although separate databases and/or database structures need not necessarily be provided). Performance metrics may include and/or facilitate the calculation of CIE color coordinate information (e.g., $a^*$, $b^*$, $L^*$, etc.), light-to-solar gain (LSG) values, solar heat gain coefficient (SHGC) data, and/or the like, with angular data being provided or being calculatable where relevant.

A user may, for instance, select a single 3 mm thick clear glass substrate with a single low-E coating thereon (e.g., a SunGuard, ClimaGuard, or other specific coating commercially available from the assignee), a laminated article with two 3 mm glass substrates laminated together with a PVB interlayer, an IG unit including two 3 mm glass substrate separated by 10 mm with an 80/20 Argon-to-Oxygen backfill separated by an IET spacer with a ClimaGuard coating on surface 2, etc. These are, of course, merely examples of user selections. Fully or partially pre-configured coated articles, glazings, IG units, VIG units, and/or the like, may be user-selectable. Coatings, substrates, configurations, etc., from the assignee, or other parties, and/or the like may be selected, as well. A database of selectable options may be remotely updated and/or remotely maintained (and in this later instance accessed by the device over the Internet or other suitable network connection) so that further (e.g., future-developed) coatings, substrates, and/or the like may be added and selectable over time. Selections may be more or less fine-grained in certain example embodiments. Also, as noted above, selections may be specified in whole or in part in terms of performance characteristics (e.g., coloration, visible transmission, reflection, emissivity, etc.), selections may be based on predefined configurations that may be accepted or further customized in some instances, etc. Motion effects also may be used to help communicate reflected color information and/or other optical performance. Dynamic color representation may be shown, for example, in "digital swatches," that are viewable using a device according to certain example embodiments. Such swatches could be selected by a user and then superimposed on an obtained image.

The gaze recognition module 716 recognizes where the user is looking. The gaze recognition module 716 may be static or real-time, e.g., so that the user's gaze is tracked. An example of how a user's gaze may be tracked is provided below (e.g., in connection with FIG. 9), although it will be appreciated that there are known image processing techniques that may be used in addition to or in place of the example approach detailed herein. In certain example embodiments, the image acquisition module 718 uses the target-facing camera 110b to take a picture and/or receive a video feed of an object of interest. Alternatively, or in addition, the image acquisition module 718 may be used to retrieve a captured image and/or video so that the user can see how different configurations compare to one another. That is, the user may capture an image and/or video, and/or select from a library of videos, and then have the custom-generated filters (described below) applied thereto so that the user can compare different selected configurations based on a common baseline.

Figure 10:
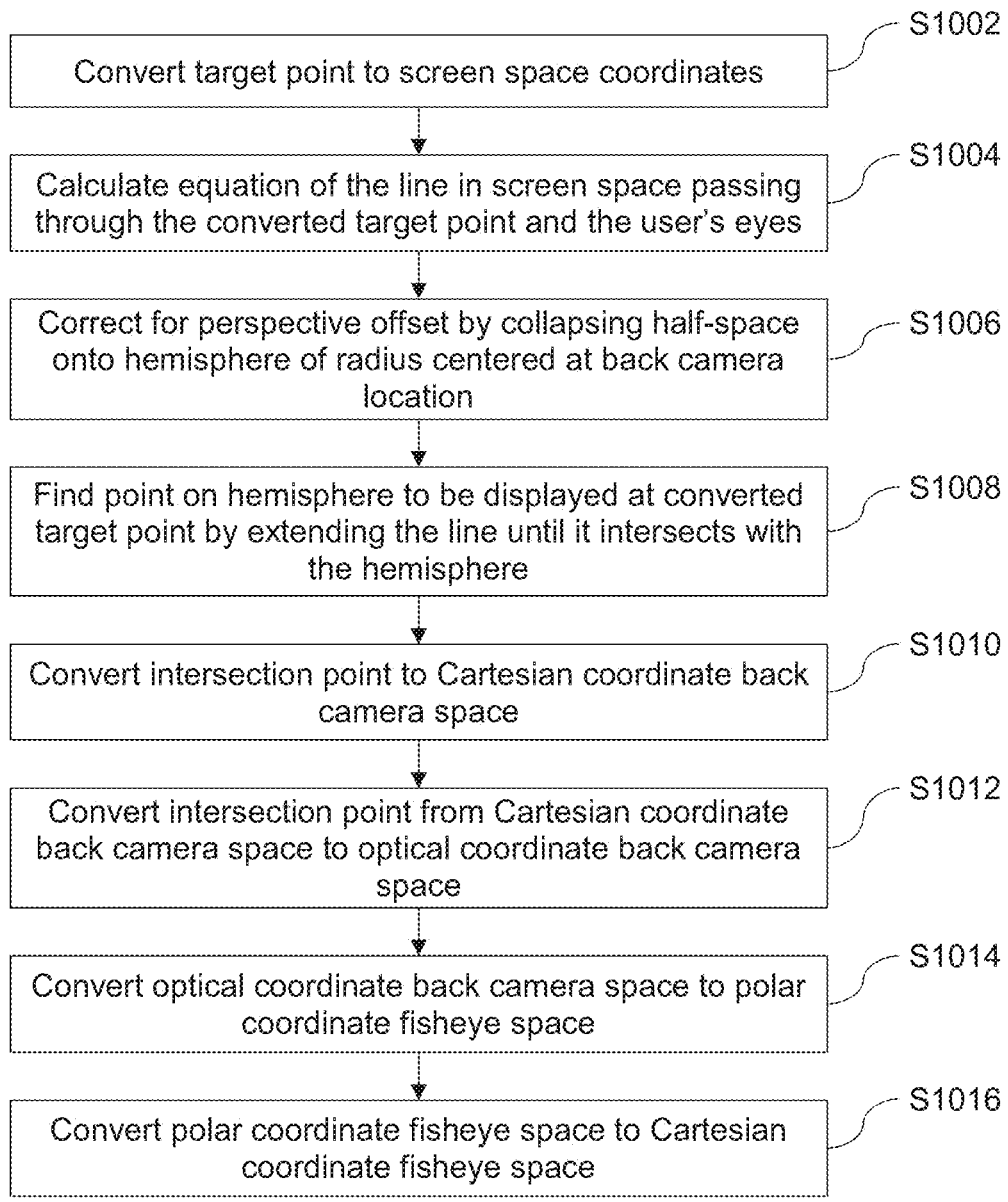
FIG. 10 is a flowchart showing an example process for target-facing (rear) image rendering, which may be used in connection with certain example embodiments.
Figure 11:
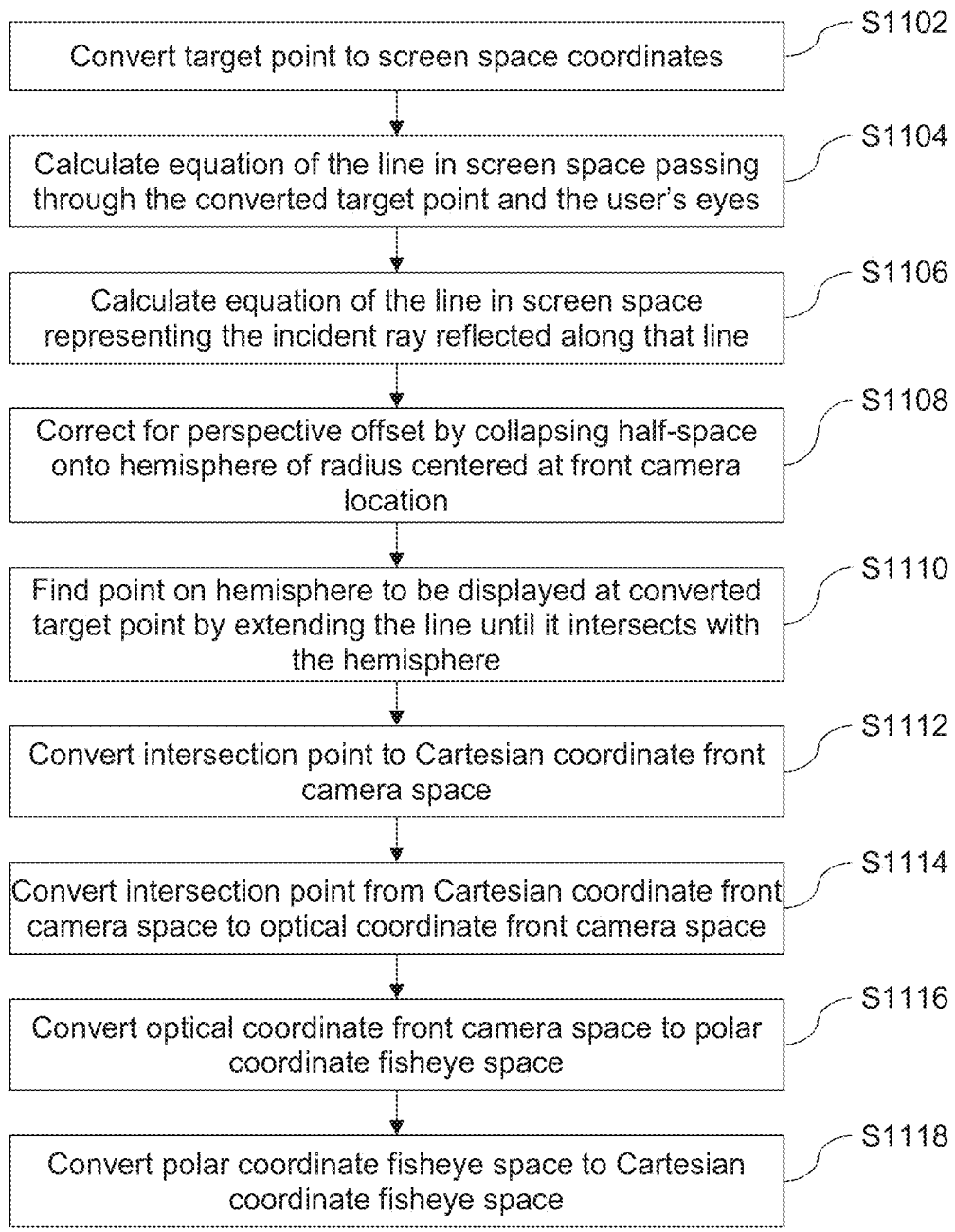
FIG. 11 is a flowchart showing an example process for user-facing (front) image rendering, which may be used in connection with certain example embodiments.

The transform module 720 helps perform the operations shown schematically in FIGS. 4A-6B, e.g., as detailed in FIGS. 10-11. That is, the transform module 720 helps determine how the captured image and/or video should be manipulated so that it is displayed in a meaningful way for the user. This module may also be responsible for generating the custom filter that is to be applied to the image and/or video. In this regard, the transform module 720 may take the design generated using the product configurator module 714 and look up the performance characteristics from the attribute store 718 based on the common coordinate space in which the image is to be displayed and decide how the transformed image, in the common coordinate space, is to be further manipulated. This may include, for example, altering the coloration (e.g., based on a color shift through the window and/or based on viewing angle), reducing its clarity (e.g., because of haze and/or lowered transmission, which also may be based on viewing angle), simulating reflection (e.g., which may be based on viewing angle), showing the impact of different surface applications (e.g., screen-printed or otherwise applied frit in the context of some solar control and/or applications where there typically are "dot" patterns or the like formed on a first and/or second surface of the glass, painted glass, "bird friendly" coatings), showing the diffuse look of acid-etched or other glass, etc. The further modification of the image may be based on a filter applied to the image, and the filter may be generated by the transform module 720. The image, with the filter applied thereto, may be provided to the display device 108 via the output module 722 (which may in certain example embodiments be responsible for combining the image with the filter). In certain example embodiments, some or all of the game recognition module 716, image acquisition module 718, transform module 720, and output module 722 may operate more or less continuously so that real-time output can be displayed to the user, e.g., based on movements of the user and/or the device, changes in real-world scene being images, etc.

Example image processing techniques for determining face detection and position, as well as front (user-facing) and rear (target-facing) image rendering will now be provided. It will be appreciated that these approaches are provided by way of example and without limitation. For ease of illustration, the electronic device 106' in the examples that follow is assumed to be a 2017 iPad Pro 10.5" (A1701 or A1709) held in the "portrait" orientation. It will be appreciated that different devices and/or orientations may be used in different implementations. In such cases, assumptions concerning the pixels-per-inch, screen dimensions, camera specifications, etc., may be adjusted. In this example:

p=264, pixels-per-inch of the screen
$\omega$=1668, the screen width in pixels
$\eta$=2224, the screen height in pixels Additionally, the field of view for the fisheye camera in this example is assumed to be uniform, so $v=\pi$. Of course, the processing below may be updated to take into account different types of cameras and/or non-uniform fields of view.

Figure 8A:
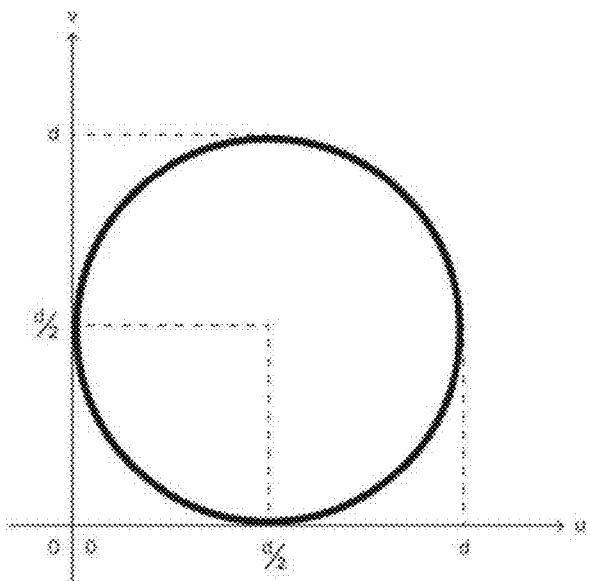
FIGS. 8A-8H help demonstrate how coordinate space resolution may be accomplished in connection with certain example embodiments.

Different coordinate spaces are involved in the example image transforms described herein. A first coordinate space relevant to certain example embodiments is the fisheye image space, expressed in Cartesian coordinates. This space is a square two-dimensional space parameterized by the Cartesian coordinates (u, v). As can be appreciated from FIG. 8A, in this space:

(0, 0) is located at the bottom left of the square.
u and v are measured in pixels.
(u, v)=(d, d) is located at the top right of the square (where d=diameter).
The fisheye image captured within this square is assumed to lie wholly within the circle of radius d/2 centered at the center of the square, such that (u, v)=(d/2, d/2). It is noted that this assumption and other assumptions may be made in certain example embodiments, but other assumptions may be used in different example embodiments. Furthermore, certain example embodiments may automatically calculate and/or determine factors such as these. As an example, certain example embodiments may make the assumption that the fish eye image will be centered on the screen, whereas different example embodiments may instead automatically identify the position of the fish eye image without exact manual centering, e.g., using image processing routines.

The fisheye image captured within this square is assumed to be upright. It is noted that this assumption was made because most existing face tracking APIs require an upright image. However, this assumption might not stay true for other embodiments of the invention, e.g., where the user is to be visible at non-upright angles relative to the device.

A point $(u_0, v_0)$ in fisheye image space (with Cartesian coordinates) can be converted to a point $(r_0, \theta_0)$ in fisheye image space (with polar coordinates) using the formulae:

$$r_0 = \sqrt{[(u_0-d/2)^2+(v_0-d/2)^2]}$$

$$\theta_0 = a\tan 2(v_0-d/2, u_0-d/2)$$

Figure 8B:
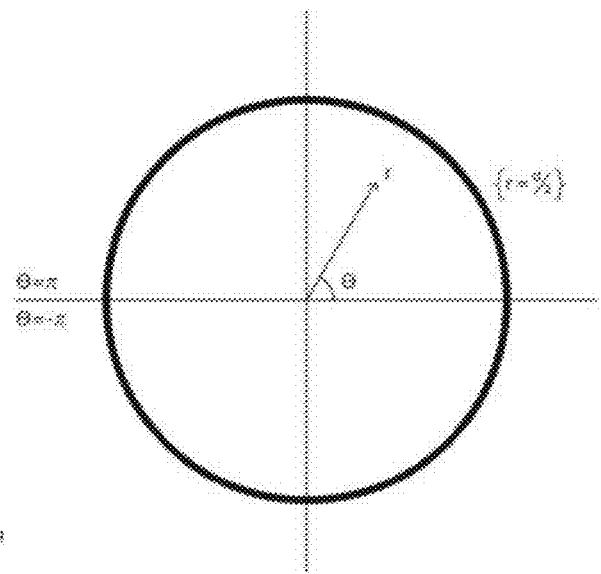

It follows that a second coordinate space relevant to certain example embodiments is the fisheye image space, expressed in polar coordinates. This space is a circular two-dimensional space parameterized by the polar coordinates $(r, \theta)$. As can be appreciated from FIG. 8B, in this space:
- r is measured in pixels and varies between 0 and d/2.
- θ is measured in radians and varies between $-\pi$ and $\pi$, where $\theta=\pi/2$ points directly up.
- The fisheye image is assumed to completely cover this space.
- The fisheye image captured within this space is assumed to be upright.

A point $(r_0, \theta_0)$ in fisheye image space (with polar coordinates) can be converted to a point $(u_0, v_0)$ in fisheye image space (with Cartesian coordinates) using the formulae:

$$u_0 = d/2 + r_0 \cos(\theta_0)$$

$$v_0 = d/2 + r_0 \sin(\theta_0)$$

A point $(r_0, \theta_0)$ in fisheye image space (with polar coordinates) can be converted to camera space (with optical coordinates) using the formulae:

$$\psi_0 = vr_0/d = \pi r_0/d$$

$$\phi_0 = \theta_0$$

Figure 8C:
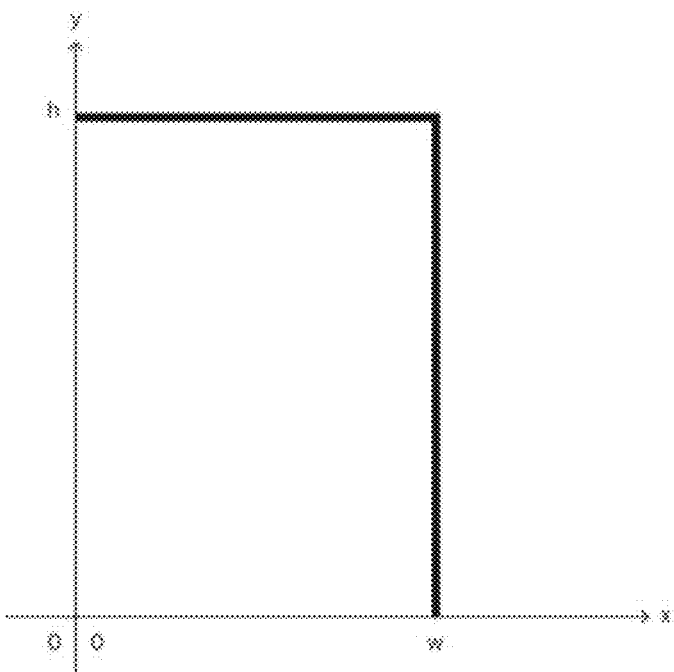

A third coordinate space relevant to certain example embodiments is the target image space. This space is a rectangular two-dimensional space parameterized by the Cartesian coordinates $(x, y)$. As can be appreciated from FIG. 8C, in this space:
- (0, 0) is located at the bottom left of the rectangle.
- x and y are measured in pixels.
- $(x, y)=(w, h)$ is located at the top right of the rectangle, where w and h satisfy w:h=2:3 to match the aspect ratio of the example iPad screen.
- The output image displayed in this space is assumed to be upright.

A point $(x_0, y_0)$ in target image space can be converted to a point $(X_0, Y_0, 0)$ in screen space using the formulae:

$$X_0 = (x_0 - w/2)/p$$

$$Y_0 = (y_0 - h/2)/p$$

Figure 8D:
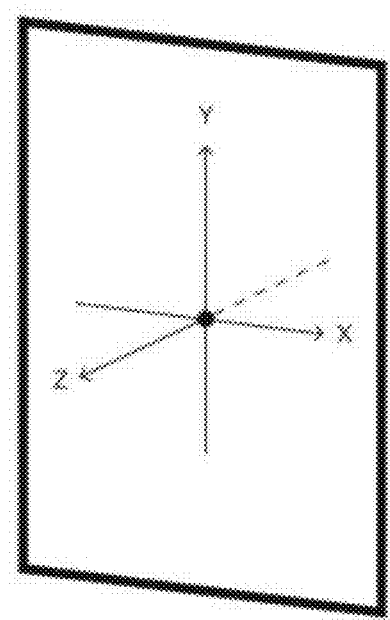

A fourth coordinate space relevant to certain example embodiments is the screen space. The screen space is a three-dimensional space parameterized by the Cartesian coordinates $(X, Y, Z)$. As can be appreciated from FIG. 8D, in this space:
- (0, 0, 0) is located at the center of the example iPad's screen.
- X, Y, and Z are measured in inches.
- The X-Y plane is coplanar with the example iPad's screen, with the X-axis parallel to the short side of the example iPad and increasing from left-to-right as viewed from the front, and the Y-axis parallel to the long side of the example iPad and increasing from bottom-to-top.
- The Z-axis is perpendicular to the example iPad's screen. The half-space $\{Z>0\}$ lies wholly in front of the example iPad.
- (X, Y, Z) form a right-handed coordinate system.
- The front/user-facing camera is assumed to be located at $\underline{F}=(0, 4.57, 0)$ in screen space. The back camera is assumed to be located at $\underline{B}=(3.07, 4.55, 0)$ in screen space. It will be appreciated that different locations will be provided for different cameras of or connected to different devices, and that the example conversions discussed immediately below can be modified to take into account these different placements.

A point $(X_0, Y_0, Z_0)$ in screen space can be converted to back camera space (with Cartesian coordinates) using the formulae:

$$I_0 = X_0 - 3.07$$

$$J_0 = -Z_0$$

$$K_0 = Y_0 - 4.55$$

A point $(X_0, Y_0, Z_0)$ in screen space can be converted to front camera space (Cartesian coordinates) using the formulae:

$$I_0 = -X_0$$

$$J_0 = Z_0$$

$$K_0 = Y_0 - 4.57$$

Figure 8E:
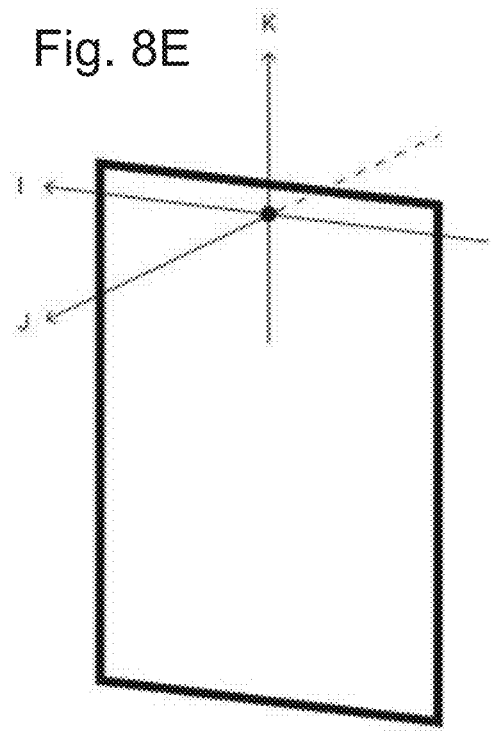
Figure 8F:
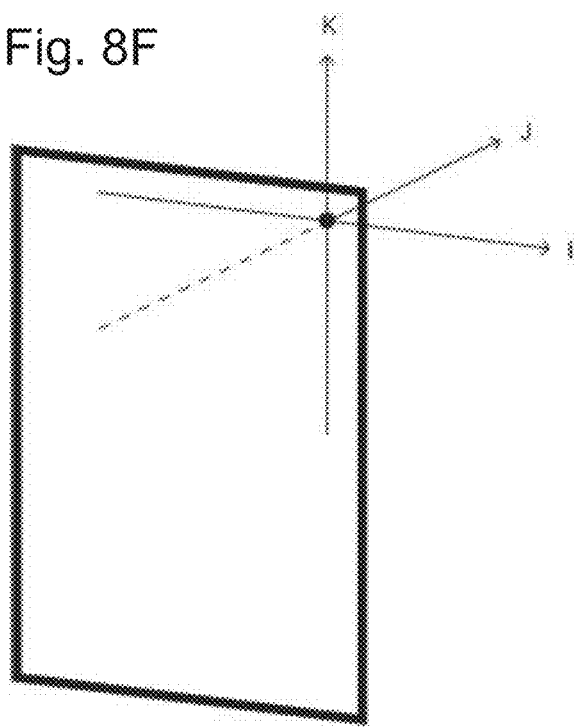
Figure 8G:
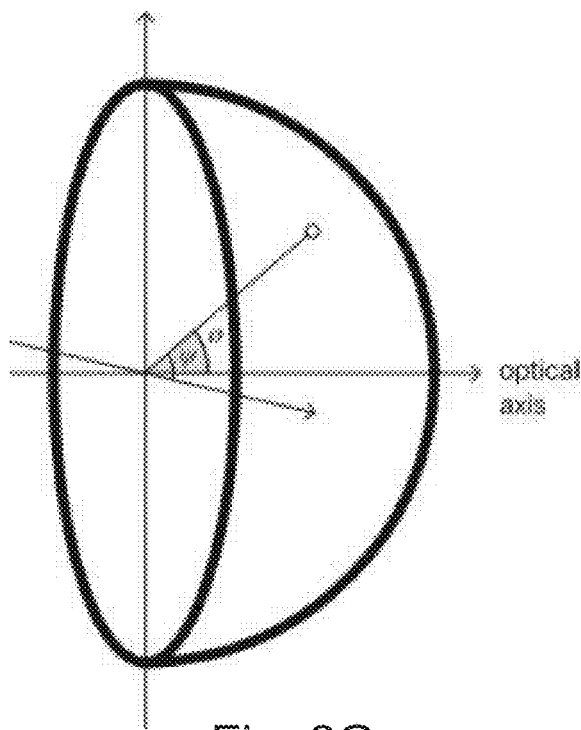

The front (user-facing) and back (target-facing) camera spaces as expressed with Cartesian coordinates also are relevant to certain example embodiments. These spaces are three-dimensional spaces parameterized by the Cartesian coordinates $(I, J, K)$. As will be appreciated from FIGS. 8E and 8F, which are relevant to the front (user-facing) and back (target-facing) camera spaces respectively, in these spaces:
- The camera is located at (0, 0, 0).
- From the perspective of the camera: (1, 0, 0) is directly to the right of the camera; (0, 1, 0) is directly in front of the camera; and (0, 0, 1) is directly above the camera.

A point $(I_0, J_0, K_0)$ in camera space (with Cartesian coordinates) can be converted to camera space (with optical coordinates) using the formulae:

$$\psi_0 = a\tan 2(K_0, I_0)$$

$$\phi_0 = a\tan 2(\text{sqrt}(I_0^2 + K_0^2), J_0)$$

A point $(I_0, J_0, K_0)$ in front camera space (with Cartesian coordinates) can be converted to screen space using the formulae:

$$X_0 = -I_0$$

$$Y_0 = K_0 + 4.57$$

$$Z_0 = J_0$$

The front (user-facing) and back (target-facing) camera spaces as expressed with optical coordinates also are relevant to certain example embodiments. These spaces are two-dimensional hemispheres of arbitrary radii parameterized by the angles ($\psi$, $\phi$). As will be appreciated from FIG. 8F, in this space:

Both angles are measured in radians.

$\psi$ lies in the range $[-\pi, \pi]$, where the line $\psi=0$ lies directly to the right of the camera.

$\phi$ lies in the range $[0, \pi/2]$, where the line $\phi=0$ corresponds to the camera's optical axis and the plane $\phi=\pi/2$ is coplanar with the example iPad.

A point ($\psi_0$, $\psi_0$) in camera space (with optical coordinates) can be converted to fisheye image space (with polar coordinates) using the formulae:

$$r_0 = d\psi_0/v = d\psi_0/\pi$$

$$\theta_0 = \psi_0$$

A point ($\psi_0$, $\psi_0$) in camera space (with optical coordinates) at a distance d from the camera can be converted to camera space (with Cartesian coordinates) using the formulae:

$$I_0 = d\sin(\psi_0)\cos(\phi_0)$$

$$J_0 = d\cos(\psi_0)$$

$$K_0 = d\sin(\psi_0)\sin(\phi_0)$$

Figure 9:
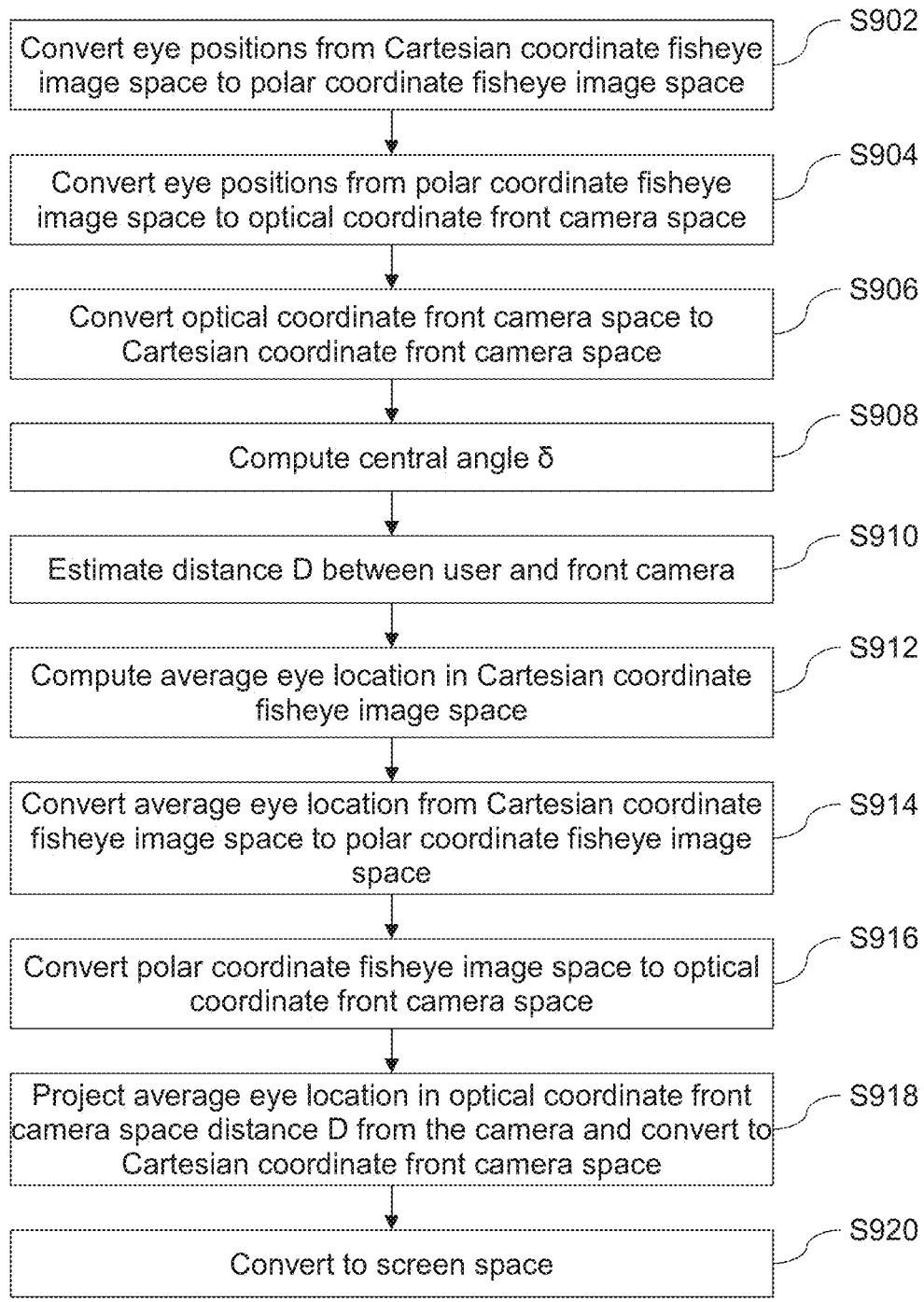
FIG. 9 is a flowchart showing an example process for face detection and positioning, which may be used in connection with certain example embodiments.

Given this background and with respect to this example electronic device 106', further detail concerning the face detection and positioning image processing will now be provided. In this regard, FIG. 9 is a flowchart showing an example process for face detection and positioning, which may be used in connection with certain example embodiments. The FIG. 9 flowchart takes as input eye locations ($u_1$, $v_1$) and ($u_2$, $v_2$) in front fisheye image space (with Cartesian coordinates). The physical separation s of the two eyes can be determined in certain example embodiments. In this particular example, the assumed physical separation of the two eyes is 2.5 inches. Pre-processing may be performed to determine the user's average eye location $\underline{U}_a = (U_a, V_a, W_a)$ ($W_a > 0$), in screen space.

In step S902, the eye positions ($u_1$, $v_1$) and ($u_2$, $v_2$) are converted from fisheye image space (with Cartesian coordinates) to fisheye image space (with polar coordinates). The following formulae may be used in this regard:

$$r_1 = \sqrt{[u_1^2 + v_1^2]}$$

$$\theta_1 = a\tan 2(v_1, u_1)$$

$$r_2 = \sqrt{[u_2^2 + v_2^2]}$$

$$\theta_2 = a\tan 2(v_2, u_2)$$

In step S904, the eye positions are converted from fisheye image space (with polar coordinates) to front camera space (with optical coordinates). The following formulae may be used in this regard:

$$\psi_1 = vr_1/d = \pi r_1/d$$

$$\phi_1 = \theta_1$$

$$\psi_2 = vr_2/d = \pi r_2/d$$

$$\phi_2 = \theta_2$$

In step S906, the front camera space (with optical coordinates) is converted to front camera space (with Cartesian coordinates), normalized such that $|\underline{I}_1| = |\underline{I}_2| = 1$. It is noted that the next step assumes that the input vectors are already normalized. The following formulae may be used in this regard:

$$I_1 = \sin(\psi_1)\cos(\phi_1)$$

$$J_1 = \cos(\psi_1)$$

$$K_1 = \sin(\psi_1)\sin(\phi_1)$$

$$I_2 = \sin(\psi_2)\cos(\phi_2)$$

$$J_2 = \cos(\psi_2)$$

$$K_2 = \sin(\psi_2)\sin(\phi_2)$$

In step S908, the central angle $\delta$ between two points on a sphere using a well-conditioned vector formula: $\delta = a\tan 2(|\underline{I}_1 \times \underline{I}_2|, \underline{I}_1 \cdot \underline{I}_2)$. As is known to those skilled in the art, central angles are subtended by an arc between those two points, and the arc length is the central angle of a circle of radius one (measured in radians). The central angle is also known as the arc's angular distance.

In step S910, the distance D (in inches) between the user and the front (user-facing) camera is estimated. The following formula may be used in this regard: $D = (s/2)/\tan(\delta/2)$. In some instances, it may be necessary or advantageous to account for great circle distance (as opposed to linear distance) to improve accuracy as the user approaches the camera.

In step S912, the average eye location in fisheye image space (with Cartesian coordinates) is computed. The following formulae may be used in this regard:

$$u_a = (u_1 + u_2)/2$$

$$v_a = (v_1 + v_2)/2$$

In step S914, these locations in fisheye image space (with Cartesian coordinates) are converted to fisheye image space (with polar coordinates). The following formulae may be used in this regard:

$$r_a = \sqrt{[u_a^2 + v_a^2]}$$

$$\theta_a = a\tan 2(v_a, u_a)$$

In step S916, these locations in fisheye image space (with polar coordinates) are then converted to front camera space (with optical coordinates). The following formulae may be used in this regard:

$$\psi_a = vr_a/d = \pi r_a/d$$

$$\phi_a = \theta_a$$

It is noted that it may not be feasible to simply average $\psi_{1,2}$ and $\phi_{1,2}$ to obtain $\psi_a$ and $\phi_a$ because the transformation from fisheye image space to front camera space is nonlinear.

In step S918, the average eye location in front camera space (with optical coordinates) is projected a distance D from the camera, and a conversion to front camera space (with Cartesian coordinates) is performed. The following formulae may be used in this regard:

$$I_a = D\sin(\psi_a)\cos(\phi_a)$$

$$J_a = D\cos(\psi_a)$$

$$K_a = D\sin(\psi_a)\sin(\phi_a)$$

In step S920, this information is converted to screen space. The following formulae may be used in this regard:

$$X_a = -I_a$$

$$Y_a = K_a + 4.57$$

$$Z_a = J_a$$

It will be appreciated that the location of the user may be important because the user typically will move the device to "point at" or otherwise "frame" the object of interest. That is, the user is in essence framing a shot with a device, much like a professional photographer would do. Taking this into account, certain example embodiments may simplify the calculations that are performed by determining only where the user is rather than alternatively or additionally determining where the device is and/or how it is oriented. Of course, this determinations as to where the device is and/or how it is oriented can be taken into account in certain example embodiments, e.g., to verify that the image processing is being performed correctly. This may be accomplished in connection with accelerometers, gyroscopes, and/or other devices that typically are found in smart devices like tablets and smartphones. In any event, once the user is positioned, further image processing is possible to handle changes in perspective, augment reality (e.g., to simulate what looking through a window might be like), etc.

FIG. 10 is a flowchart showing an example process for rear (target-facing) image rendering, which may be used in connection with certain example embodiments. The FIG. 10 process starts with a target point $(x_0, y_0)$ in target image space, as well as the user's eye location $\underline{U}=(U, V, W)$ (W>0) in screen space. This information is used to generate the source point $(u_0, v_0)$ in rear fisheye image space (with Cartesian coordinates) that should be displayed at the target point. In step S1002, the target point is converted to screen space coordinates. The following formulae may be used in this regard:

$$X_0 = (x_0 - w/2)/p$$

$$Y_0 = (y_0 - h/2)/p$$

Here, $\underline{X}_0 = (X_0, Y_0, 0)$ denotes the target point in screen space In step S1004, equation of the line in screen space passing through the target point $\underline{X}_0$ and user's eyes $\underline{U}$ is then given as:

$$\underline{X} = \underline{X}_0 + \lambda \underline{D} \quad (1)$$

Here, $\underline{D} = (\underline{X}_0 - \underline{U})/|\underline{X}_0 - \underline{U}|$ is a vector of length 1 pointing from the user's eyes $\underline{U}$ to the target point $\underline{X}_0$, and $\lambda$ is a real number that represents distance traveled along this vector starting from $\underline{X}_0$.

The correct portion of the half-space $\{Z<0\}$ is to be displayed according to the user's perspective. However, the image of that half-space is captured from the back camera's perspective. To attempt to allow correction for this perspective offset, the half-space $\{Z<0\}$ is (normally) collapsed onto the hemisphere $\{Z<0, (\underline{X}-\underline{B})\cdot(\underline{X}-\underline{B})=R^2\}$ of radius R centered at the back camera location $\underline{B}$. Then, it is possible to either (a) pick R according to some heuristic, or (b) allow users to calibrate the value of R manually. See step S1006 in these regards.

In step S1008, to find the point on the hemisphere that should be displayed at the screen coordinate $X_0$, the line from equation (1) is extended (in essence tracing the user's line of sight) until it intersects with the hemisphere.

Figure 8H:
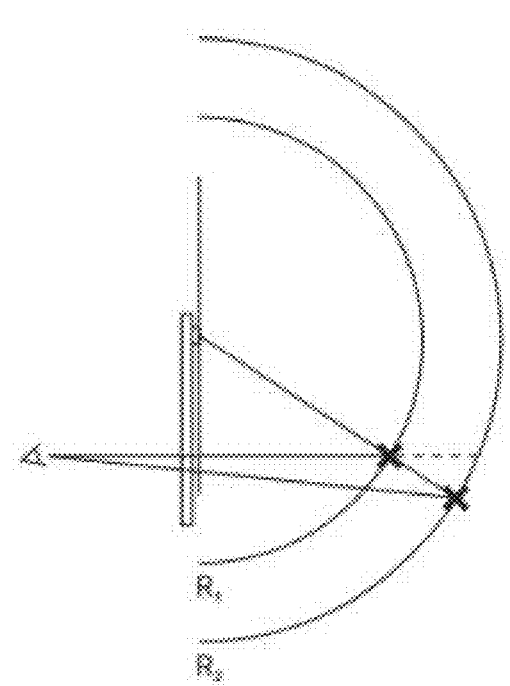

See FIG. 8H in this regard. This intersection point is then given by one root of the following equation:

$$\lambda_0 = -(\underline{D}\cdot(\underline{X}_0-\underline{B})) \pm \sqrt{[(\underline{D}\cdot(\underline{X}_0-\underline{B}))^2 + R^2 - |\underline{X}_0-\underline{B}|^2]} \quad (2)$$

It is noted that when $R \gg |\underline{B}-\underline{U}|, |\underline{X}_0-\underline{B}|$, the solutions of this equation are approximately $\pm R$ and, thus, the same solutions that would be expected if the offset were completely ignored. To determine whether to pick the positive or negative root in equation (2), the Z component of $\underline{X}_0 + \lambda_0 \underline{D}$, which is $-\lambda_0 W/|\underline{X}_0 - \underline{U}|$, is considered. This should be negative so as to pick the intersection point that lies behind the example iPad, not the intersection point that lies in front of the example iPad. This should only be possible if $\lambda_0 > 0$. Therefore, the positive root in equation (2) typically will be selected:

$$\lambda_0 = -(\underline{D}\cdot(\underline{X}_0-\underline{B})) + \sqrt{[(\underline{D}\cdot(\underline{X}_0-\underline{B}))^2 + R^2 - |\underline{X}_0-\underline{B}|^2]}$$

The intersection point $\underline{X}_i = \underline{X}_0 + \lambda_0 \underline{D}$ in screen space is now known, and this is converted to back camera space (with Cartesian coordinates) in step S1010. The following formulae may be used in this regard:

$$I_0 = X_i - 3.07$$

$$J_0 = -Z_i$$

$$K_0 = Y_i - 4.55$$

As above, these formulae may be modified based on physical parameters of the example device, etc.

In step S1012, these coordinates are converted to back camera space (with optical coordinates). The following formulae may be used in this regard:

$$\psi_0 = a\tan 2(K_0, I_0)$$

$$\phi_0 = a\tan 2(\sqrt{I_0^2 + K_0^2}, J_0)$$

In step S1014, these coordinates are converted to fisheye space (polar coordinates). The following formulae may be used in this regard:

$$r_0 = d\phi_0/v = d\phi_0/\pi$$

$$\theta_0 = \psi_0$$

In step S1016, the fisheye space (with Cartesian coordinates) values are determined. The following formulae may be used in this regard:

$$u_0 = d/2 + r\cos(\theta_0)$$

$$v_0 = d/2 + r\sin(\theta_0)$$

The front image rendering techniques of certain example embodiments may be similar to the rear image rendering techniques used therein. FIG. 11 is a flowchart showing an example process for front image rendering, which may be used in connection with certain example embodiments. The FIG. 11 process starts with a target point $(x_0, y_0)$ in target image space, as well as the user's eye location $\underline{U}=(U, V, W)$ (W>0) in screen space. This information is used to generate the source point $(u_0, v_0)$ in front fisheye image space (with Cartesian coordinates) that should be displayed at the target point. In step S1102, the target point is converted to screen space coordinates. The following formulae may be used in this regard:

$$X_0 = (x_0 - w/2)/p$$

$$Y_0 = (y_0 - h/2)/p$$

Here, $\underline{X}_0 = (X_0, Y_0, 0)$ denotes the target point in screen space In step S1104, equation of the line in screen space passing through the target point $\underline{X}_0$ and user's eyes $\underline{U}$ is then given as:

$$\underline{X} = \underline{X}_0 + \lambda \underline{D} \quad (3)$$

Here, $\underline{D} = (\underline{X}_0 - \underline{U})/|\underline{X}_0 - \underline{U}|$ is a vector of length 1 pointing from the user's eyes $\underline{U}$ to the target point $\underline{X}_0$, and $\lambda$ is a real number that represents distance traveled along this vector starting from $\underline{X}_0$.

The equation of the line in screen space representing the incident ray that will be reflected along the line in equation (3) is then:

$$\underline{X} = \underline{X}_0 + \mu \underline{E} \quad (4)$$

Here, $\underline{E}$ is a reflected vector of length 1 pointing at the target point $\underline{X}_0$, and $\mu$ is a real number that represents distance traveled along this reflected vector starting from $\underline{X}_0$. Because reflection occurs in certain example embodiments, the plane $\{Z=0\}$, $\underline{E}$ can be obtained from $\underline{D}$ by switching the sign of the Z-component. See step S1106 in this regard.

The correct portion of the half-space $\{Z>0\}$ is to be displayed according to the user's perspective. However, the image of that half-space is captured from the front (user-facing) camera's perspective. To attempt to allow correction for this perspective offset, the half-space $\{Z>0\}$ is (normally) collapsed onto the hemisphere $\{Z>0, (\underline{X}-\underline{F}) \cdot (\underline{X}-\underline{F}) = R^2\}$ of radius R centered at the user-facing camera location F. Then, it is possible to either (a) pick R according to some heuristic, or (b) allow users to calibrate the value of R manually. See step S1108 in these regards.

In step S1110, to find the point on the hemisphere that should be displayed at the screen coordinate $\underline{X}_0$, the line from equation (4) is extended (in essence tracing the user's reflected line of sight) until it intersects with the hemisphere. This intersection point is then given by one root of the following equation:

$$\mu_0 = -(\underline{E} \cdot (\underline{X}_0 - \underline{F})) \pm \sqrt{[(\underline{E} \cdot (\underline{X}_0 - \underline{F}))^2 + R^2 - |\underline{X}_0 - \underline{F}|^2]} \quad (5)$$

It is noted that when $R >> |\underline{F} - \underline{U}|, |\underline{X}_0 - \underline{F}|$, the solutions of this equation are approximately $\pm R$ and, thus, the same solutions that would be expected if the offset were completely ignored. To determine whether to pick the positive or negative root in equation (5), the Z component of $\underline{X}_0 + \mu_0 \underline{E}$, which is $\mu_0 W/\|\underline{X}_0 - \underline{U}\|$, is considered. This should be positive so as to pick the intersection point that lies in front of the example iPad, not the intersection point that lies in behind the example iPad. This should only be possible if $\mu_0 > 0$. Therefore, the positive root in equation (5) typically will be selected:

$$\mu_0 = -(\underline{E} \cdot (\underline{X}_0 - \underline{F})) + \sqrt{[(\underline{E} \cdot (\underline{X}_0 - \underline{F}))^2 + R^2 - |\underline{X}_0 - \underline{F}|^2]}$$

The intersection point $\underline{X}_i = \underline{X}_0 + \mu_0 \underline{E}$ in screen space is now known, and this is converted to front camera space (with Cartesian coordinates) in step S1112. The following formulae may be used in this regard:

$$I_0 = -X_i$$

$$J_0 = Z_i$$

$$K_0 = Y_i - 4.57$$

As above, these formulae may be modified based on physical parameters of the example device, etc.

In step S1114, these coordinates are converted to front camera space (with optical coordinates). The following formulae may be used in this regard:

$$\psi_0 = a\tan 2(K_0, I_0)$$

$$\phi_0 = a\tan 2(\sqrt{I_0^2 + K_0^2}, J_0)$$

In step S1116, these coordinates are converted to fisheye space (polar coordinates). The following formulae may be used in this regard:

$$r_0 = d\phi_0/v = d\phi_0/\pi$$

$$\theta_0 = \psi_0$$

In step S1118, the fisheye space (with Cartesian coordinates) values are determined. The following formulae may be used in this regard:

$$u_0 = d/2 + r\cos(\theta_0)$$

$$v_0 = d/2 + r\sin(\theta_0)$$

Figure 12A:
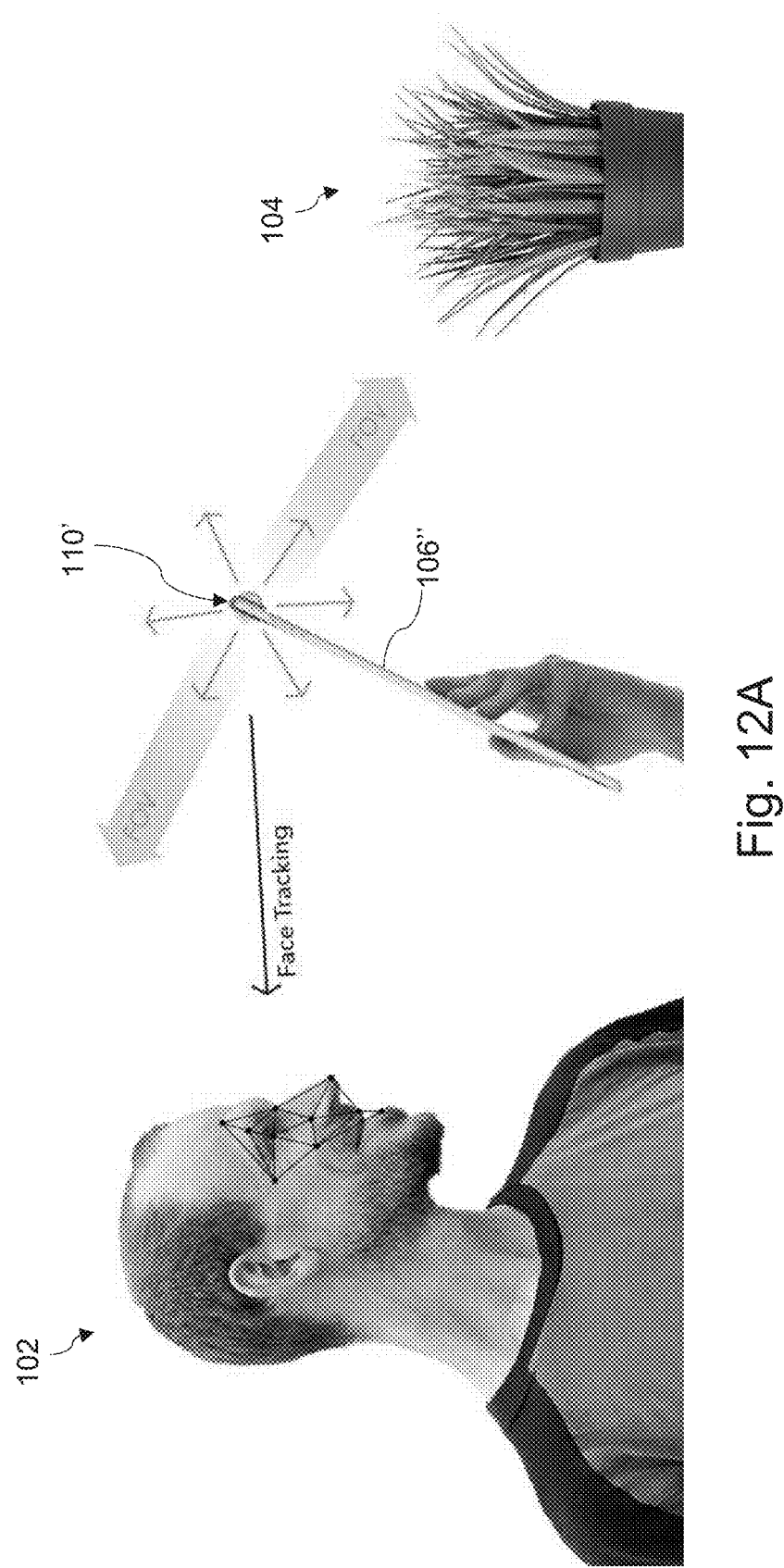
FIGS. 12A-12C show an example setup in which a human viewer uses a version of the FIG. 7 example device to view an object as if that object were located on the opposite side of a window, in accordance with certain example embodiments.
Figure 12B:
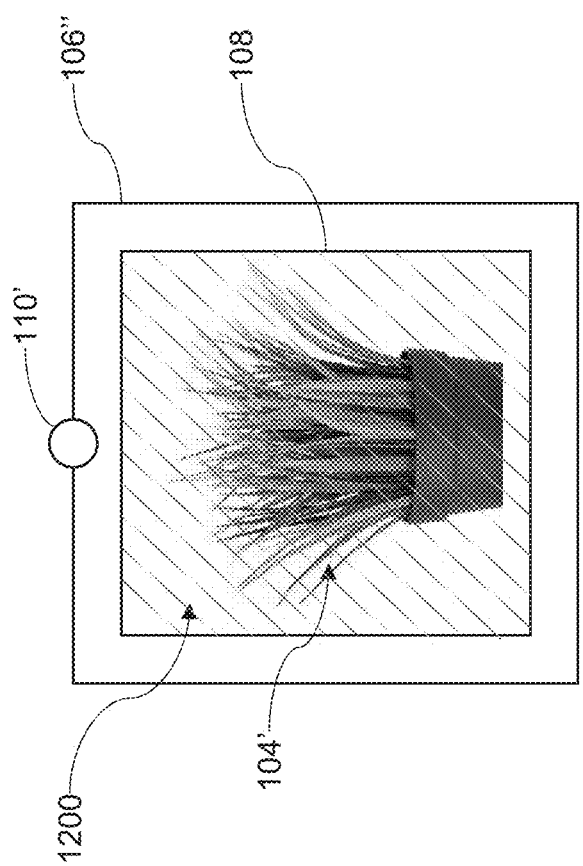
Figure 12C:
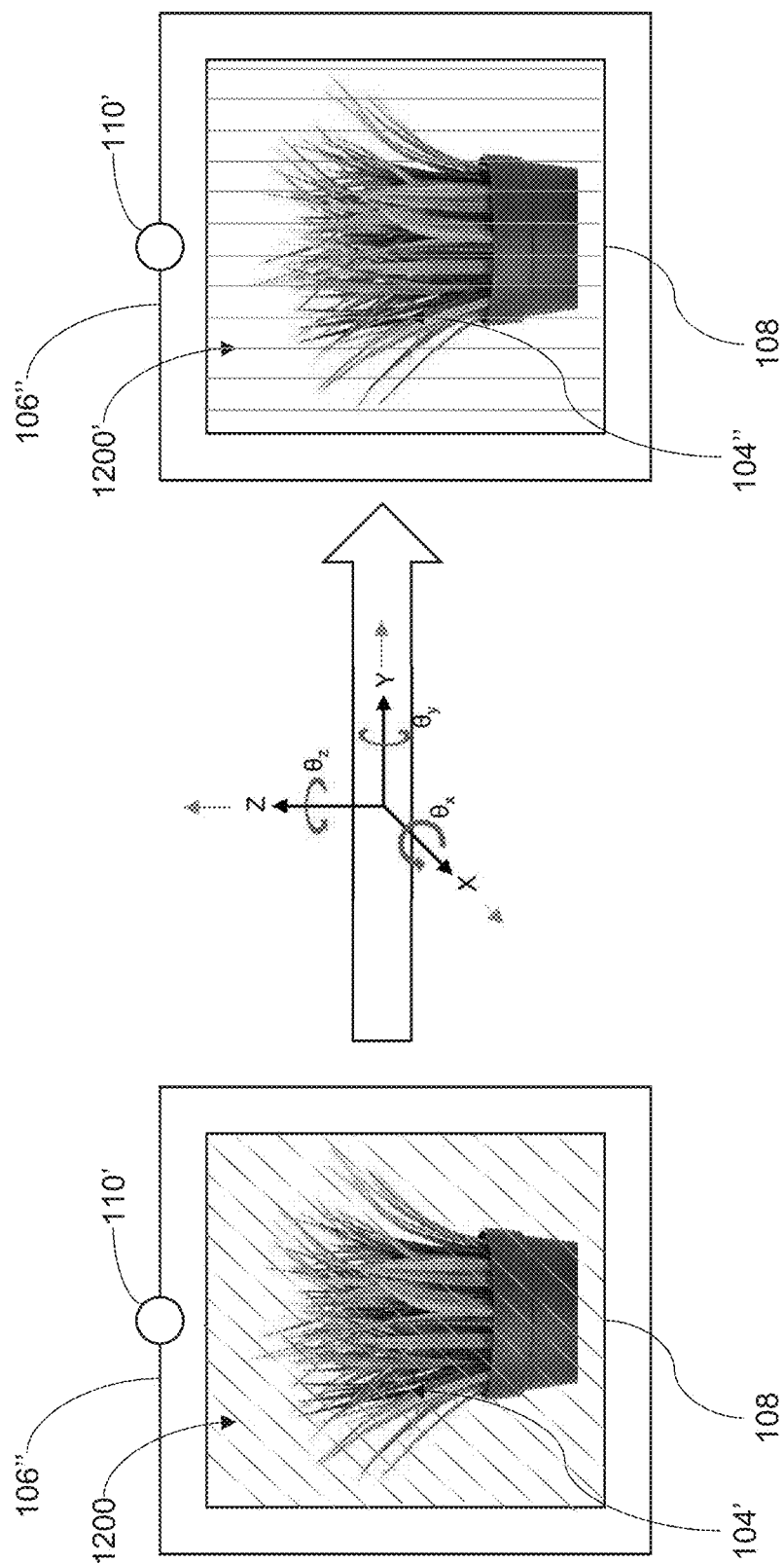

FIGS. 12A-12C show an example setup in which a human viewer uses a version of the FIG. 7 example device to view an object as if that object were located on the opposite side of a window, in accordance with certain example embodiments. FIG. 12A shows a user 102 looking "through" the device 106" as if it were a window, at the object of interest 104. The device 106" shown in FIG. 12A includes a 360 degree camera 110', and the field of view is primarily orthogonal to the device 106". However, using face tracking technology and rear image rendering techniques such as, for example, those disclosed herein, a proper perspective for the object of interest 104 nonetheless can be determined and displayed via the device 106". FIG. 12B shows the object of interest 104 being displayed on the display 108 of the device 106", except that it is modified to have a proper orientation reflective of the user's perspective and to take into account any shifts caused by the interposing of the "virtual window" between the user 102 and the object 104. The former modification is reflected in the change to the object 104, and the latter modification is reflected in the inclusion of the filter 1200. As will be appreciated from the above, the filter 1200 may change the coloration of the modified object of interest 104', provide reflection, etc.

FIGS. 12A and 12B show a static presentation of the user 102 and the electronic device 106". However, the user's perspective may change (e.g., if the user moves any part of the body), the device 106" may move, etc. Thus, image manipulations may be performed in real time, e.g., as shown in connection with FIG. 12C. The left side of FIG. 12C shows the initial view from FIG. 12B. However, a change may be caused by movement along any one more of the X, Y, and Z axes, and/or through rotation about any one or more of these axes. Thus, the display 108 may be updated to further modify the initially modified image of the object of interest 104' and display this further modified version 104". Moreover, because this six degree of freedom movement may trigger different properties of the window to become dominant, a different filter 1200' may be applied.

Figure 13:
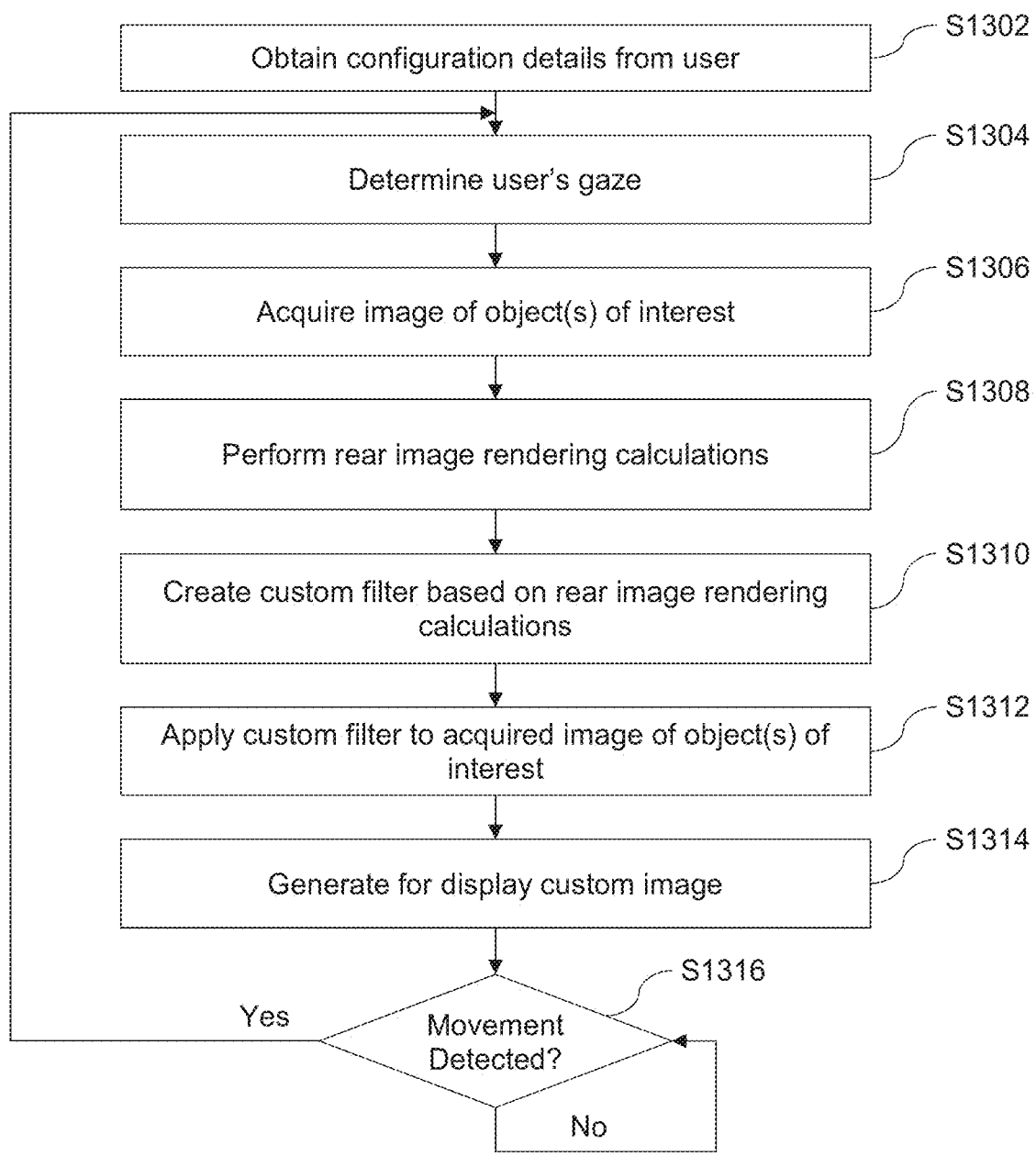
FIG. 13 is a flowchart showing an example process for controlling a version of the FIG. 7 example device to work with the FIG. 12A-12C example setup, in accordance with certain example embodiments.

FIG. 13 is a flowchart showing an example process for controlling a version of the FIG. 7 example device to work with the FIG. 12A-12C example setup, in accordance with certain example embodiments. Configuration details are obtained from the user in step S1302. The user's gaze is determined in step S1304. An image of the object(s) of interest is acquired in step S1306, e.g., using the rear (target-facing) camera of the device. Rear image rendering calculations are performed in step S1308. Optionally, front image rendering calculations may be performed, e.g., if images relevant to the particular use case are implicated. For instance, if reflection is "generated" by the virtual window, then front image rendering calculations may be performed as well based on an image captured by the user-facing camera of the device. In step S1310, a custom filter is created based on the rear image rendering calculations. In certain example embodiments, a separate filter may be generated to take into account front image rendering calculations if they are performed and/or a single filter taking both front and rear image rendering calculations may be generated. The customer filter(s) is applied to the acquired images of the object(s) of interest in step S1312. The custom image, which is an AR overlap taking into account the virtual window, is generated for display in step S1314 and may be presented to the user via a display of the electronic device. The approach may be static or dynamic in different example embodiments. As shown in FIG. 13, the approach is dynamic such that relevant portions of the process are repeated if movement is detected in step S1314.

Figure 13A:
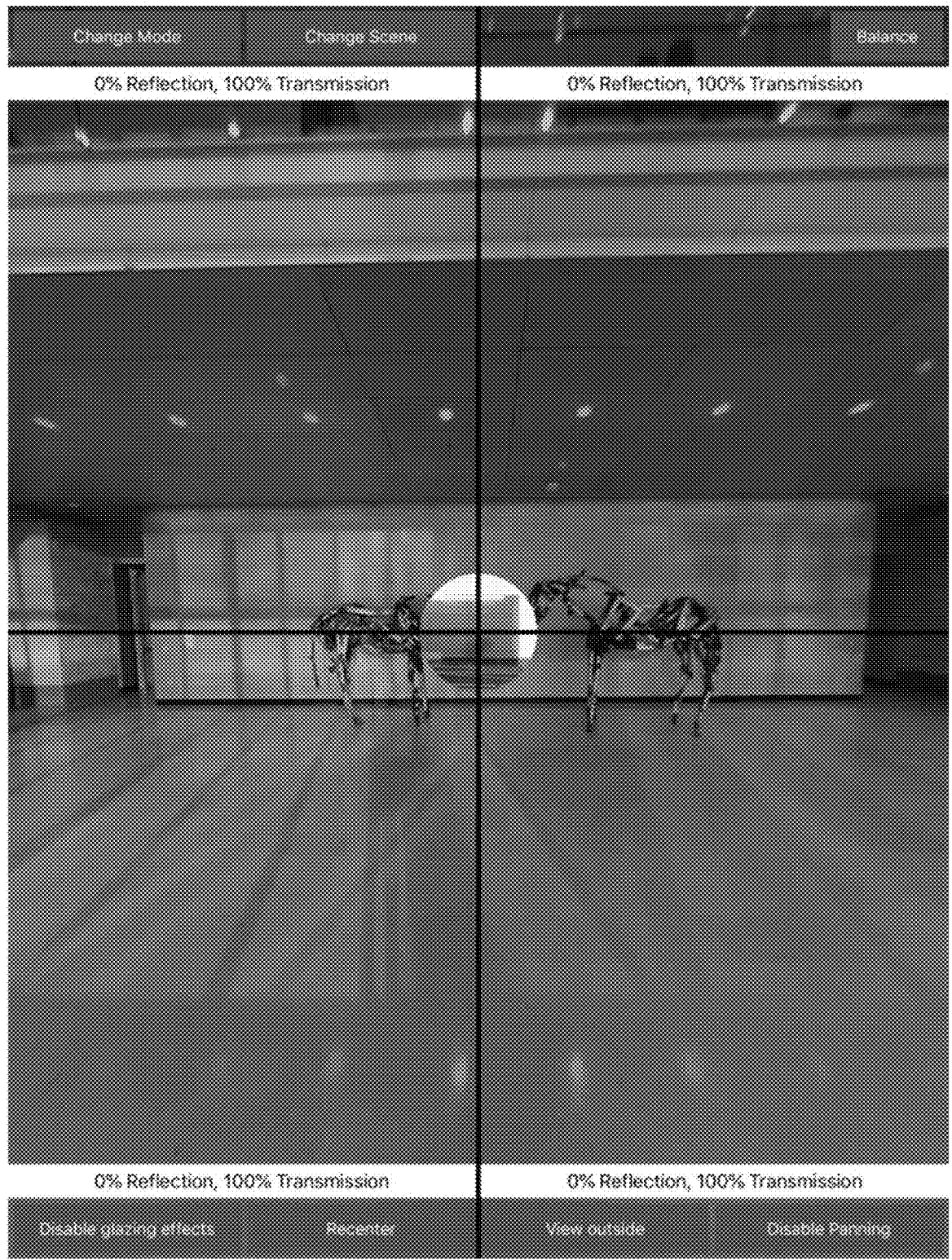
FIGS. 13A-13O are screenshots of an example mobile application configured in accordance with certain example embodiments.
Figure 13B:
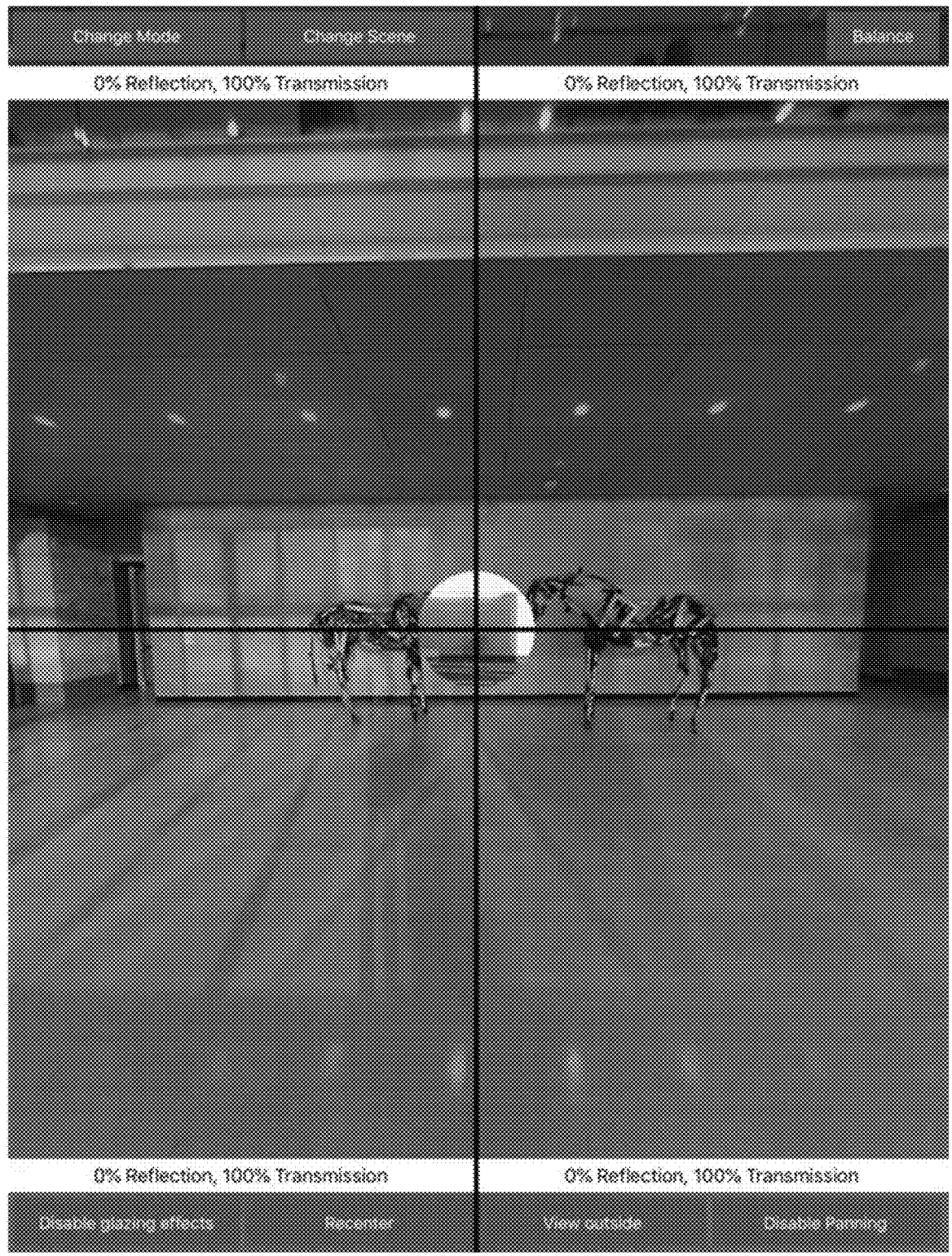
FIGS. 13P-13S are screenshots of example swatch selections in accordance with certain example embodiments.
Figure 13C:
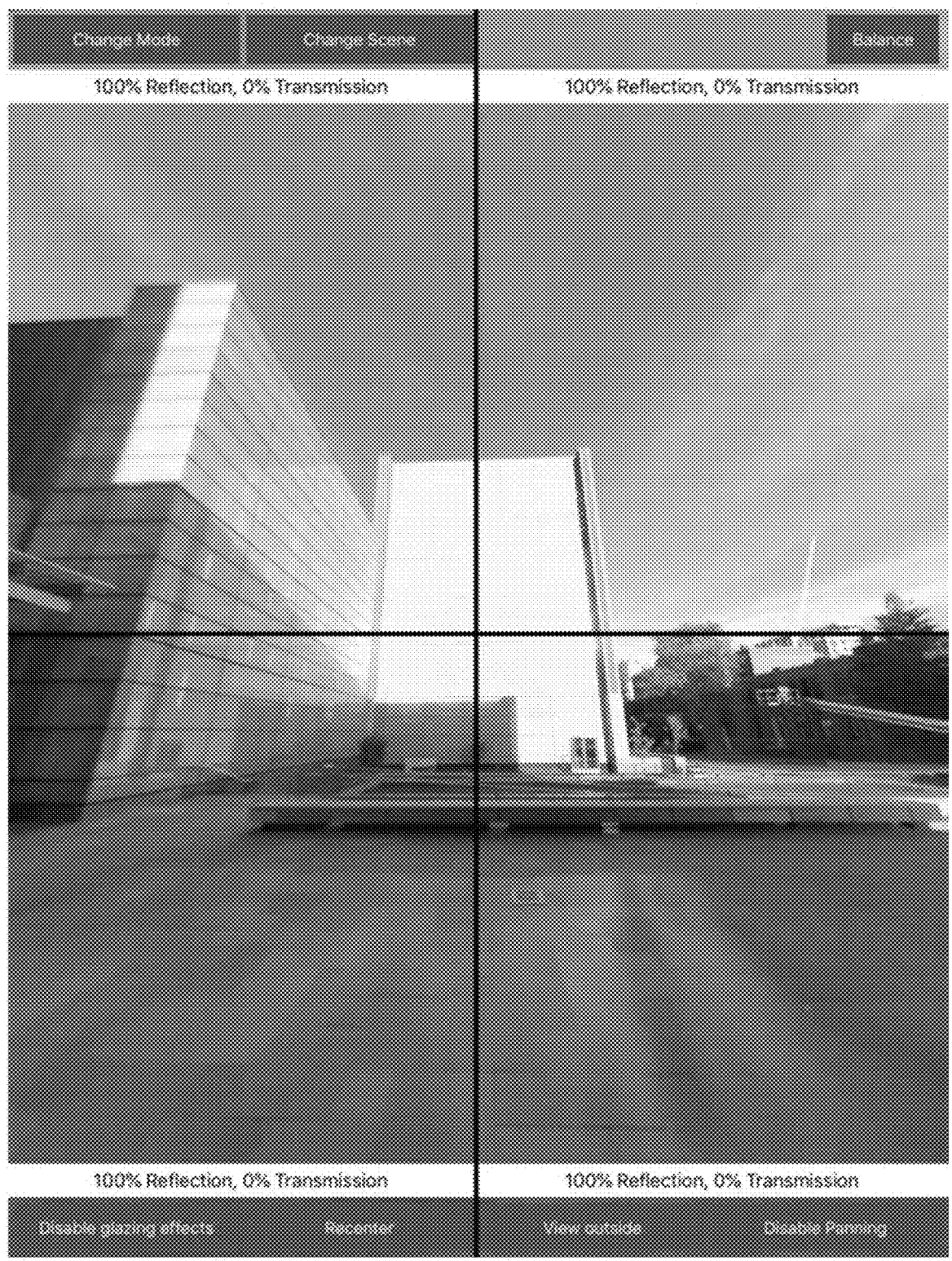
Figure 13D:
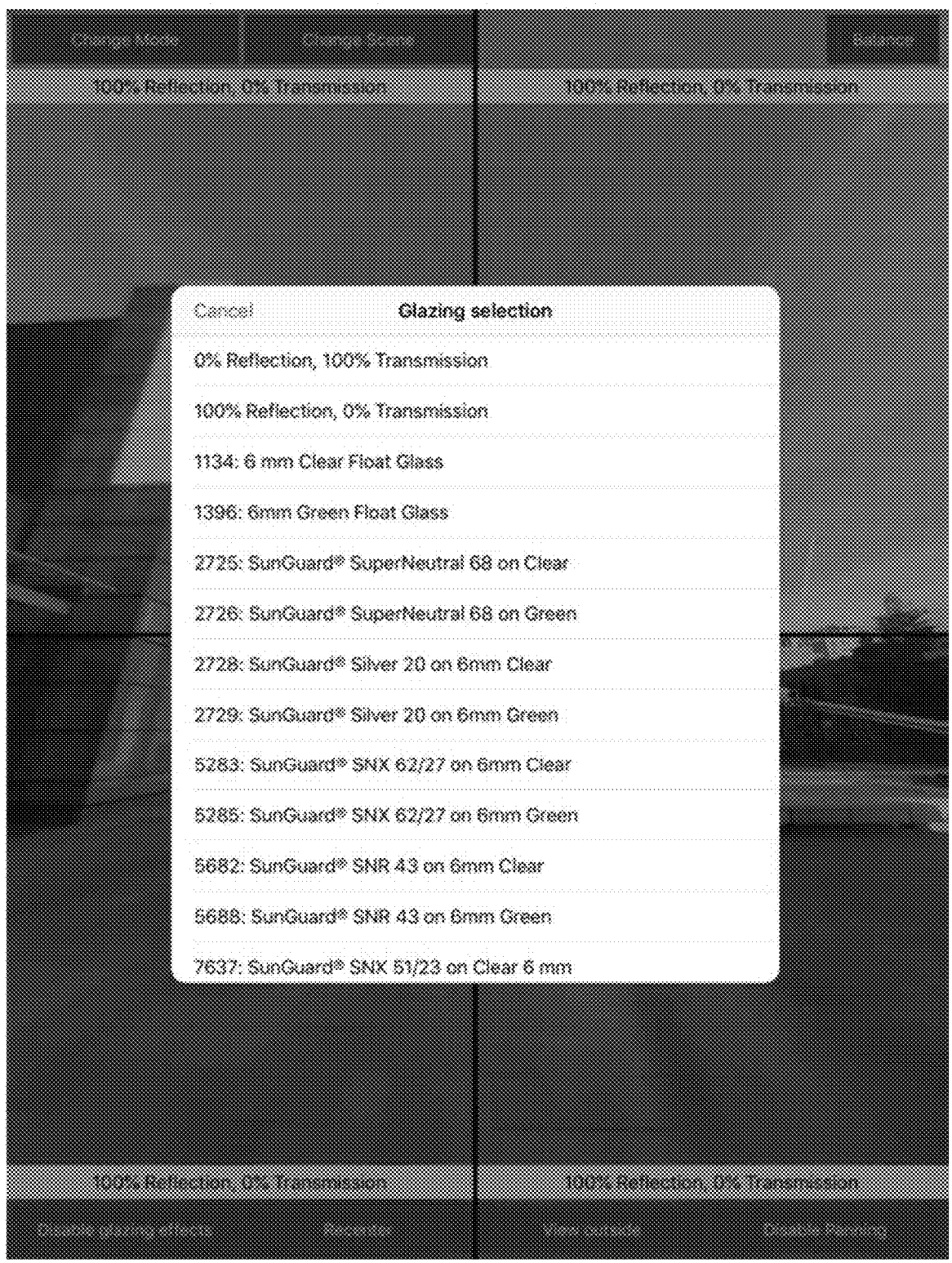
Figure 13E:
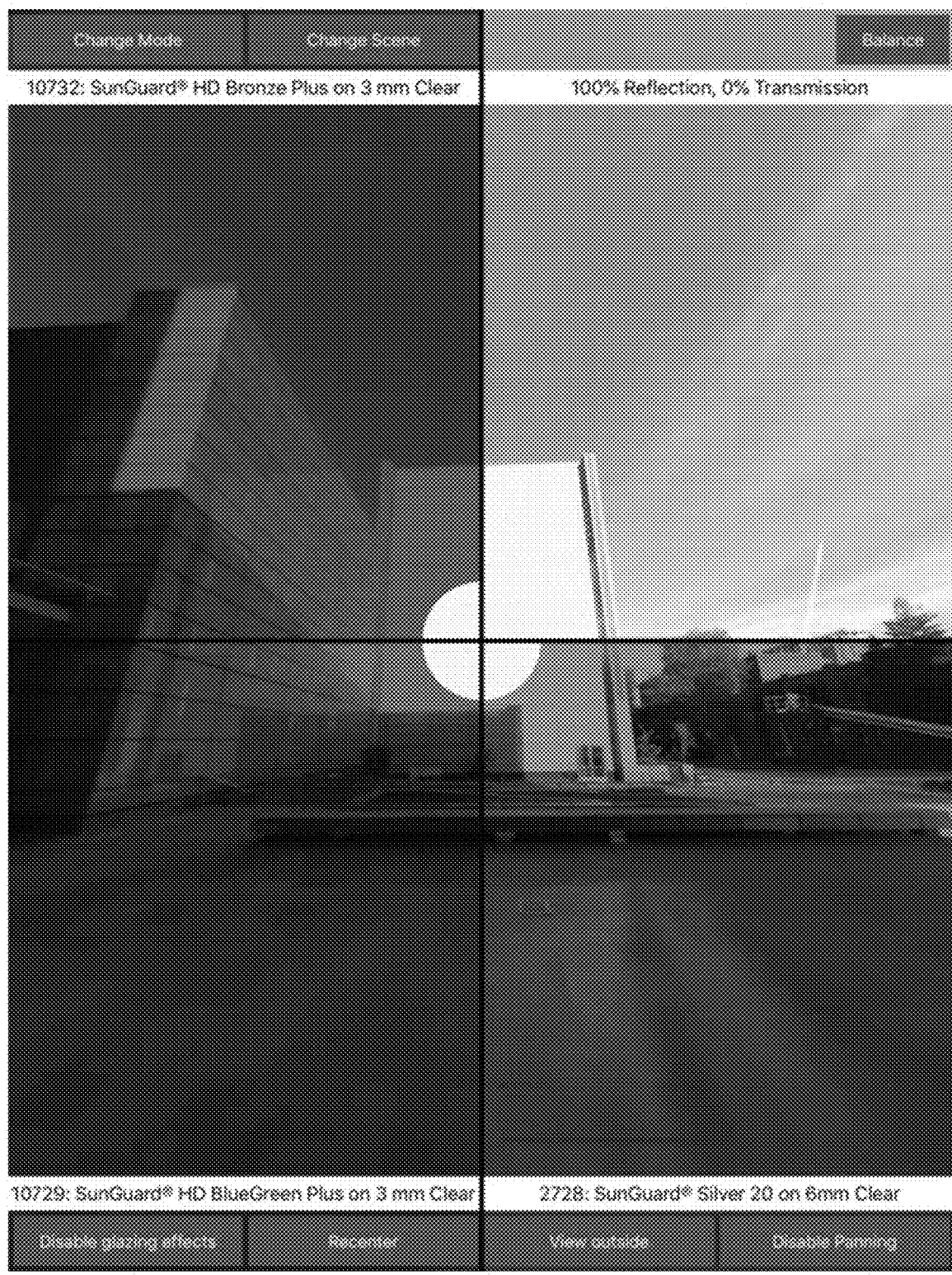
Figure 13F:
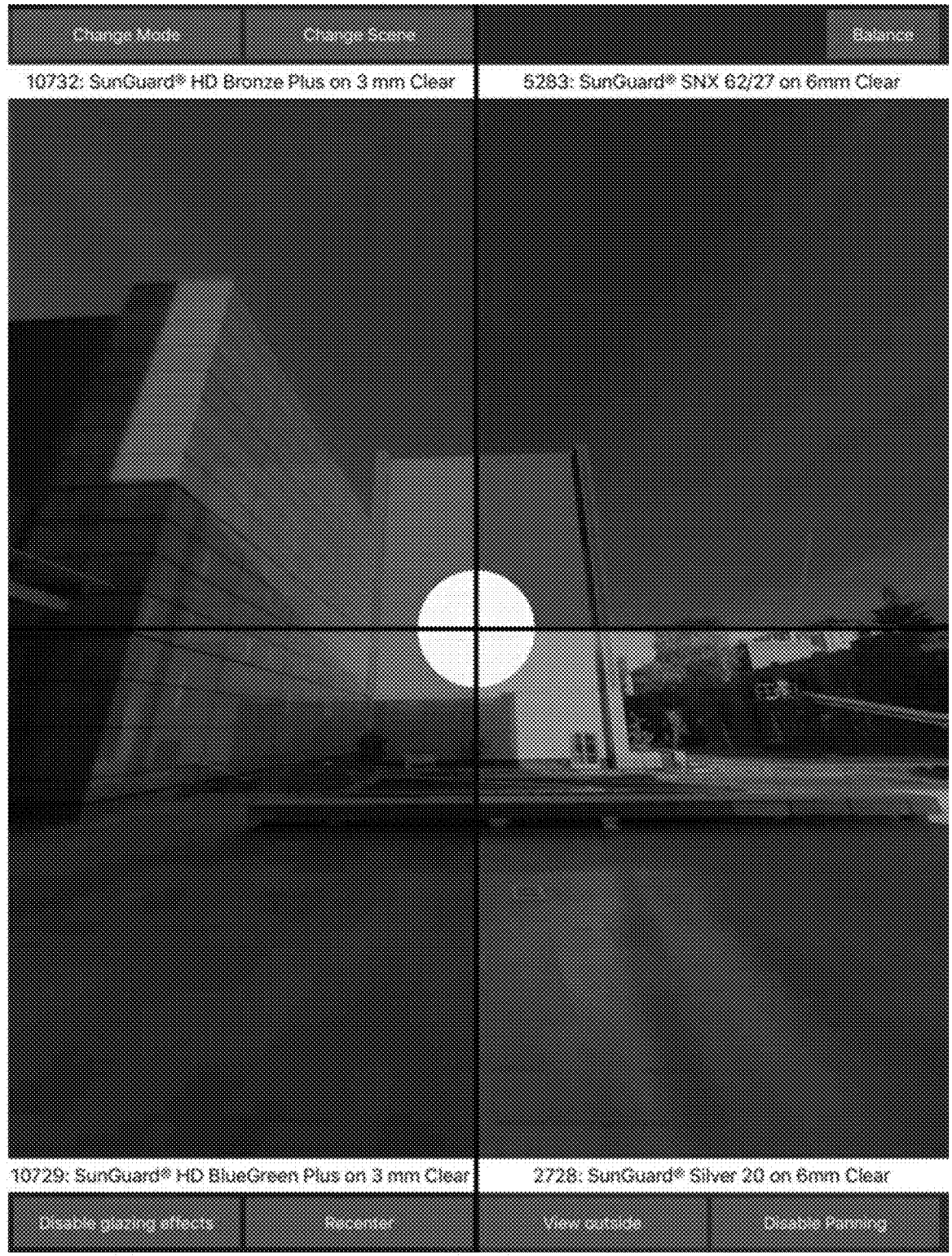
Figure 13G:
Figure 13H:
Figure 13I:
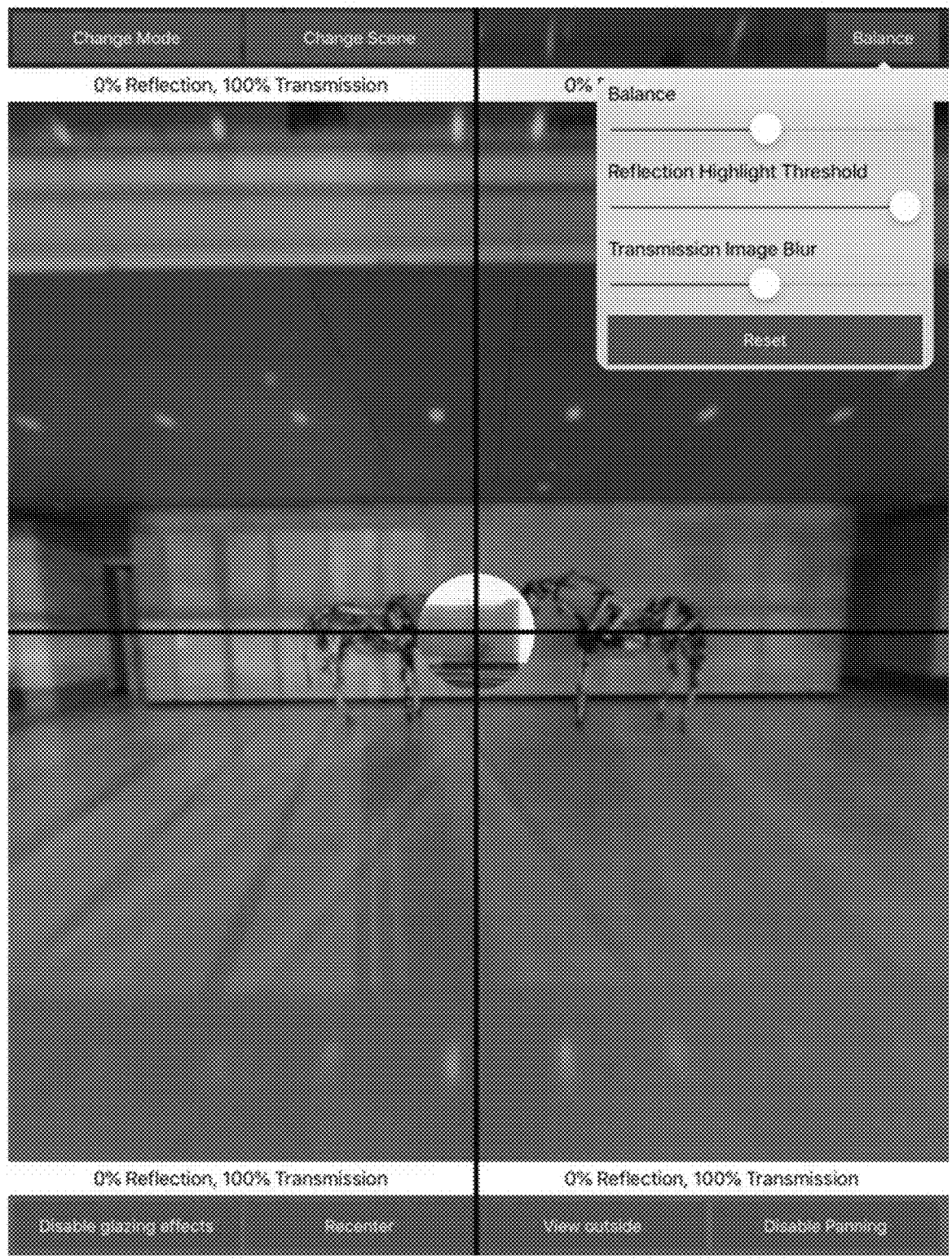
Figure 13J:
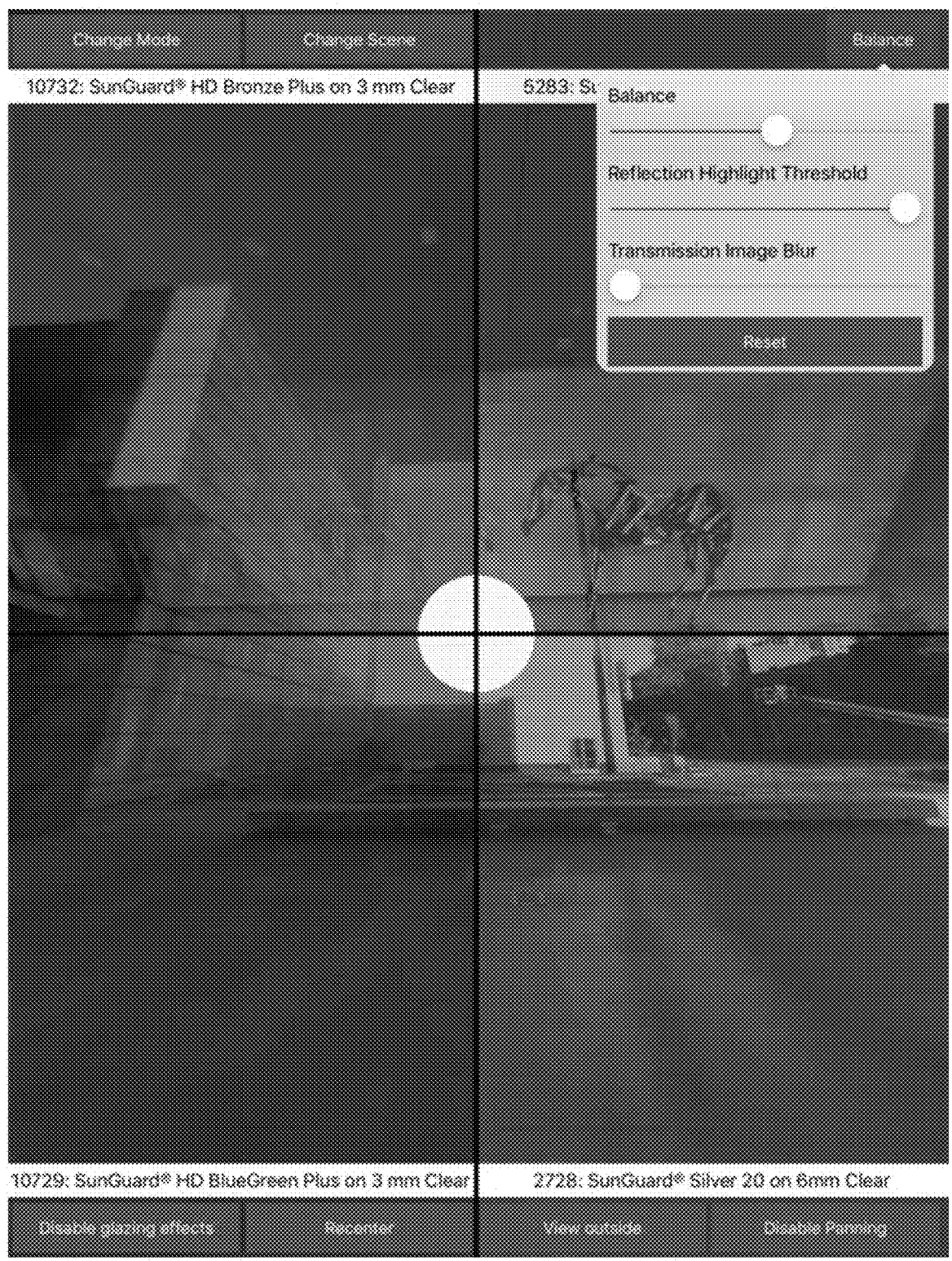
Figure 13K:
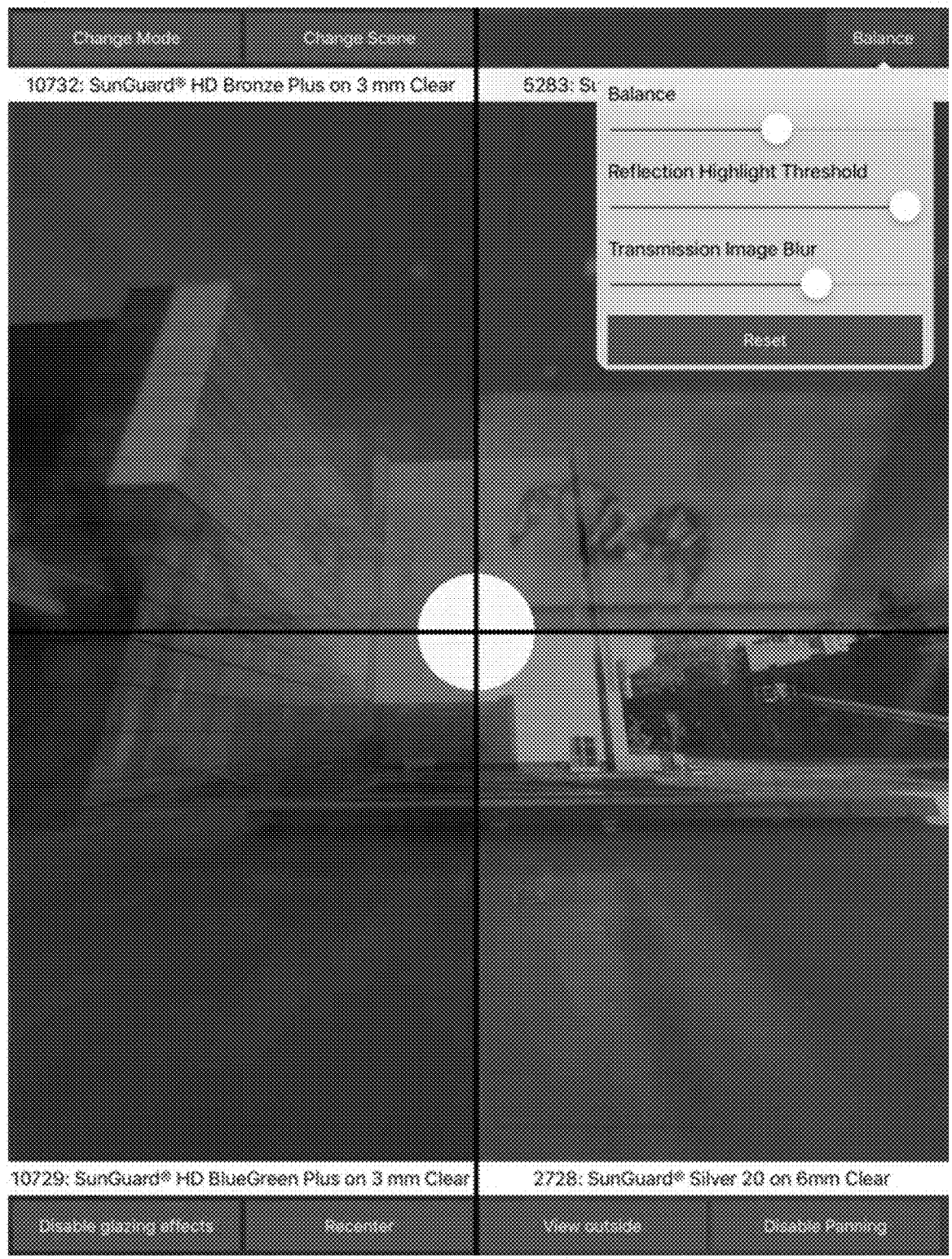
Figure 13L:
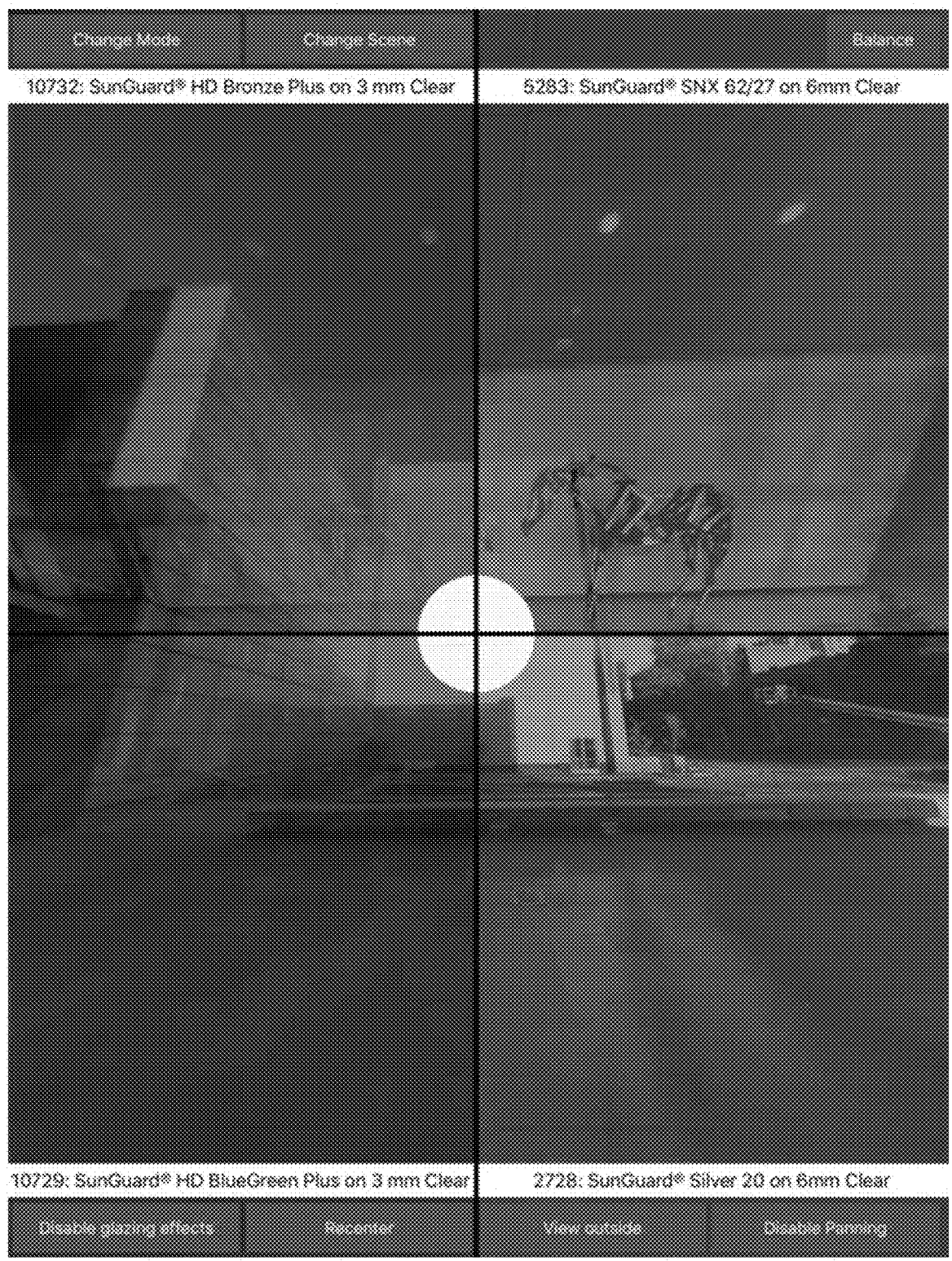
Figure 13M:
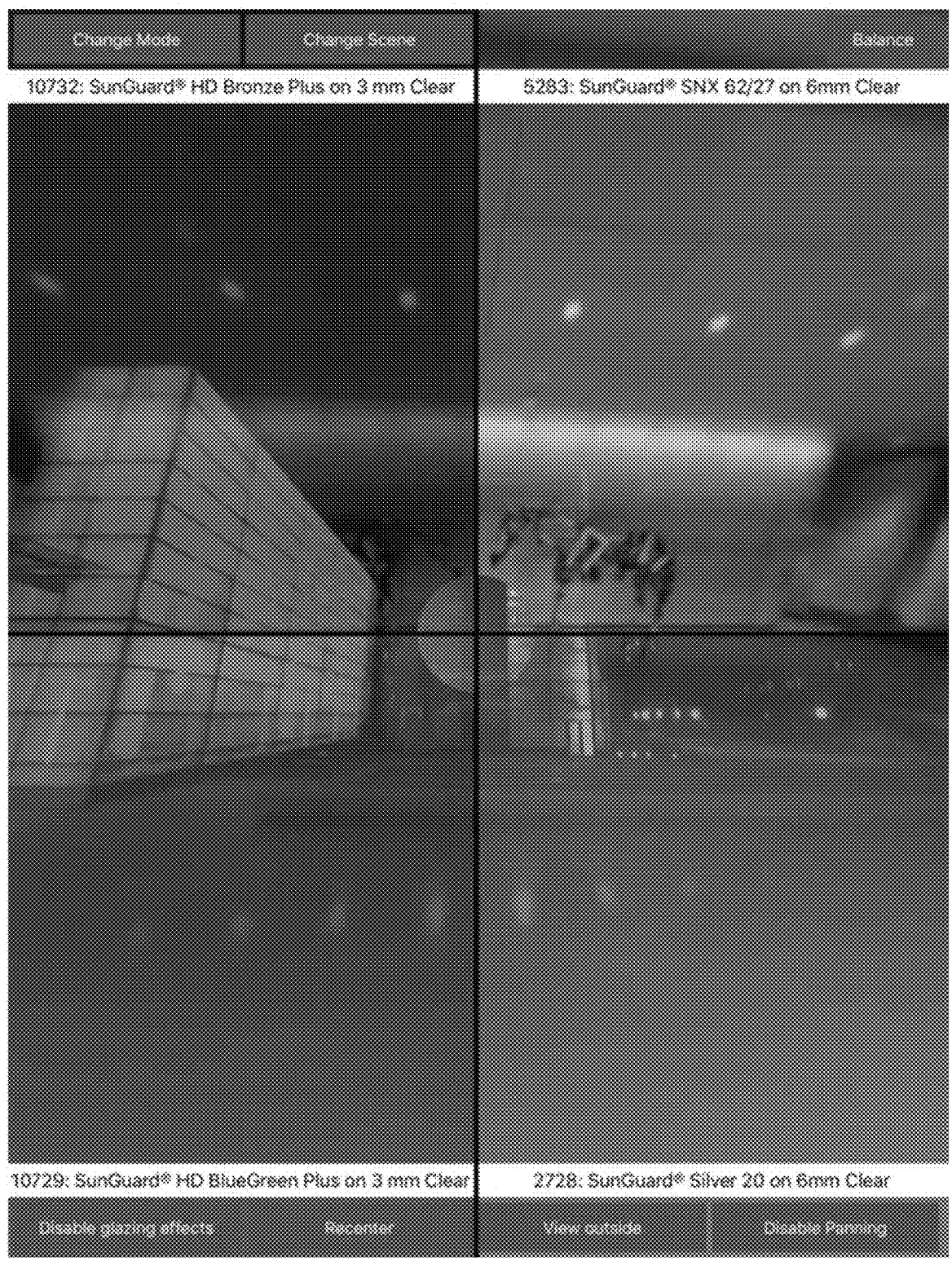
Figure 13N:
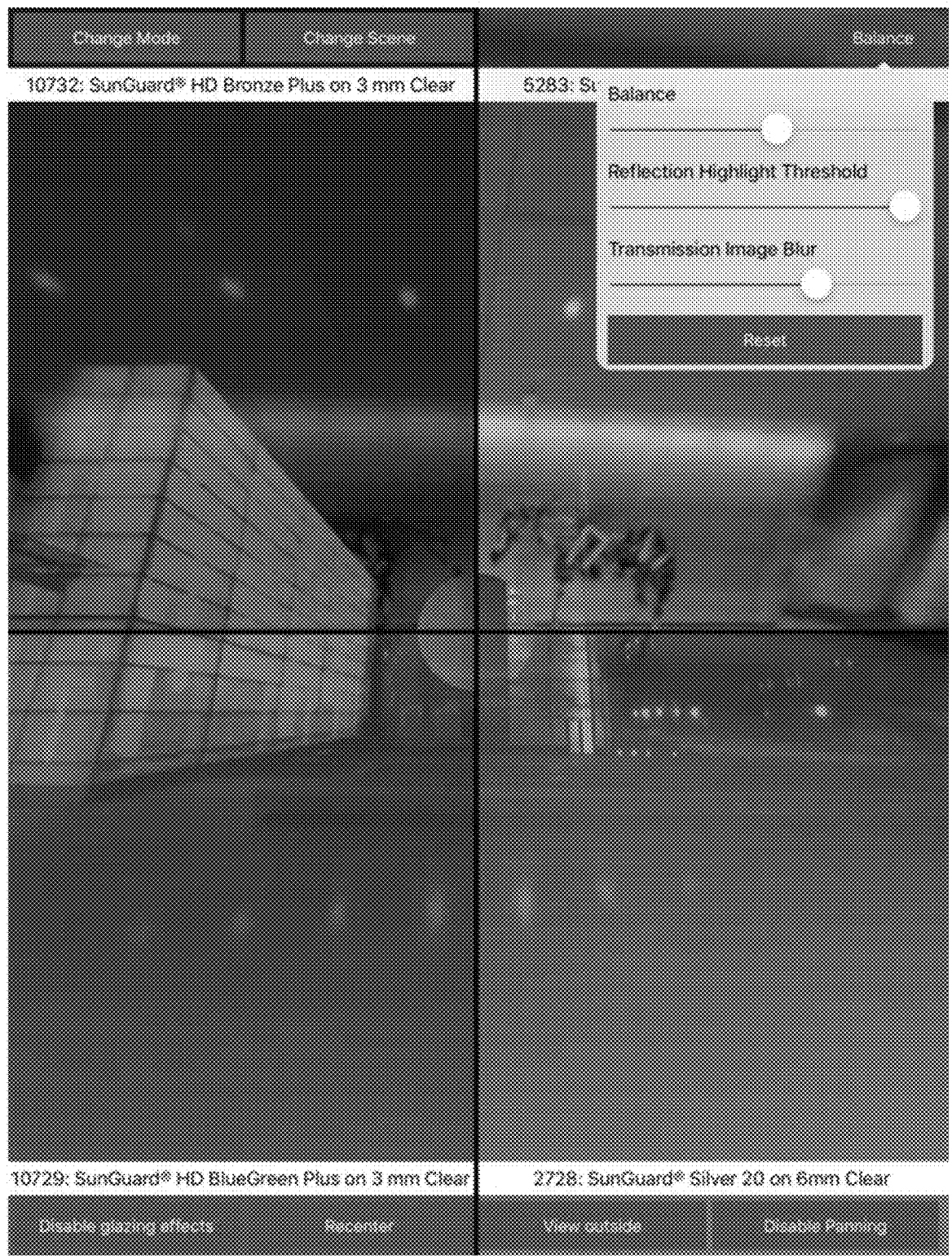
Figure 13O:
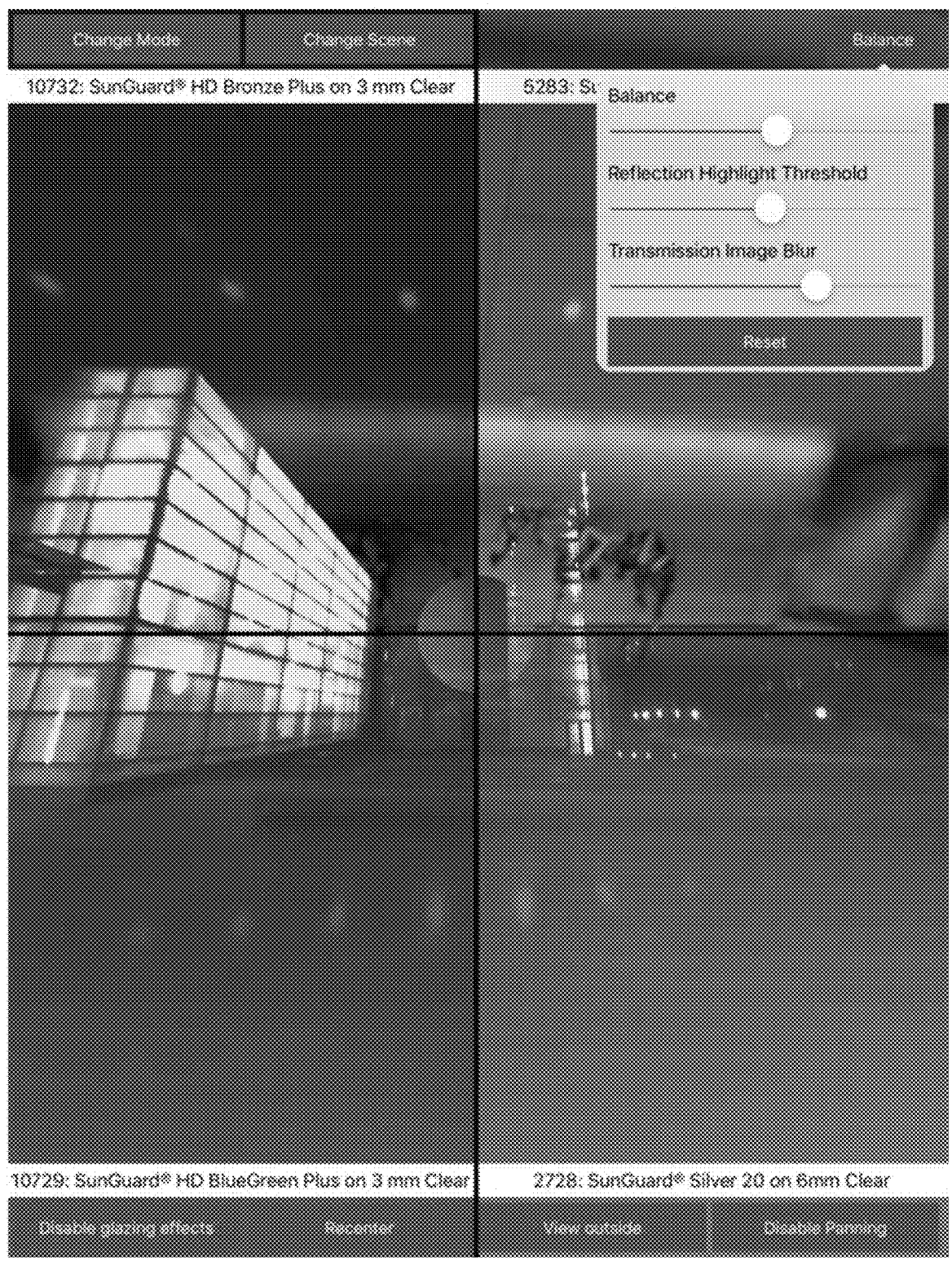

FIGS. 13A-13O are screenshots of an example mobile application configured in accordance with certain example embodiments. FIG. 13A is a screenshot showing a scene representing a user looking from the outside of a building to the inside of the building through a simulated window. The screen is divided into a number of different areas, which enable multiple windows to be simulated at the same time. In the FIG. 13A example, there are four distinct areas. Each of these different areas can be set to show the qualities of a different product as well as certain other tunable parameters (e.g., 0-100% transmission and 100%-0% reflection, etc.). An optional central area (e.g., the circle shown in the center of the four quadrants) shows 100% reflection and 0% transmission as a constant reference. The central area overlaps the different areas so that the colors and other optical properties can be quickly compared to a constant (e.g., neutral) reference.

It will be appreciated that the scene shown in FIG. 13A can be obtained from a picture taken by the device, updated in real-time based on video captures, retrieved from a store of predefined scenes, etc. In certain example embodiments, a fisheye or other type lens on the user-facing side may be used to track the position of the view, display dynamic scenes and/or pre-photographed scenes that are dynamically updatable based on changes in position/orientation of the user relative to the device, etc. In scenarios where a pre-photographed scenes are used, there may be no need to use an object-facing camera and/or lens.

One or more inertial sensors such as an accelerometer, gyro, and/or the like, may be used to detect changes in orientation of the device. In certain example embodiments (e.g., where a static or pre-recorded image is used), tools such as, for example, Apple's AR Kit (which uses both gyros and image tracking) may be used to obtain get highly accurate spatial positioning of the device.

It will be appreciated that the camera tracking version (e.g., with no gyros used) of a mobile application could be implemented for laptops, desktop computers, large screens mounted on a wall (e.g., like the Microsoft surface hub), etc. In general, it will be appreciated that the example application described in connection with these example screenshots may be provided on any suitable electronic device including, for example, a smart phone, tablet, laptop, desktop, video wall, and/or the like.

FIG. 13B is contrastable with FIG. 13A, in that the former shows the reflected scene (in isolation) from the same position. FIG. 13C modifies (attenuates) the FIGS. 13A and 13B scenes in view of the spectral properties of the material and thus illustrates the combined (summed) "final" experience. The central area appears to be invisible because all of the quadrants are displaying the same content as it in this example.

As noted above, different products may be simulated in different areas of the display. For example, tapping anywhere in a quadrant may produce a list of pre-configured options that may be selected by a user to change the appearance of that quadrant to simulate the selected option, e.g., as shown in FIG. 13D. The FIG. 13D example screenshot includes different kinds of bare glass, different coatings on different glass types and different glass thicknesses, etc. It will be appreciated that the list of products and configurations shown in FIG. 13D is provided by way of example and without limitation. Different coatings and/or configurations provided by the assignee and/or others may be selectable in different example embodiments. In certain example embodiments, a user may specify the parts for the product to be configured, e.g., in terms of the type of product (e.g., bare glass, monolithic coated article, insulating glass (IG) unit, vacuum insulating glass (VIG) unit, laminated product, etc.), substrate type (e.g., clear float glass, green glass, etc.), substrate thickness, coating type (e.g., different example low-E, antireflective, UV blocking, "bird friendly", and/or other coatings), coating location(s) (e.g., low-E on surface 2 and/or 3 of an IG unit, etc.), and/or the like. The FIG. 13E screenshot shows three glazing samples and a non-modified reflection with 100% reflection. This example visualization illustrates what a coating and glass combination would look like if placed in front of a black background, reflecting the presented scene.

FIG. 13F includes four products showing the isolated reflection of a scene during the day. The scene can be changed by pressing the button at the top, e.g., enabling the user to select a new location (e.g., a different scene, a different orientation towards the building, etc.), and/or a different lighting condition. FIG. 13G includes the four products showing the isolated reflection of a scene at night.

FIGS. 13H and 13I allow different transmission options (e.g., relating to isolated tint and blurring) to be set. FIG. 13H has the balance option minimized, enabling the tint to be isolated, since no reflection is visible. FIG. 13I, however, shows the image with the transmitted image isolated and blurred. The visual complexity of the reflection and transmission composite can be reduced, e.g., by blurring one of those elements. The slider bars (or other user interface elements in other example embodiments) may be used for these and/or other purposes.

When looking at glass in the real-world, it is seen as a composite of a scene reflected in the glass and a scene transmitted through the glass, with the colors of each being modified by the base material and coating (e.g., in the case of a coated article). FIGS. 13J and 13K allow different reflection options (e.g., sharpness and blurring) to be set. FIG. 13J, for example, demonstrates both transmission and reflection, with an in-focus transmitted image. FIG. 13K demonstrates both transmission and reflection, with an out-of-focus transmitted image. This effect may be especially useful when motion is involved, e.g., enabling a more natural viewing experience to be replicated.

Multiple effects may be combined. For example, transmission and reflection compositing may be combined with day and night views. In this regard, FIGS. 13L and 13M show the compositing in day and night, respectively. Similarly, isolation and highlighting thresholds may be specified, e.g., as shown in FIGS. 13N and 13O. FIG. 13N shows standard output from the attenuation algorithm based on the spectral measurements of each sample. Information may be lost when transitioning from a real-world scene to an sRGB (or other) image as a result of one or more of exposure, dynamic range, format lossiness, and/or the like. This may in some instances result in a noticeable amount of intensity data being lost and/or compressed, potentially resulting in an overall "dimming" of the image. FIG. 13O shows how a brightness limit may be used as a threshold to retain the specular highlight behavior that is present in real-world viewing.

As indicated above, dynamic swatch features, involving selection of a substrate, coating, or combination thereof, may be implemented in certain example embodiments. In general, swatches are small visual examples of product aesthetics shown individually next to product performance details or in an array of different product for easier aesthetic comparison. Traditional glass swatches are sometimes provided on marketing materials and are typically created by photographing actual product in a studio, or alternatively are represented as a solid field of color based on a single color value (e.g., pantone colors, RGB/CMYK values, etc.). Glass products are often represented by two swatches, one being an isolation of the transmitted color, and the other being an isolation of the reflected color.

FIG. 13P is an example set of swatches. Transmitted color swatches (typically associated with the upper selection) are a good analog for putting a piece of glass over a white piece of paper. This is intuitive for architects and other designers, and enables them to get an idea of what the interior of a building might look like given a particular glass selection. The range of color effects in transmission is limited with static swatches, however. With the swatches shown in FIG. 13P, for example, the darkness of the swatch is representative of a percentage of light transmission and the color. Reflected color (typically associated with the lower selection) generally are much harder to make intuitive because there are no real standard office objects that architects and other designers reflect in glass to evaluate the color. Example scenarios for reflection involve an overcast sky or partially cloudy afternoon sky, but such scenarios introduce their own color biases that are not present with reflected white paper. Unfortunately, simply reflecting white is not very informative with respect to how a coating might look on a building.

Certain example embodiments improve upon these techniques by creating simulated glass swatches. That is, certain example embodiments involve swatches created digitally, without the need for photographing actual products and/or the limitations of using a single color value. The glass product spectrum curve can be used to convert any solid color or any number of images (typically 1-2 will suffice) into a rendering of glass isolated transmission, isolated reflection, or a composite of both.

In certain example embodiments, the glass swatches can be static or dynamic. It sometimes can be difficult to extrapolate from static swatches what a given product's actual aesthetic on a building will be, because glass color is dependent on (among other things) what is being reflected in the environment, and the environment conditions are subject to flux.

To help address this issue, certain example embodiments thus may use static swatches and/or dynamic swatches. With respect to the latter, for example, because certain example embodiments use swatches that are generated digitally, it becomes possible to use motion and/or video to illustrate the kind environmental flux that glass demonstrates in the field. This allows viewers to get a better idea of how a variety of colors/scenes would look in transmission, reflection, or the sum of both for any particular glazing option. Motion effects can be triggered in a variety of ways, from accelerometers and/or gyroscopes on mobile devices, to touches/clicks or swipes/drags on stationary machines, etc. Pre-recorded or "canned" videos can run constantly or initiate while scrolling through a page. Many other user interface options are also possible in different example embodiments.

Figure 13Q:
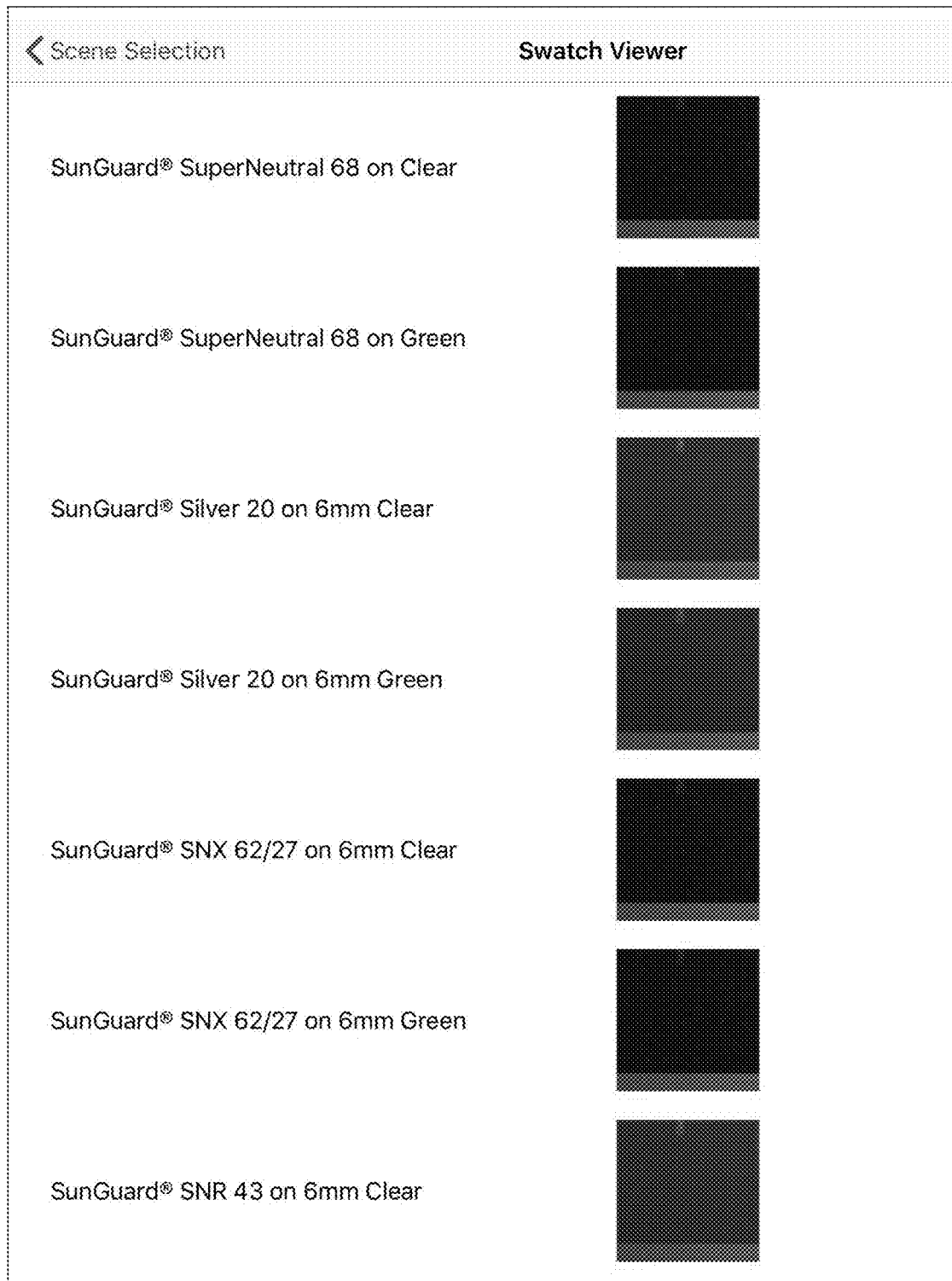
Figure 13R:
Figure 13S:
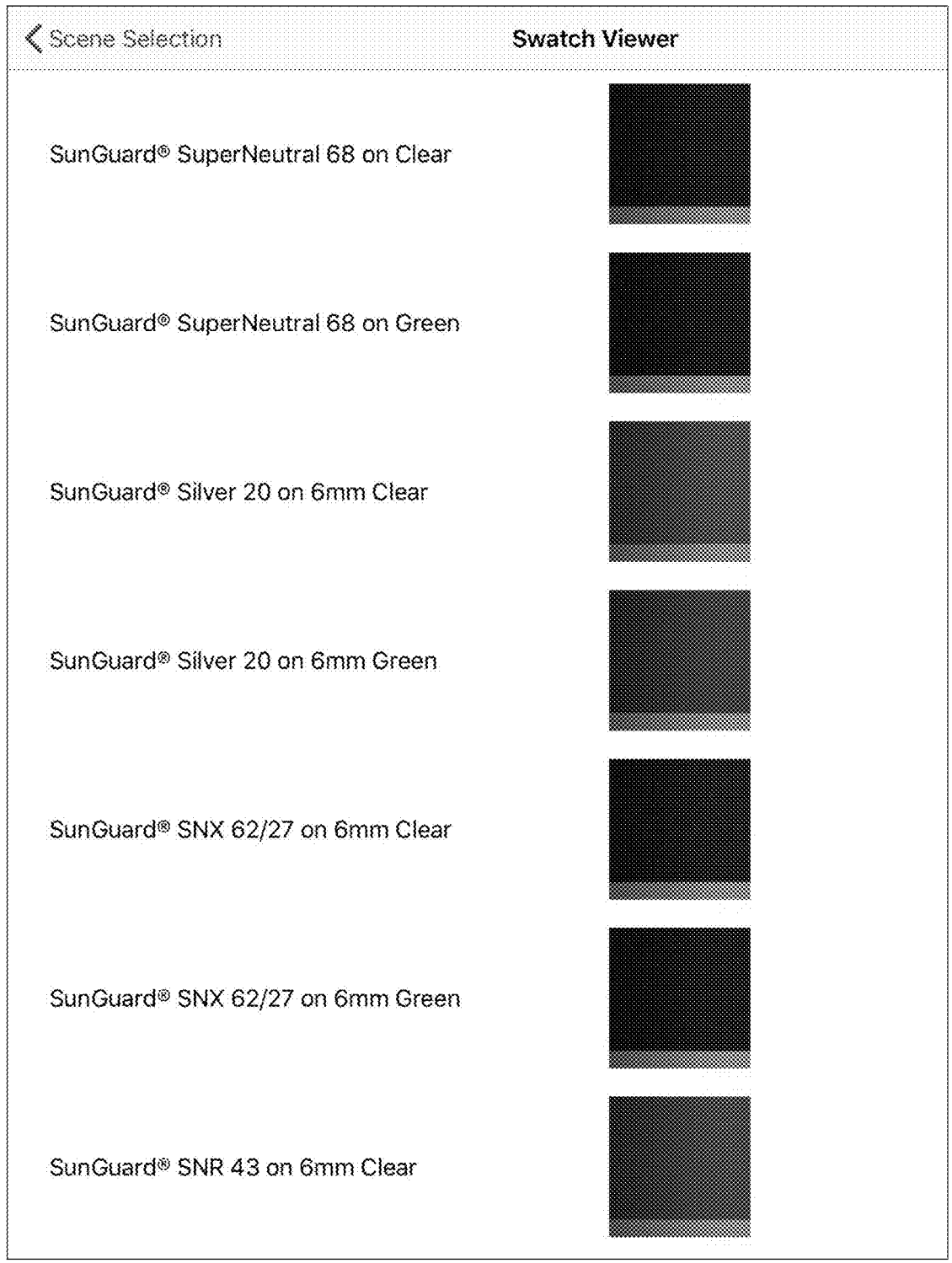

FIGS. 13Q-13S show swatches for a number of different products in accordance with certain example embodiments. The products are the same across these drawings, but changes are apparent. These changes are driven by the tilt of the device.

It will be appreciated that the example techniques described herein may be used to enable design architects, students, specifiers, and/or others to obtain quick visual feedback concerning proposed designs, to quickly and easily contemplate different designs, and/or the like. Advantageously, instead of having to maintain a large collection of samples, users in certain example embodiments can quickly and easily see an up-to-date listing of products that can be grouped and sorted by meaningful metrics, compare predefined products, generate custom products, and order a specific sample tailored based on an intelligent selection made with use of the application running on the device. Reusable and reconfigurable IG unit products, for example, can be rapidly prepared once ordered. In certain example embodiments, the application running on the electronic computing device may be integrated with a remote ordering system, enabling users to initiate orders directly from the application once selections have been made.

Figure 14A:
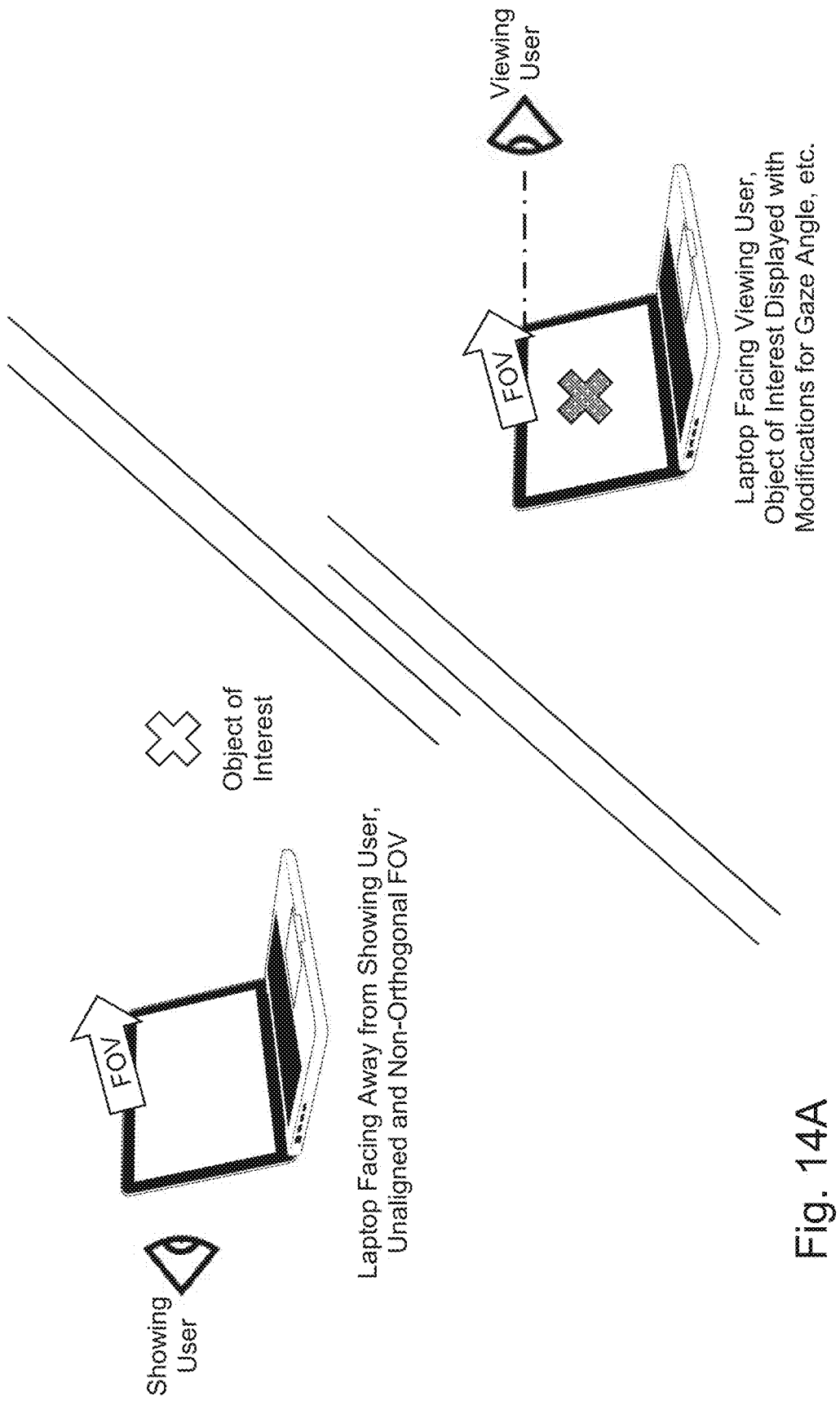
FIGS. 14A-14C are different example setups showing a human viewer using a version of the FIG. 7 example device for different perspective sharing applications, in accordance with certain example embodiments.
Figure 14B:
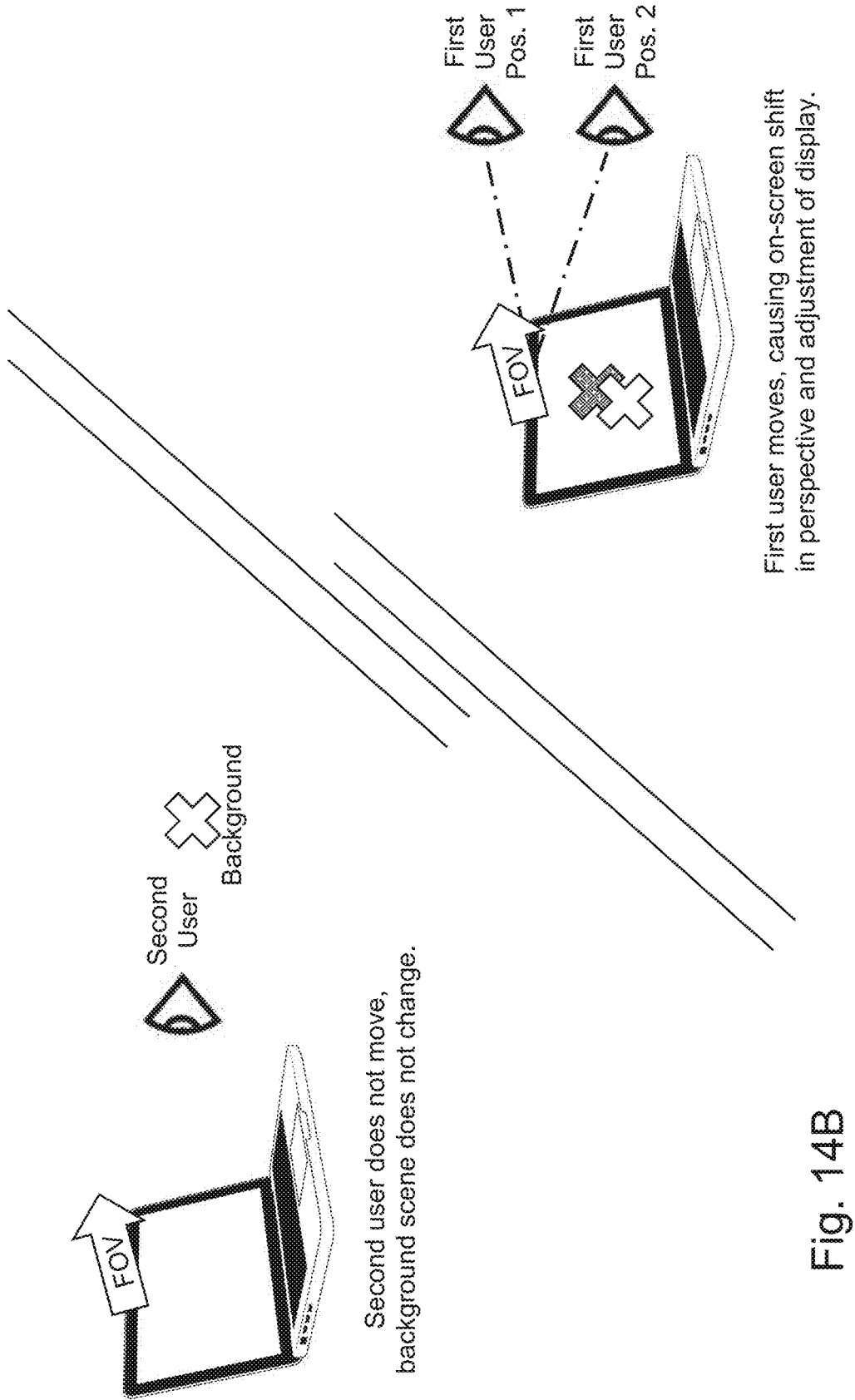
Figure 14C:
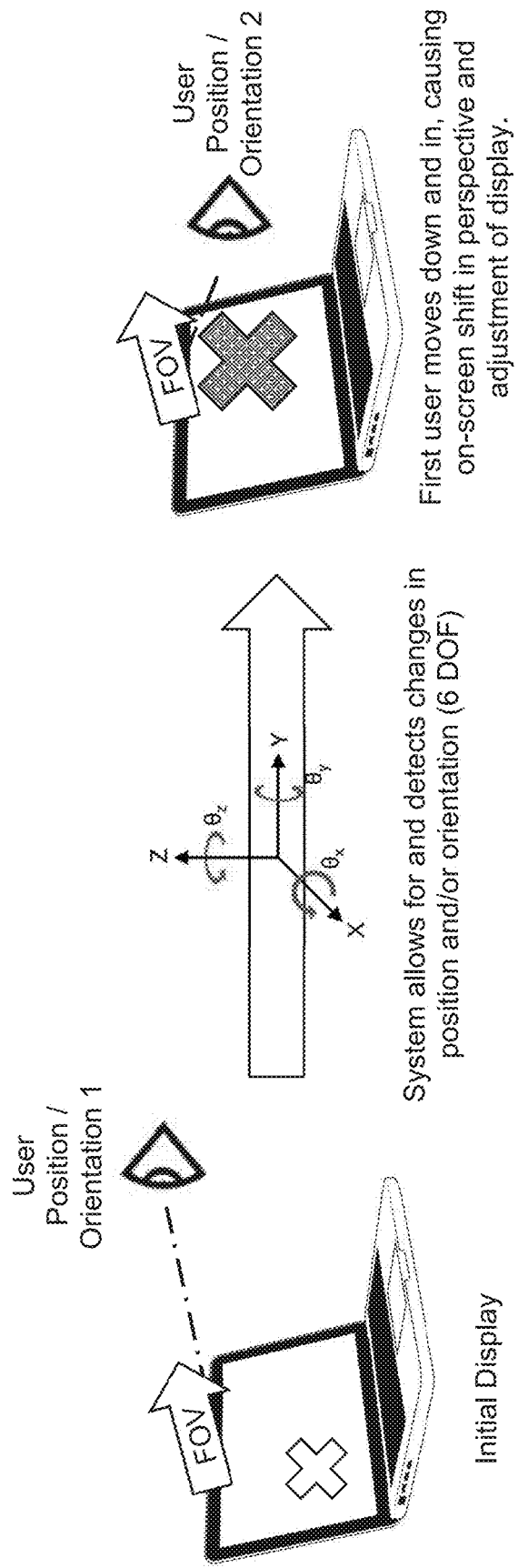

Although certain example embodiments have been described as being useful for glass/window simulation, it will be appreciated that the example techniques described herein have the potential for applicability in a wide variety of different applications. For instance, a first suite of additional or alternative applications may be thought of as being "perspective sharing" applications. These applications do not necessarily require AR information to be presented along with the perspective-dependent video stream but nonetheless can benefit from taking into account different perspectives gathered by the 360 degree view camera(s). In this regard, FIGS. 14A-14C are different example setups showing a human viewer using a version of the FIG. 7 example device for different perspective sharing applications, in accordance with certain example embodiments. An example video conferencing scenario can makes use of the technology herein, in accordance with an example embodiment. Sometimes, one participant in a video conference will want to engage in "show-and-tell" which, in this instance, oftentimes involves physically or virtually rotating a laptop, camera connected to a desktop, smart device, or the like, so that one or more other participants can see what is being discussed. In other words, on video conferencing calls that use handheld mobile devices or the like, there frequently is a "show-and-tell" moment where one person virtually rotates an electronic device by switching on the target-facing camera in order to share something from that person's surroundings with the other person(s). Currently, this perspective sharing is limited to the orthogonal orientation of the device's cameras, which can limit the intimacy of the shared experience, result in a stilted mechanical feeling, seem non-organic and/or non-lifelike, etc. Using the example techniques disclosed herein, this "show-and-tell" moment can be made to be more like using an artist's view finder, e.g., where one holds a window mask out into the scene and compose the view, particularly where there is a virtual rotation of the device. This may enable the moment to be shared more through the showing user's perspective. For example, once the showing user reorients the electronic device and/or specifies the opposite camera for use, the showing user can frame the scene to be shown. The orientation alternatively or additionally can be adjusted, for example, based on the perspective of the viewing user. Thus, if the viewing user moves his/her body, changes his/her eye-line, etc., the image processing techniques disclosed herein can be applied to render an image that seems more real to the viewing user. In this way, the object can be presented to the viewing user in a manner appropriate for the viewing user's perspective, even if it is not framed well by the showing user. In certain example embodiments, if the showing user's device is equipped with a target-facing camera, similar techniques may be used to identify where that user is located and display an image of the showing user's face on the viewing user's device, with that image being adjusted to take into account the field of view of the target-facing camera and the position of the showing user's face relative to it. It will be appreciated that this description pertains mainly to a virtual rotation. However, the same or similar techniques can be applied with respect to a physical rotation, e.g., in the event that the electronic device has a single camera. In this regard, FIG. 14A involves an example video conferencing scenario that makes use of the technology herein and involves a physical rotation, in accordance with an example embodiment.

Figure 15B:
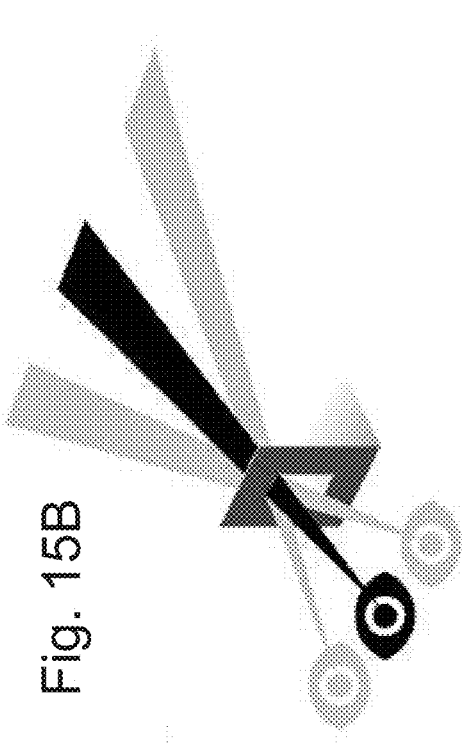
FIGS. 15A-15D help show the "natural behavior" when viewers block scenes in front of them, as is related to the "show-and-tell" scenario that may make use of certain example embodiments.
Figure 15D:
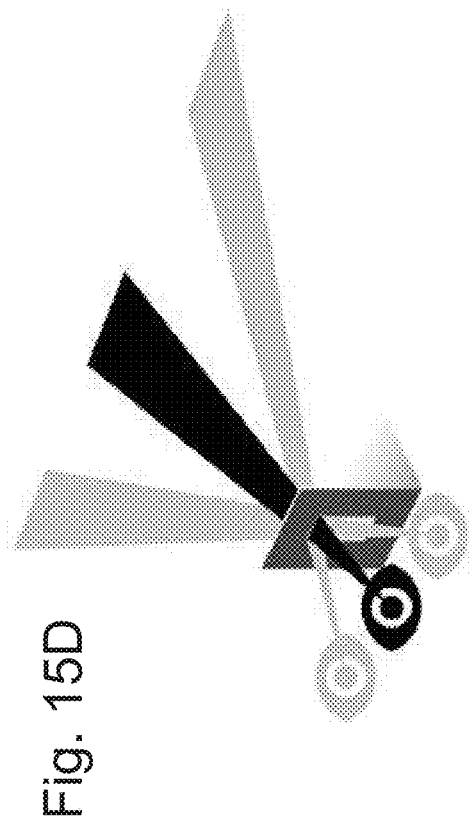
Figure 15A:
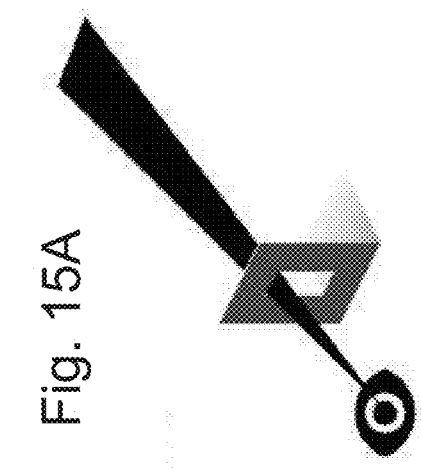
Figure 15C:
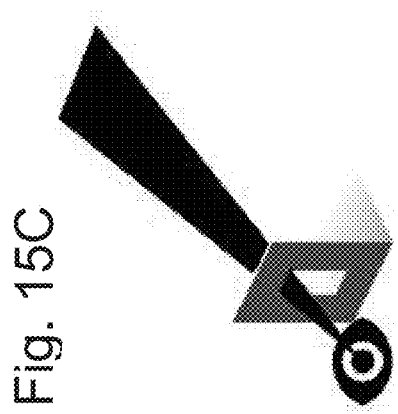

FIGS. 15A-15D help show the "natural behavior" when viewers block scenes in front of them (like when holding a piece of cardboard with a square hole in it in front of them, or using their fingers to frame a section of the scene in front of them), as is related to the "show-and-tell" scenario that may make use of certain example embodiments. This type of behavior is not currently recreated when using a mobile computing device (and associated display and cameras) to frame a scene in front of a view because the device's camera(s) typically is/are limited to an orthogonal field of view. Using the example techniques set forth herein, however, this type of behavior can be created using a mobile computing device or the like. More particularly, FIG. 15A shows a view looking through an aperture and having a limited field of view. As the view shift positions (e.g., from left-to-right as shown in FIG. 15B), the field of view will shift in the opposite direction. As shown in FIG. 15C, as the view shifts such that it is positioned closer to the aperture, the field of view shifts widens. As shown in FIG. 15D, at a closer viewing angle, the right-to-left (for example) positional shifts have a more dynamic effect on the field of view.

Another example application relates to remote presence devices. This example functionality is demonstrated in FIG. 14B. For example, by deploying the example techniques disclosed herein to a remote presence device (such as a remote, for example, a presence robot, a stationary desktop video call, or the like), it is possible to create an experience similar to engaging with someone through an opening in a barrier (such as, for example, a window in a wall). Doing so can enhance the communication and add to the feeling that both parties are in the same space. For example, when one user changes the position of his/her head, the display of a second user relative to the second user's background would change accordingly. This effect creates an on-screen shift of perspective in the virtual scene relative to the movements in the real one. It is noted that stereo cameras can be used for parallax correction in certain example embodiments.

Figure 16C:
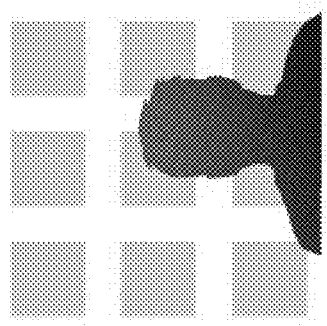
FIGS. 16A-16C help show the "natural behavior" of a perspective shift as seen by a view of a speaker in front of a background, as is related to the "remote presence" scenario that may make use of certain example embodiments.
Figure 16B:
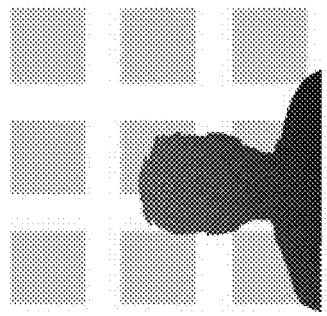
Figure 16A:
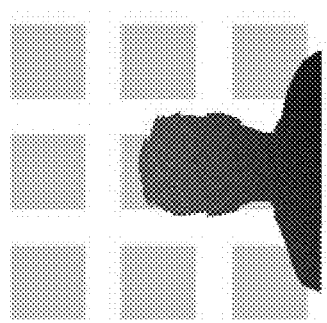

FIGS. 16A-16C help show the "natural behavior" of a perspective shift as seen by a view of a speaker in front of a background, as is related to the "remote presence" scenario that may make use of certain example embodiments. FIG. 16A shows a viewer in a neutral position. Here, the speaker and the background are in a neutral starting position. As the viewer moves to the right as shown in FIG. 16B, the speaker moves to the left relative to the background. As the viewer moves to the left as shown in FIG. 16C, the speaker moves to the right relative to the background. Eye, face, body, and/or other tracking techniques may be used in this example.

Another example application relates to immersive panoramas. Software for photographing or stitching together panoramas has become fairly common, and 360 degree cameras are becoming more and more widespread. Many programs have enabled immersive display of these wide format images through the use of scroll swiping, gyroscope motion, and the like. Unfortunately, however, these approaches do not account for the viewer's perspective, and they therefore do not always create a lifelike immersive experience. By deploying the example techniques disclosed herein to this use case, a much more lifelike and immersive experience can be created. For instance, one aspect of the techniques disclosed herein relates to the increase of the field of view as the user gets closer to the device. This is a powerful visual control when displaying graphically-rich social and other information. This type of effect can be created using still and moving, live or pre-recorded, photographs and video from standard aspect ratios to panorama and full 360 degree images. The perspective can shift based on the six degree of freedom movement of the user. FIG. 14C demonstrates an example of this functionality.

Still another example application relates to drone or robot piloting, which in some senses may be thought of as an extension of both the remote presence and immersive panorama applications described above. For instance, certain example embodiments enable the viewer's perspective to serve as the basis for input to robotics, drones, and/or the like. A mounted 360 degree camera, two 180 cameras, and/or the like, provided to a robot or drone, for example, can provide a full field of view. The user could "drive" the device based on the user's own perspective, providing input for acceleration and/or the like. That is, the example techniques disclosed herein could be used to understand what the user is looking at by comparing the perspective from the user's device and the camera(s) provided to the drone or robot, and responding to user controls accordingly.

Figure 17B:
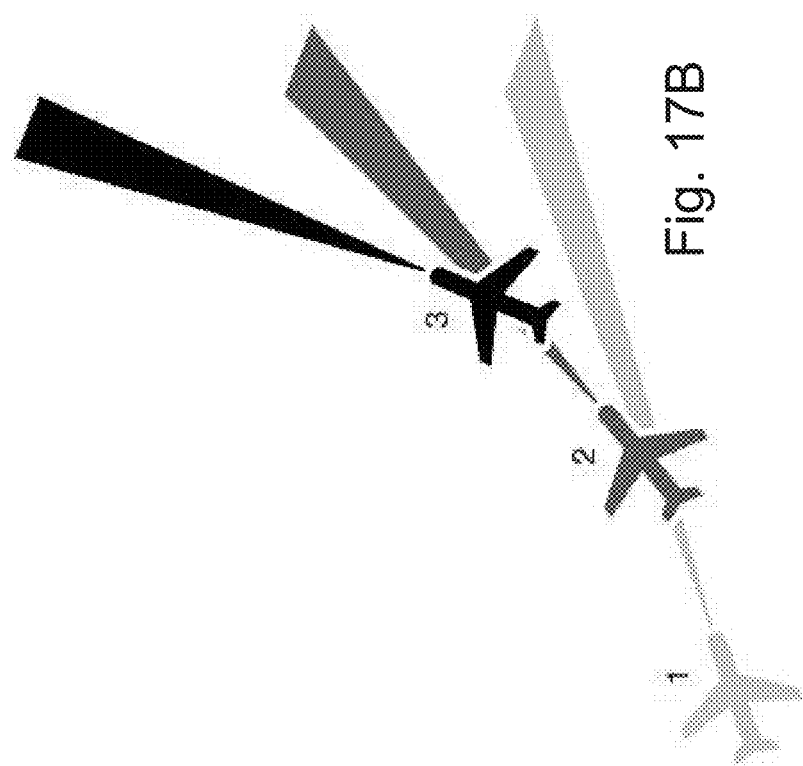
FIGS. 17A-17B help show how perspective may change dependent on a remote piloting input system, in accordance with certain example embodiments.
Figure 17A:
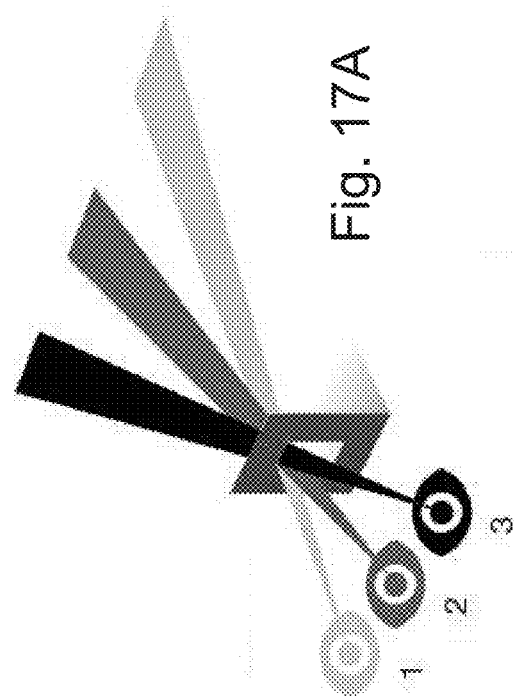

FIGS. 17A-17B help show how perspective may change dependent on a remote piloting input system, in accordance with certain example embodiments. As shown in FIG. 17A, the viewer is presented with a dynamic visualization of a scene that is controlled by the viewer's perspective. For example, a viewer moving his/her head relative to the device will reveal different parts of the scene, just as if the viewer was looking through a square hole in a piece of cardboard, or panning around a scene captured by a wide field of view camera. Position 1-3 in FIG. 17A demonstrate the viewer's shift in perspective over time. FIG. 17B shows a perspective-driven visualization presented to the viewer can be provided by a camera on a drone or other vehicle, targeting system, or the like (e.g., in the real world, in a digital environment such as a game or simulator, etc.). The viewer's shift in perspective can direct the vehicle or targeting system. For instance, in certain example embodiments, a vehicle can be made to travel to the center of the viewer's perspective, a target can be trained to the center of the viewer's perspective, etc. Strung together over time, this perspective shift can be used to pilot a vehicle through space, for example, as shown in FIG. 17B. As above, eye, face, body, and/or other tracking techniques may be used in this example.

Compositional AR overlay applications (which may in some instances make use of content-aware graphics and metadata) also may benefit from the example technology disclosed herein. These applications involve AR information being presented on top of or otherwise in relation to a video stream or other source of image information. It will be appreciated that the perspective sharing applications noted above may benefit from an AR treatment. In any event, the technology disclosed herein can be used to improve AR games and AR gaming experiences. For instance, new games based around the qualities and features of the example embodiments described herein can be designed, benefiting by turning the device into a more realistic feeling AR overlay window into the real world, e.g., by taking into account perspective and the like.

Targeting systems also can benefit from the example techniques disclosed herein. One drawback of current AR systems when deployed on a mobile device is that there is no sightline alignment between the user, object of interest, and the device. The lack of sightline can make the experience on the device feel disconnected from the real world because the information on the device is superimposing further information on an image that is broken from the user's own perspective. In contrast, when the further information is only shown to the user when the device breaks the direct line of sight between the user and the target object, the user's perception is that the user's own (personal) view is being augmented. This also relieves the need for users to look back and forth between the device perspective and their own. This technology may be seen as being used in connection with or otherwise related to the drone or robot piloting approach discussed above.

There are many potential applications for the techniques disclosed herein with respect to the arena of way-finding. Much like how many video games have a limited local area mini-map with any point of interest outside of the local area marked at the perimeter of the mini-map, certain example embodiments can indicate the location of objects/information of interest that are outside the immediate field of view of the user. These notifications could appear at the edge of the screen and could imply the type of adjustment (rotation, lateral jog, etc.) that needs to be made in order to see the objects of potential interest. This concept could be further expanded using computer vision systems, e.g., to provide scene specific movement instructions to get to the object of interest (e.g., an arrow drawn on the floor or in the air that shows the user how to navigate to a place, go around a corner that is in the field of view, etc.). In-store sales finding is a related area. Shopping experiences can be enhanced by using the example techniques disclosed herein, e.g., by directing the users' attentions to items that might be on sale, items that go well with what they already have in their carts, items from their shopping list, etc. These notifications could light up the on-sale items when the user aims their perspective down a grocery aisle.

FIGS. 18A-18B provide a description of how visual information can be overlaid on a perspective-dependent scene, in certain example embodiments. As shown in FIG. 18A, the viewer's perspective is tracked and used to display the appropriate content on the screen. As shown in FIG. 18B, using the target-facing camera, the device can overlay content (e.g., which buildings have which type of glass, whether store items are on sale, what path to take to get to a location, etc.) on the scene. Information would be presented when the device is intersecting the line of sight between the viewer and the scene. The information may be retrieved from a local or remote store, e.g., based on what object is identified. The object identified may be determined by reading a QR or other code, referencing a GPS or other location, etc., once the device determines which object is being looked at by examining the perspective. As above, eye, face, body, and/or other tracking techniques may be used in this example.

Mixed reality (MR) document views also can benefit from the example techniques disclosed herein. For example, when deployed in a space like a grocery store, busy shopping district, or many other options, data about what objects the user sees (or even the objects the user chooses to ignore) can by compiled to improve recommendations and tailor shopping experiences, navigation, etc. This is at least somewhat similar to Internet "page views" but for real-world objects.

Certain example embodiments may make use of stereo wide (e.g., 150-180 degree) field of view cameras facing the user. In this configuration, certain example embodiments may leverage image processing techniques to create improved foreground/background motion separation. With one camera, the user may in essence mask part of the background with his/her presence, and scaling techniques (common in the field of adding perspective changing motion graphics to still images) can be used to compensate for the masking. With stereo cameras, scale changes may not always be required to create a similar effect.

Further image processing details are set forth in the Appendices attached hereto, the content of which should be considered a part of this patent filing. That is, the entire content of each of the following Appendices is incorporated herein by reference:

Appendix A: Example Techniques for Converting Between Different Geometries

Appendix B: Example Techniques for Dual Image Capture and Balancing

Appendix C: Example Techniques Regarding Glazing Color Effects

Appendix D: Example Techniques for White Balancing

Appendix E: Example Techniques for Handling Chromatic Aberrations

Appendix F: Example Techniques for Pan/Tilt Mode

Appendix G: Example Techniques for Distortion Validation

Appendix H: Example Techniques for Importing Images

Appendix I: Example Techniques for Processing Reflection Highlights

Appendix J: Example Techniques for Fisheye Lens Correction

Appendix K: Example Fisheye Mathematics

Appendix L: Example Flowcharts for Composing Image

In certain example embodiments, an electronic device is provided. The electronic device includes a user interface; and processing resources including at least one processor and a memory, with the memory storing a program executable by the processing resources to simulate a view of an image through at least one viewer-selected product that is virtually interposed between a viewer using the electronic device and the image by performing functionality comprising: acquiring the image; facilitating viewer selection of the at least one product in connection with the user interface; retrieving display properties associated with the at least one viewer-selected product; generating, for each said viewer-selected product, a filter to be applied to the acquired image based on retrieved display properties; and generating, for display via the electronic device, an output image corresponding to the generated filter(s) being applied to the acquired image.

In addition to the features of the previous paragraph, in certain example embodiments, the program may be executable to perform further functionality comprising facilitating viewer selection of the image from a store of pre-stored images; wherein the acquiring of the image may comprise retrieving the viewer-selected image from the store.

In addition to the features of either of the two previous paragraphs, in certain example embodiments, the acquiring of the image may comprise obtaining the image from a camera operably connected to the electronic device.

In addition to the features of the previous paragraph, in certain example embodiments, the camera may have a field of view of at least 150 degrees.

In addition to the features of any of the four previous paragraphs, in certain example embodiments, the acquired image may be a static image and/or a video.

In addition to the features of any of the five previous paragraphs, in certain example embodiments, the facilitating viewer selection of the at least one product may comprise enabling the viewer to select the at least one product from a plurality of possible preconfigured products.

In addition to the features of the previous paragraph, in certain example embodiments, the plurality of possible preconfigured products may include at least one coated article, at least one insulating glass (IG) unit, at least one vacuum insulating glass (VIG) unit, and/or at least one laminated product.

In addition to the features of either of the two previous paragraphs, in certain example embodiments, each said possible preconfigured product may be specified in terms of its constituent parts, e.g., with the constituent parts including possible substrate material(s), substrate thickness(es), coating(s), coating placement(s), and/or laminate material(s), as appropriate for the respective possible preconfigured products.

In addition to the features of any of the eight previous paragraphs, in certain example embodiments, the facilitating viewer selection of the at least one product may comprise enabling the viewer to configure a customized product, e.g., with the customized product being configurable in terms of constituent parts, the constituent parts potentially including possible substrate material(s), substrate thickness(es), coating(s), coating placement(s), and/or laminate material(s), as appropriate for the customized product.

In addition to the features of any of the nine previous paragraphs, in certain example embodiments, multiple products are viewer-selectable.

In addition to the features of the previous paragraph, in certain example embodiments, different filters may be generated for each said viewer-selected product, and wherein the different filters may be applied to different areas of the acquired image in generating one output image.

In addition to the features of any of the 11 previous paragraphs, in certain example embodiments, the display properties may correspond to optical properties of the at least one viewer-selected product.

In addition to the features of the previous paragraph, in certain example embodiments, the display properties may be associated with transmission, reflection, and color related optical properties of the at least one viewer-selected product.

In addition to the features of any of the 13 previous paragraphs, in certain example embodiments, the display properties may be retrieved from a database.

In addition to the features of the previous paragraph, in certain example embodiments, a communication interface may be provided, and the database may be located remote from the electronic device and accessed via the communication interface.

In addition to the features of any of the 15 previous paragraphs, in certain example embodiments, the display properties may be calculated (e.g., locally or remotely).

In addition to the features of the previous paragraph, in certain example embodiments, the calculating of the display properties may be based at least in part on characteristics of a display device to which the output image is to be provided.

In addition to the features of any of the 17 previous paragraphs, in certain example embodiments, the program may be executable to perform further functionality comprising: detecting relative movement between the electronic device and the viewer; and responsive to a detection of relative movement between the electronic device and the viewer, generating, for display via the electronic device, an updated output image reflecting the detected relative movement.

In addition to the features of the previous paragraph, in certain example embodiments, the program may be executable to perform further functionality comprising responsive to the detection of relative movement between the electronic device and the viewer: determining whether the retrieved display properties associated with the at least one viewer-selected product still apply following the relative movement; and responsive to a determination that the retrieved display properties associated with the at least one viewer-selected product no longer apply following the relative movement: retrieving updated display properties associated with the at least one viewer-selected product; generating, for each said viewer-selected product, an updated filter to be applied to the acquired image based on retrieved display properties; and generating the updated output image in connection with the updated filter(s).

In addition to the features of the previous paragraph, in certain example embodiments, the determining whether the retrieved display properties associated with the at least one viewer-selected product still apply following the relative movement may be based on a determination as to whether the movement corresponds to a change in position without an accompanying change in orientation.

In addition to the features of the previous paragraph, in certain example embodiments, one or more inertial sensors may be provided, e.g., with the one or more inertial sensors being configured to detect changes in orientation of the electronic device.

In addition to the features of any of the three previous paragraphs, in certain example embodiments, the relative movement may correspond to movement of the electronic device (e.g., a change in position and/or orientation thereof), movement of the viewer (e.g., a change in the viewer's position), a shift of the viewer's gaze, and/or the like. In addition to the features of any of the three previous paragraphs, in certain example embodiments, at least one user-facing camera may be provided, e.g., with the user-facing camera being configured to provide a signal that is processable by the program to perform eye and/or face tracking in connection with a determination as to whether there has been a shift in the viewer's gaze.

In addition to the features of the previous paragraph, in certain example embodiments, the eye and/or face tracking may be performable while the device and/or viewer is/are moving.

In addition to the features of any of the five previous paragraphs, in certain example embodiments, the updated display properties may be associated with off-axis transmission, reflection, and color related optical properties of the at least one viewer-selected product.

In addition to the features of any of the 24 previous paragraphs, in certain example embodiments, a display device via which the output image is to be displayed may be provided.

In addition to the features of any of the 25 previous paragraphs, in certain example embodiments, at least one camera having a field of view of at least 150 degrees may be operably connected to the electronic device.

In addition to the features of any of the 26 previous paragraphs, in certain example embodiments, first and second cameras generally oriented towards the viewer and away from the viewer, respectively, may be provided.

In addition to the features of any of the 27 previous paragraphs, in certain example embodiments, the electronic device may be a smartphone or tablet.

In certain example embodiments, a method of simulating a view of an image through at least one viewer-selected product that is virtually interposed between a viewer using an electronic device and the image is provided. The electronic device includes processing resources including at least one processor and a memory. The method comprises: acquiring the image; facilitating viewer selection of the at least one product in connection with a user interface running on the electronic device; retrieving display properties associated with the at least one viewer-selected product; generating, for each said viewer-selected product, a filter to be applied to the acquired image based on retrieved display properties; and generating, for display via the electronic device, an output image corresponding to the generated filter(s) being applied to the acquired image.

In addition to the features of the previous paragraph, in certain example embodiments, viewer selection of the image from a store of pre-stored images may be facilitated; wherein the acquiring of the image may comprise retrieving the viewer-selected image from the store.

In addition to the features of either of the two previous paragraphs, in certain example embodiments, the acquiring of the image may comprise obtaining the image from a camera operably connected to the electronic device.

In addition to the features of the previous paragraph, in certain example embodiments, the camera may have a field of view of at least 150 degrees.

In addition to the features of any of the four previous paragraphs, in certain example embodiments, the acquired image may be a static image and/or a video.

In addition to the features of any of the five previous paragraphs, in certain example embodiments, the facilitating viewer selection of the at least one product may comprise enabling the viewer to select the at least one product from a plurality of possible preconfigured products.

In addition to the features of the previous paragraph, in certain example embodiments, the plurality of possible preconfigured products may include at least one coated article, at least one insulating glass (IG) unit, at least one vacuum insulating glass (VIG) unit, and/or at least one laminated product.

In addition to the features of either of the two previous paragraphs, in certain example embodiments, each said possible preconfigured product may be specified in terms of its constituent parts, e.g., with the constituent parts including possible substrate material(s), substrate thickness(es), coating(s), coating placement(s), and/or laminate material(s), as appropriate for the respective possible preconfigured products.

In addition to the features of any of the eight previous paragraphs, in certain example embodiments, the facilitating viewer selection of the at least one product may comprise enabling the viewer to configure a customized product, e.g., with the customized product being configurable in terms of constituent parts, the constituent parts potentially including possible substrate material(s), substrate thickness(es), coating(s), coating placement(s), and/or laminate material(s), as appropriate for the customized product.

In addition to the features of any of the nine previous paragraphs, in certain example embodiments, multiple products are viewer-selectable.

In addition to the features of the previous paragraph, in certain example embodiments, different filters may be generated for each said viewer-selected product, and wherein the different filters may be applied to different areas of the acquired image in generating one output image.

In addition to the features of any of the 11 previous paragraphs, in certain example embodiments, the display properties may correspond to optical properties of the at least one viewer-selected product.

In addition to the features of the previous paragraph, in certain example embodiments, the display properties may be associated with transmission, reflection, and color related optical properties of the at least one viewer-selected product.

In addition to the features of any of the 13 previous paragraphs, in certain example embodiments, the display properties may be retrieved from a database.

In addition to the features of the previous paragraph, in certain example embodiments, a communication interface may be provided, and the database may be located remote from the electronic device and accessed via the communication interface.

In addition to the features of any of the 15 previous paragraphs, in certain example embodiments, the display properties may be calculated (e.g., locally or remotely).

In addition to the features of the previous paragraph, in certain example embodiments, the calculating of the display properties may be based at least in part on characteristics of a display device to which the output image is to be provided.

In addition to the features of any of the 17 previous paragraphs, in certain example embodiments, relative movement between the electronic device and the viewer may be detected; and responsive to a detection of relative movement between the electronic device and the viewer, generating, for display via the electronic device, an updated output image reflecting the detected relative movement.

In addition to the features of the previous paragraph, in certain example embodiments, responsive to the detection of relative movement between the electronic device and the viewer: a determination may be made as to whether the retrieved display properties associated with the at least one viewer-selected product still apply following the relative movement; and responsive to a determination that the retrieved display properties associated with the at least one viewer-selected product no longer apply following the relative movement: additional functionality may comprise retrieving updated display properties associated with the at least one viewer-selected product; generating, for each said viewer-selected product, an updated filter to be applied to the acquired image based on retrieved display properties; and generating the updated output image in connection with the updated filter(s).

In addition to the features of the previous paragraph, in certain example embodiments, the determining whether the retrieved display properties associated with the at least one viewer-selected product still apply following the relative movement may be based on a determination as to whether the movement corresponds to a change in position without an accompanying change in orientation.

In addition to the features of the previous paragraph, in certain example embodiments, one or more inertial sensors may be provided, e.g., with the one or more inertial sensors being configured to detect changes in orientation of the electronic device.

In addition to the features of any of the three previous paragraphs, in certain example embodiments, the relative movement may correspond to movement of the electronic device (e.g., a change in position and/or orientation thereof), movement of the viewer (e.g., a change in the viewer's position), a shift of the viewer's gaze, and/or the like. In addition to the features of any of the three previous paragraphs, in certain example embodiments, at least one user-facing camera may be provided, e.g., with the user-facing camera being configured to provide a signal that is processable to perform eye and/or face tracking in connection with a determination as to whether there has been a shift in the viewer's gaze.

In addition to the features of the previous paragraph, in certain example embodiments, the eye and/or face tracking may be performable while the device and/or viewer is/are moving.

In addition to the features of any of the five previous paragraphs, in certain example embodiments, the updated display properties may be associated with off-axis transmission, reflection, and color related optical properties of the at least one viewer-selected product.

In addition to the features of any of the 24 previous paragraphs, in certain example embodiments, a display device via which the output image is to be displayed may be provided.

In addition to the features of any of the 25 previous paragraphs, in certain example embodiments, at least one camera having a field of view of at least 150 degrees may be operably connected to the electronic device.

In addition to the features of any of the 26 previous paragraphs, in certain example embodiments, first and second cameras generally oriented towards the viewer and away from the viewer, respectively, may be provided.

In addition to the features of any of the 27 previous paragraphs, in certain example embodiments, the electronic device may be a smartphone or tablet.

In certain example embodiments, there is provided a non-transitory computer readable storage medium tangibly storing a program that, when executed by a processor of a computing device, performs the method of any one of 28 preceding claims.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the claims.

APPENDIX A: EXAMPLE TECHNIQUES FOR CONVERTING BETWEEN DIFFERENT GEOMETRIES

For the purposes of this example, the descriptions that follow assume the host iPad is in the "Portrait" orientation. It will be appreciated that these example techniques may be used together with, or in place of, the examples provided above.

I. Introduction

A. Constants

The host device is a 2017 iPad Pro 10.5" (A1701 or A1709). p=264, the pixels-per-inch of the screen.

With respect to the camera, v=π, the field of view of the fisheye camera (assumed uniform).

B. Spaces & Coordinate Systems

1. Full Equirectangular Image Space

Full equirectangular image space is an ω pixel wide by η pixel high rectangle, where ω and η satisfy ω:η=2:1. This space is used to represent 360° by 180° scenes captured from a single point of view.

Figure 19:
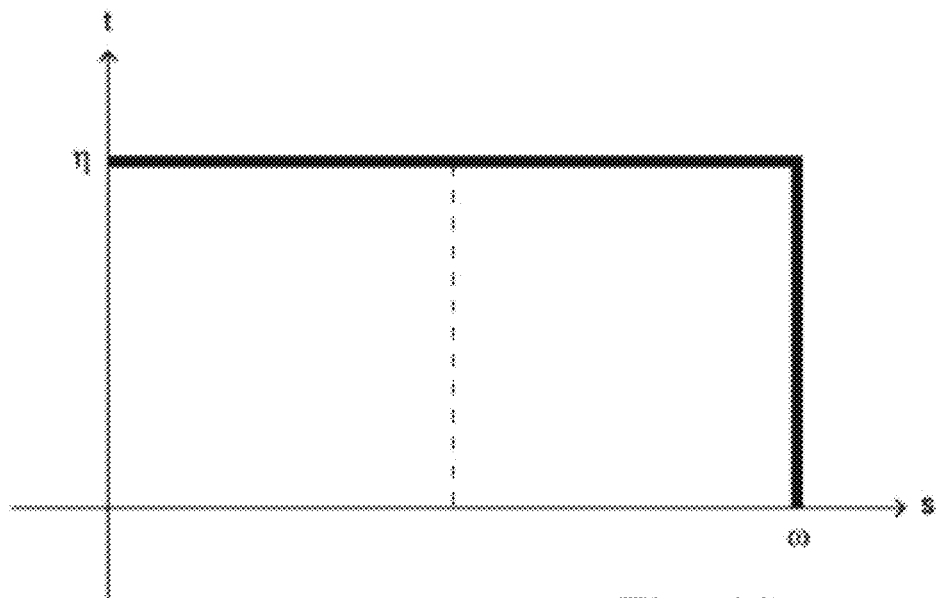
FIGS. 19-20 help demonstrate concepts relevant to a full equirectangular image space, in accordance with certain example embodiments.

With respect to Cartesian coordinates, in this coordinate system, full equirectangular image space is parameterized by Cartesian coordinates (s, t), where: (0, 0) is located at the bottom left of the space, and (s, t)=(ω, η) is located at the top right of the space. See FIG. 19 in this regard.

In terms of conversions, a point $(s_0, t_0)$ in full equirectangular image space (Cartesian coordinates) can be converted to full equirectangular image space (geographic coordinates) using the formulae:

$$\alpha_0 = \pi\left(\frac{t_0}{\eta} - \frac{1}{2}\right)$$

$$\beta_0 = 2\pi\left(\frac{s_0}{\omega} - \frac{1}{4}\right)$$

Figure 20:
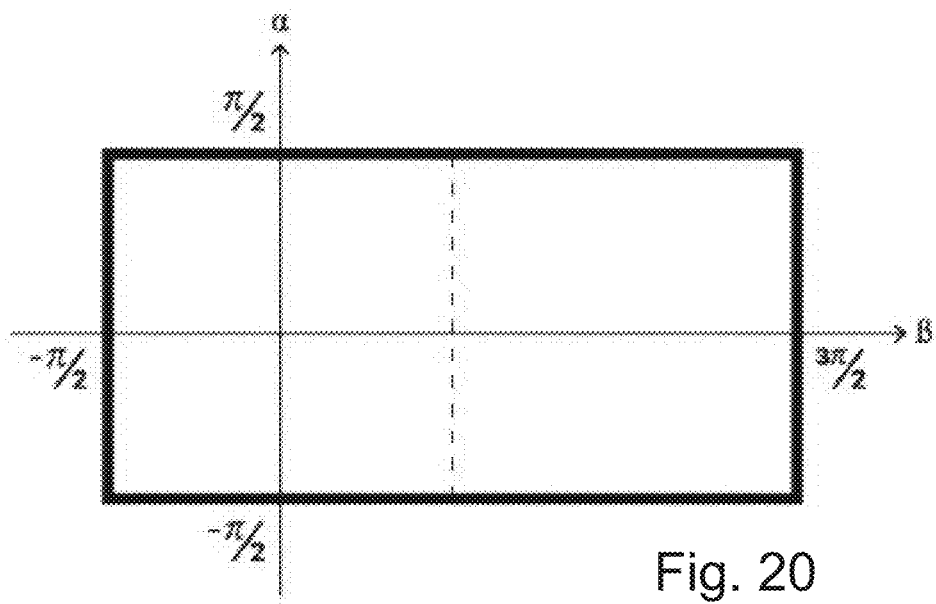

With respect to a geographic coordinate system, the full equirectangular image space is parameterized by Cartesian coordinates (α, β), where α represents latitude and varies between −π/2 and π/2, and β represents longitude and varies between −π/2 and 3π/2. See FIG. 20 in this regard.

In terms of conversions, a point $(\alpha_0, \beta_0)$ in full equirectangular image space (geographic coordinates) can be converted to full equirectangular image space (cartesian coordinates) using the formulae:

$$s_0 = \left(\frac{\beta_0 + \frac{\pi}{2}}{2\pi}\right)\omega \bmod \omega$$

$$t_0 = \left(\frac{\alpha_0 + \frac{\pi}{2}}{\pi}\right)\eta \bmod \eta$$

A point $(\alpha_0, \beta_0)$ in full equirectangular image space (geographic coordinates) can be projected to full world space (360-cam-centered geographic coordinates) using the formulae $A_0=\alpha_0$; $B_0=\beta_0$; and $C_0$=arbitrary.

2. Half Equirectangular Image Space

Half equirectangular image space is an η pixel wide by η pixel high square. This space is used to represent 180° by 180° scenes captured from a single point of view.

Figure 21:
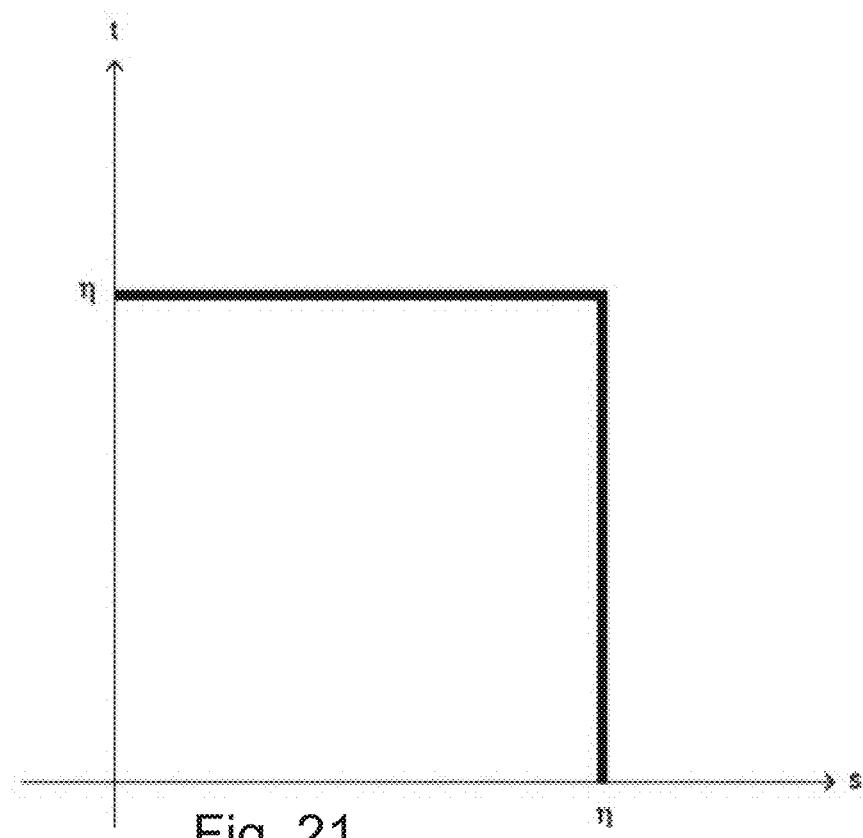
FIGS. 21-22 help demonstrate concepts relevant to a half equirectangular image space, in accordance with certain example embodiments.

With respect to Cartesian coordinates, in this coordinate system, half equirectangular image space is parameterized by Cartesian coordinates (s, t), where (0, 0) is located at the bottom left of the space, and (s, t)=(η, η) is located at the top right of the space. See FIG. 21 in this regard.

Figure 22:
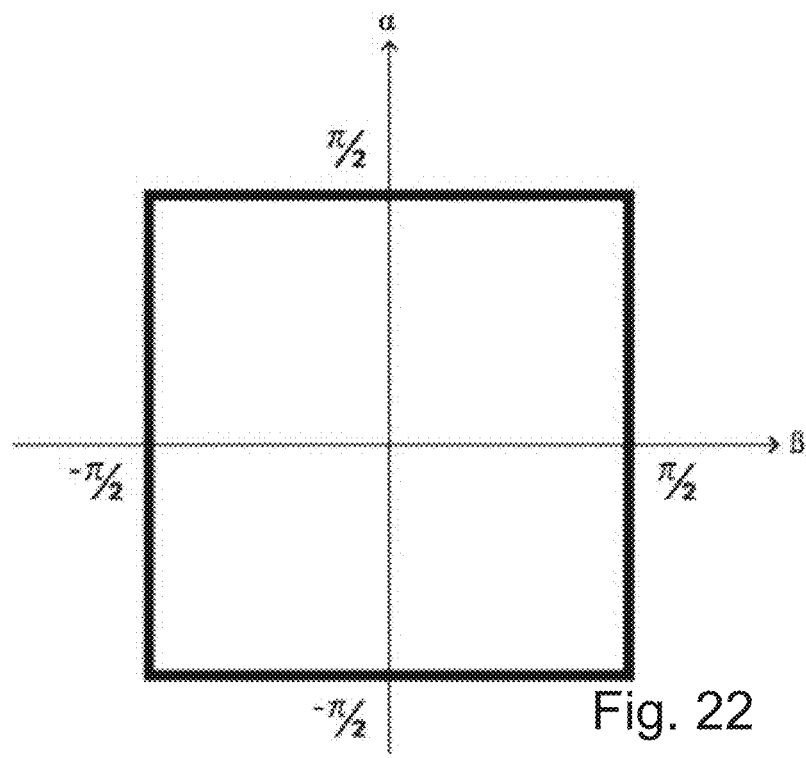

With respect to geographic coordinates, half equirectangular image space is parameterized by Cartesian coordinates $(\alpha_0, \beta_0)$ where α represents latitude and varies between $-\pi/2$ and $\pi/2$, and β represents longitude and varies between $-\pi/2$ and $\pi/2$. See FIG. 22 in this regard.

A point $(\alpha_0, \beta_0)$ in half equirectangular image space (geographic coordinates) can be converted to half equirectangular image space (Cartesian coordinates) using the formulae:

$$s_0 = \left(\frac{\beta_0 + \frac{\pi}{2}}{\pi}\right) \eta \bmod \eta$$

$$t_0 = \left(\frac{\alpha_0 + \frac{\pi}{2}}{\pi}\right) \eta \bmod \eta$$

3. Fisheye Image Space

Fisheye image space is a d pixel by d pixel square. This space is used to represent 180° by 180° scenes captured from a single point of view. It is assumed that the captured scene lies wholly within the central disc of diameter d, and the captured scene is upright.

Figure 23:
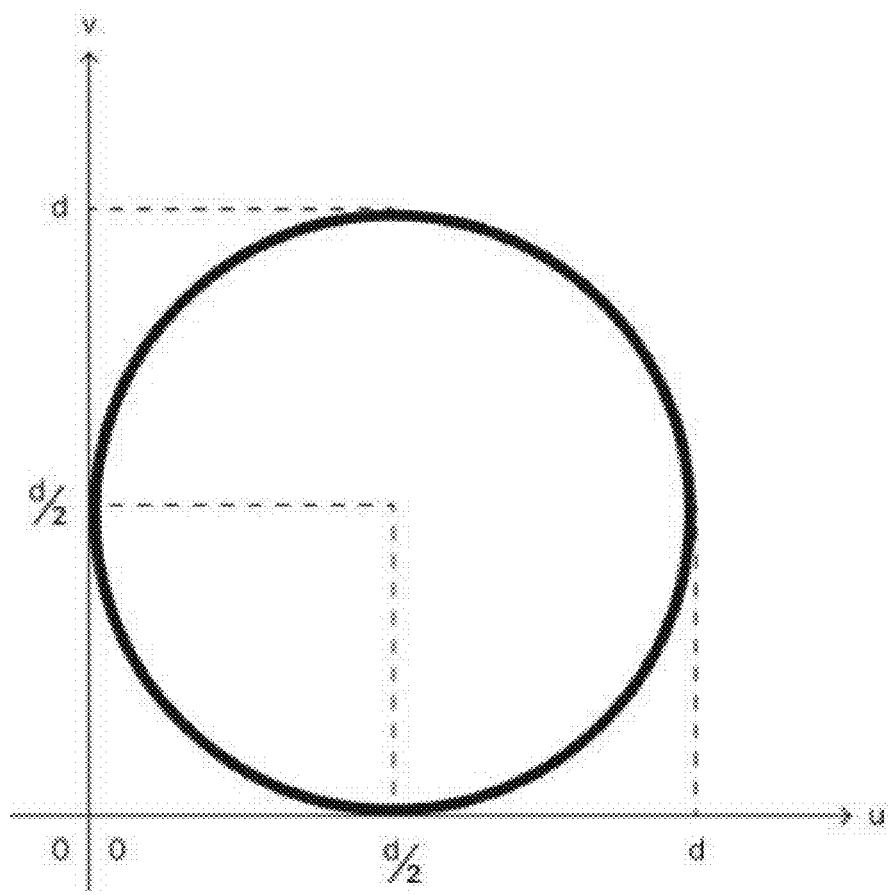
FIGS. 23-24 help demonstrate concepts relevant to a fisheye image space, in accordance with certain example embodiments.

With respect to Cartesian coordinates, in this coordinate system, fisheye image space is parameterized by Cartesian coordinates (u, v) where (0, 0) is located at the bottom left of the space, and (u, v)=(d, d) is located at the top right of the space. See FIG. 23 in this regard.

A point $(u_0, v_0)$ in fisheye image space (cartesian coordinates) can be converted to fisheye image space (polar coordinates) using the formulae:

$$r_0 = \sqrt{(u_0 - d/2)^2 + (v_0 - d/2)^2}$$

$$\theta_0 = \arctan(v_0 - d/2, u_0 - d/2)$$

Figure 24:
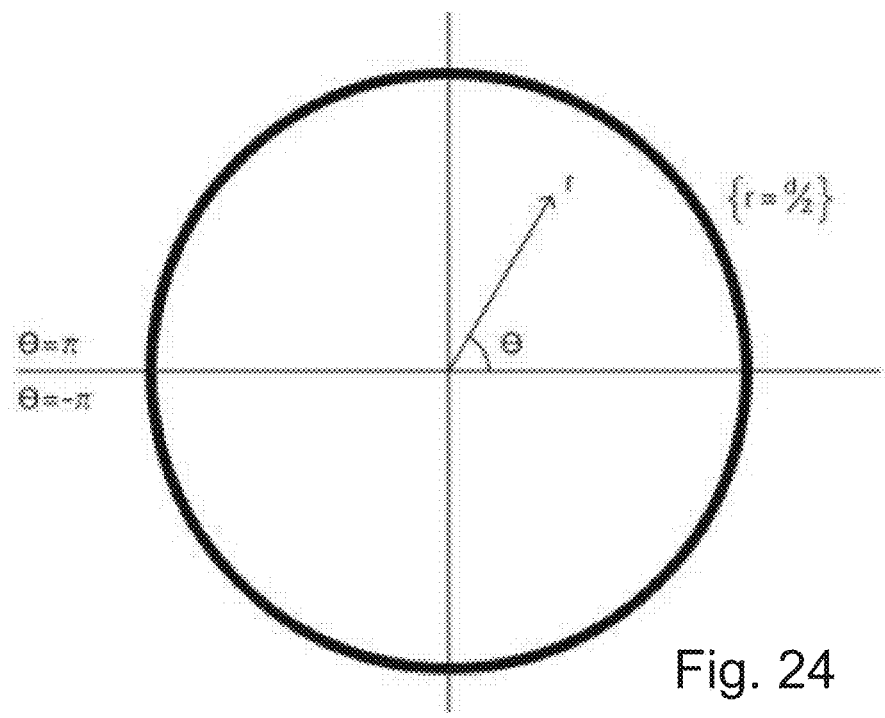

With respect to polar coordinates, in this coordinate system, fisheye image space is parameterized by polar coordinates (r, θ), where r varies between 0 and d/2; and θ is measured in radians and varies between $-\pi$ and $\pi$, and where $\theta = \pi/2$ points directly up. See FIG. 24 in this regard.

A point $(r_0, \theta_0)$ in fisheye image space (polar coordinates) can be converted to fisheye image space (Cartesian coordinates) using the formulae: $u_0 = d/2 + r_0 \cos(\theta_0)$ and $v_0 = d/2 + r_0 \sin(\theta_0)$.

A point $(r_0, \theta_0)$ in fisheye image space (polar coordinates) can be converted to half world space (cam-centered optical coordinates) using the formulae: $\Theta_0 = \theta_0$ and $\Phi_0 = v r_0/d = \pi r_0/d$.

4. Display Image Space

Display image space is a w pixel wide by h pixel high rectangle, where w and h satisfy w:h=2:3 to match the aspect ratio of an iPad screen. This space is used to represent images that will be displayed on an iPad screen.

Figure 25:
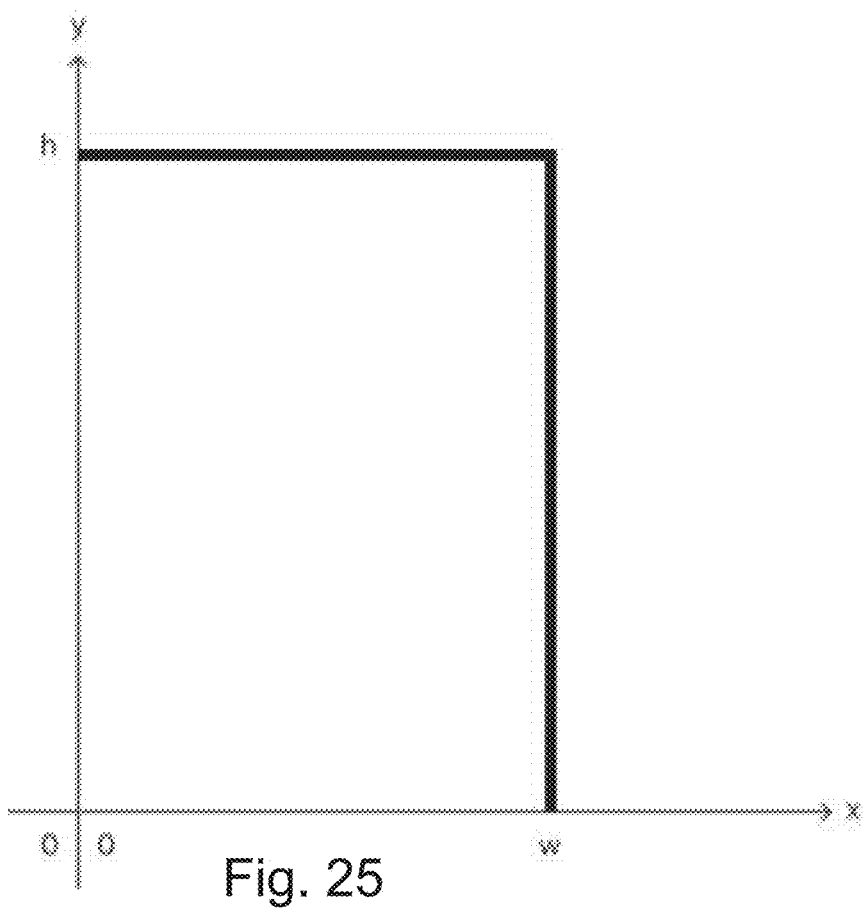
FIG. 25 helps demonstrate concepts relevant to a display image space, in accordance with certain example embodiments.

With respect to Cartesian coordinates, in this coordinate system, display image space is parameterized by Cartesian coordinates (x, y), where (0, 0) is located at the bottom left of the rectangle, (x, y)=(w, h) is located at the top right of the rectangle, and the output image displayed in this space is assumed to be upright. See FIG. 25 in this regard.

A point $(x_0, y_0)$ in display image space (Cartesian coordinates) can be converted to full world space (screen-centered Cartesian coordinates) using the formulae: $X_0 = (x_0 - w/2)/p$; $Y_0 = (y_0 - h/2)/p$; $Z_0 = 0$.

5. Full World Space

The full world space is a three-dimensional space representing the physical world. All lengths are given in inches in this example.

Figure 26:
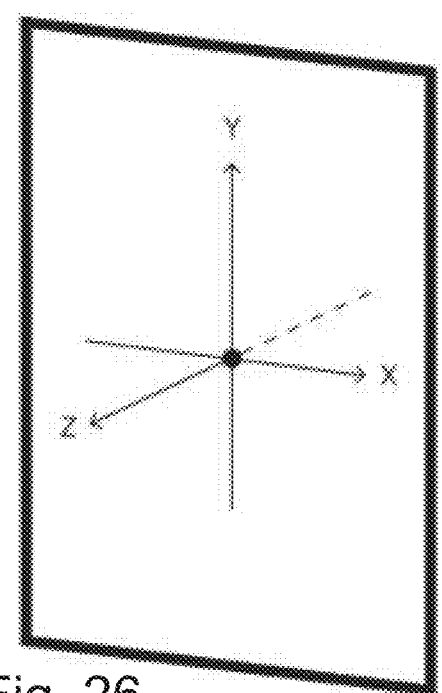
FIGS. 26-28 help demonstrate concepts relevant to a full world space, in accordance with certain example embodiments.

With respect to screen-centered Cartesian coordinates, in this coordinate system, full world space is parameterized by Cartesian coordinates, where: X, Y, and Z all lie in the range $(-\infty, \infty)$; (0, 0, 0) is located at the center of the iPad's screen; the X-Y plane is coplanar with the iPad's screen, with the X-axis parallel to the short side of the iPad and increasing from left to right as viewed from the front, and the Y-axis parallel to the long side of the iPad and increasing from bottom to top with this orientation; and the Z-axis is perpendicular to the iPad's screen, with the half-space {Z>0} lying wholly in front of the iPad. See FIG. 26 in this regard.

Figure 27:
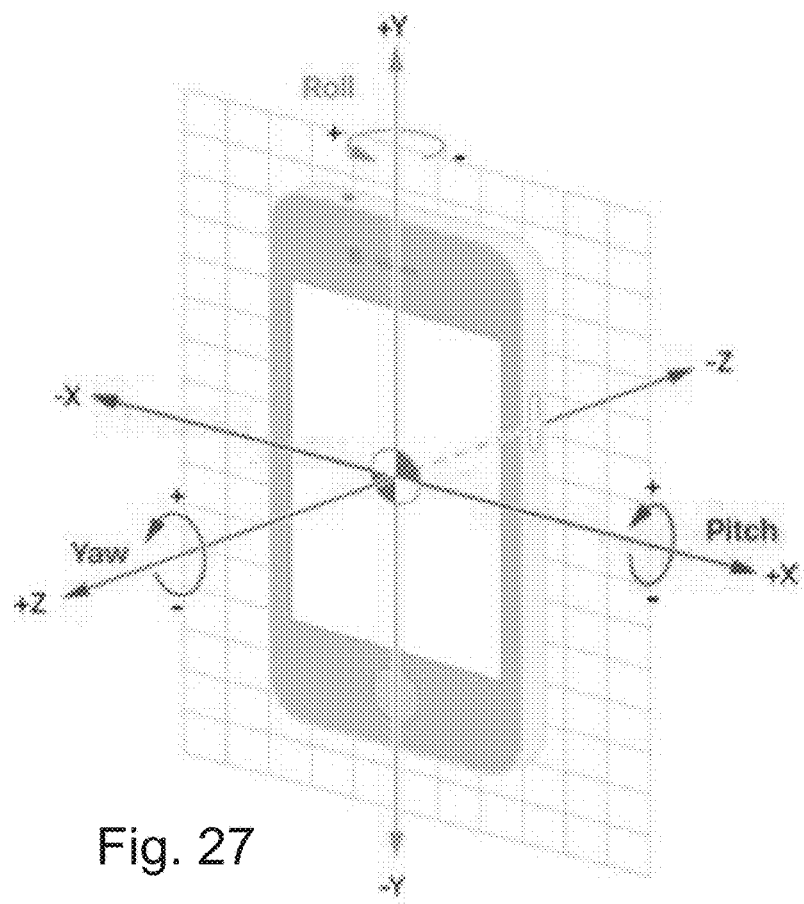

The coordinate system used by the iOS framework to express physical device attitude (pitch, roll, and yaw) is almost identical to screen-centered Cartesian coordinates. See FIG. 27 in this regard. Thus, certain example embodiments may use screen-centered Cartesian coordinates to approximate device-centered Cartesian coordinates for some calculations.

The iPad's front camera is assumed to be located at $X_f = (X_f, Y_f, Z_f) = (0, 4.57, 0)$ in full world space (screen-centered Cartesian coordinates). The iPad's back camera is assumed to be located at $X_b = (X_b, Y_b, Z_b) = (3.07, 4.55, 0)$ in full world space (screen-centered Cartesian coordinates).

A point $(X_0, Y_0, Z_0)$ in full world space (screen-centered Cartesian coordinates) can be converted to half world space (back-cam-centered Cartesian coordinates) using the formulae: $I_0 = X_0 - X_b$; $J_0 = -Z_0$; and $K_0 = Y_0 - Y_b$.

A point $(X_0, Y_0, Z_0)$ in full world space (screen-centered Cartesian coordinates) can be converted to half world space front-cam-centered Cartesian coordinates) using the formulae: $I_0 = -X_0$; $J_0 = Z_0$; and $K_0 = Y_0 - Y_f$.

A point $(X_0, Y_0, Z_0)$ in full world space (screen-centered Cartesian coordinates) can be converted to full world space (screen-centered Cartesian coordinates) using the formulae:

$$A_0 = \arcsin(Y_0)$$

$$B_0 = \arctan(X_0 - Z_0)$$

$$C_0 = \sqrt{X_0^2 + Y_0^2 + Z_0^2}$$

Figure 28:
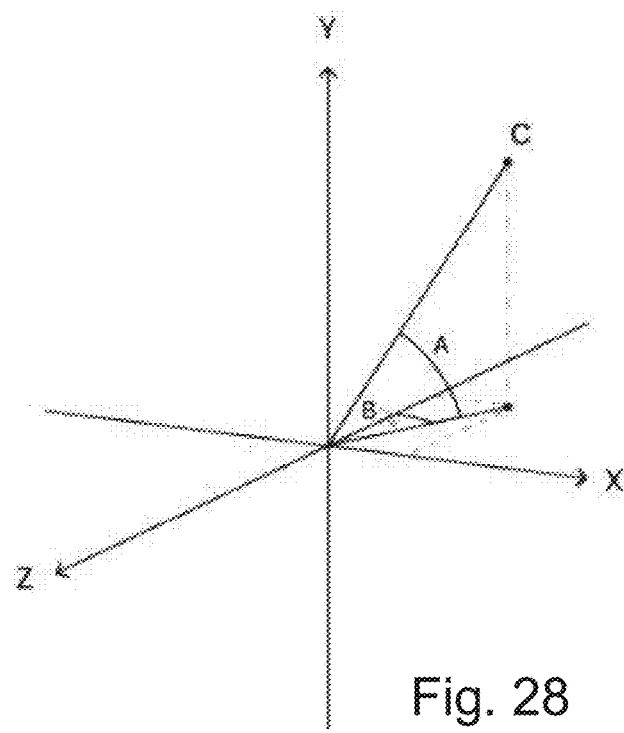

With respect to 360-cam-centered geographic coordinates, in this coordinate system, full world space is parameterized by geographic coordinates (A, B, C), where A and B are both measured in radians; A represents latitude and varies between $-\pi/2$ and $\pi/2$; B represents longitude and varies between $-\pi/2$ and $3\pi/2$; and C lies in the range $[0, \infty)$. See FIG. 28 in this regard.

A point $(A_0, B_0, C_0)$ in full world space (360-cam-centered geographic coordinates) can be collapsed to a point $(\alpha_0, \beta_0)$ in full equirectangular image space (geographic coordinates) using the formulae $\alpha_0 = A_0$ and $\beta_0 = B_0$.

A point $(A_0, B_0, C_0)$ in full world space (360-cam-centered geographic coordinates) can be converted to full world space (screen-centered Cartesian coordinates) using the formulae: $X_0 = \cos(A_0) \sin(B_0)$; $Y_0 = \sin(A_0)$; and $Z_0 = -\cos(A_0) \cos(B_0)$.

6. Half World Space

The half world space is a three-dimensional half-space representing half the physical world. All lengths are given in inches in this example.

Figure 29:
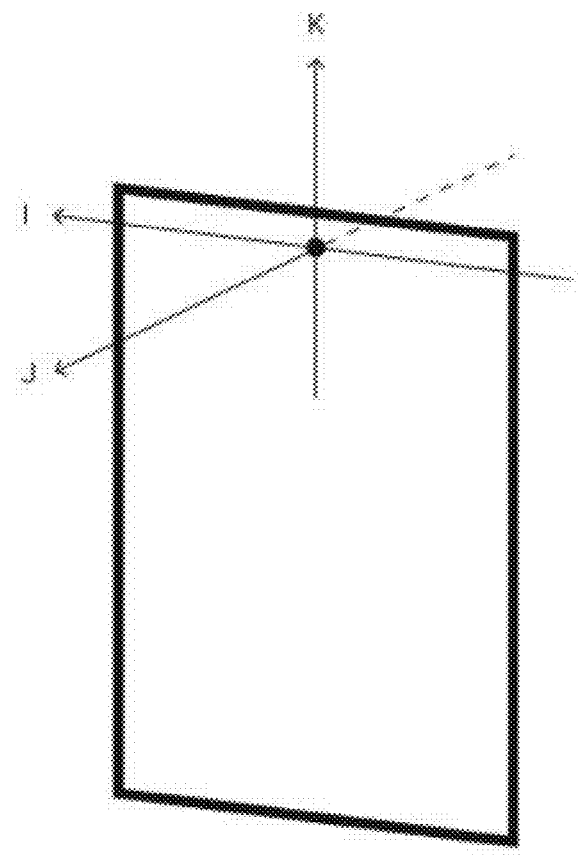
FIGS. 29-32 help demonstrate concepts relevant to a half World space, in accordance with certain example embodiments.
Figure 30:
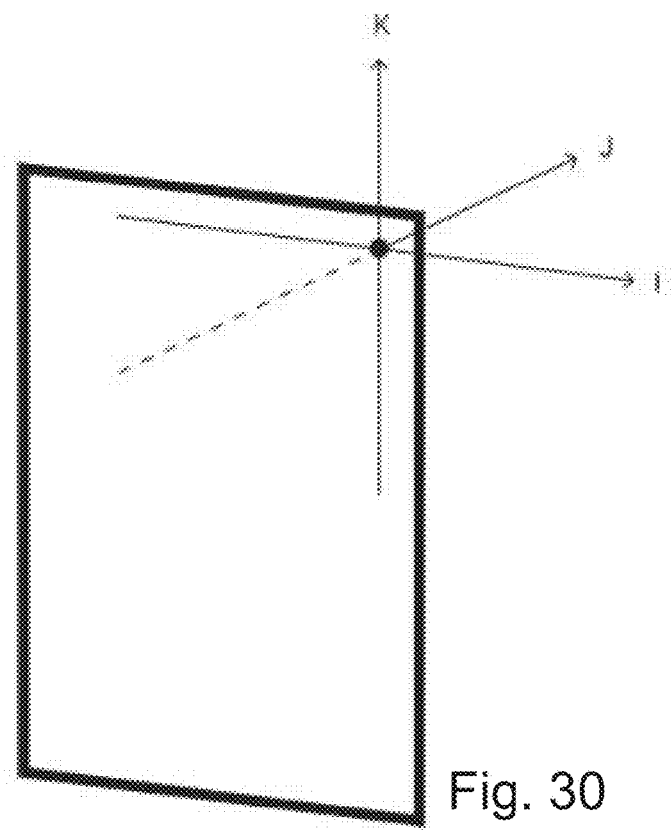

With respect to (front/back) cam-centered Cartesian coordinates, in this coordinate system, half world space is parameterized by Cartesian coordinates (I, J, K), where I and K are in the range $(-\infty, \infty)$, and J lies in the range $[0, \infty)$ and the camera is located at $(0, 0, 0)$. From the perspective of the camera, $(1, 0, 0)$ lies directly to the right of the camera, $(0, 1, 0)$ lies directly to the right of the camera, and $(0, 0, 1,)$ lies directly above the camera. In these regards, see FIGS. 29-30 for front and back views, respectively.

A point $(I_0, J_0, K_0)$ in half world space (cam-centered Cartesian coordinates) can be converted to half world space (cam-centered optical coordinates) using the formulae:

$$\Theta_0 = \arctan(K_0, I_0)$$

$$\Phi_0 = \arctan(\sqrt{I_0^2 + K_0^2}, J_0)$$

A point $(I_0, J_0, K_0)$ in half world space (front-cam-centered Cartesian coordinates) can be converted to full world space (screen-centered Cartesian coordinates) using the formulae: $X_0 = -I_0$; $Y_0 = K_0 + Y_f = K_0 + 4.57$; and $Z_0 = J_0$.

A point $(I_0, J_0, K_0)$ in half world space (cam-centered cartesian coordinates) can be converted to half world space (cam-centered geometric coordinates) using the formulae:

$$A_0 = \arctan(K_0, \sqrt{I_0^2 + J_0^2})$$

$$B_0 = \arctan(I_0, J_0)$$

Figure 31:
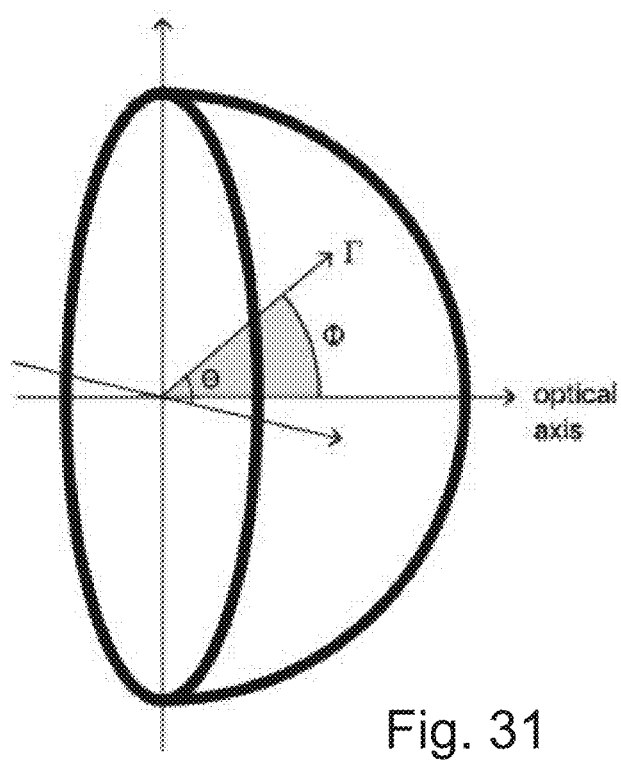

With respect to (front/back) cam-centered optical coordinates, in this coordinate system, half world space is parameterized by optical coordinates $(\Theta, \Phi, \Gamma)$, where $\Theta$ and $\Phi$ are both measured in radians; $\Theta$ lies in the range $[-\pi, \pi]$, where the line $\Theta=0$ lies directly to the right of the camera; $\Phi$ lies in the range $[0, \pi/2]$, where the line $\Phi=0$ corresponds to the camera's optical axis and $\{\Phi=\pi/2\}$ is coplanar with the iPad; and $\Gamma$ lies in the range $[0, \infty)$. See FIG. 31 in this regard.

A point $(\Theta_0, \Phi_0, \Gamma_0)$ in half world space (cam-centered optical coordinates) can be collapsed to fisheye image space (polar coordinates) using the formulae $r_0 = d\Phi_0/v = d\Phi_0/\pi$ and $\theta_0 = \Theta_0$.

A point $(\Theta_0, \Phi_0, \Gamma_0)$ in half world space (cam-centered optical coordinates) can be converted to half world space (cam-centered Cartesian coordinates) using the formulae: $I_0 = \Gamma_0 \sin(\Phi_0) \cos(\Theta_0)$; $J_0 = \Gamma_0 \cos(\Phi_0)$; and $K_0 = \Gamma_0 \sin(\Phi_0) \sin(\Theta_0)$.

Figure 32:
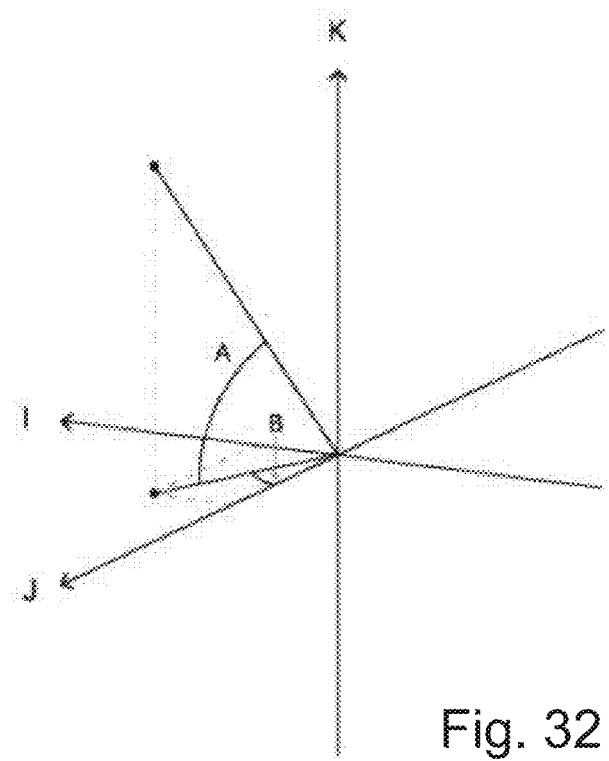

With respect to cam-centered geographic coordinates, in this coordinate system, half world space is parameterized by geographic coordinates, where: A and B are both measured in radians; A represents latitude and varies between $-\pi/2$ and $\pi/2$; B represents longitude and varies between $-\pi/2$ and $\pi/2$; and C lies in the range $[0, \infty)$. See FIG. 32 in this regard.

A point $(A_0, B_0, C_0)$ in half world space (cam-centered geographic coordinates) can be collapsed to half equirectangular image space (geographic coordinates) using the formulae $\alpha_0 = A_0$ and $\beta_0 = B_0$.

II. Dual Dynamic Fisheye to User-Perspective-Adjusted

A. Estimate Face Location

This technique may be used—given eye locations $(u_1, v_1)$ and $(u_2, v_2)$ in front fisheye image space (Cartesian coordinates), and S=2.5 (the assumed physical separation (in inches) of two eyes)—to compute the user's average eye location $X_a = (U_a, V_a, W_a)$ ($W_a > 0$) in full world space (screen-centered Cartesian coordinates). To do this, certain example embodiments may:

Step 1. Convert the eye positions $(u_1, v_1)$ and $(u_2, v_2)$ rom fisheye image space (Cartesian coordinates) to fisheye image space (polar coordinates):

$$r_1 = \sqrt{(u_1 - d/2)^2 + (v_1 - d/2)^2}$$

$$\theta_1 = \arctan(v_1 - d/2, u_1 - d/2)$$

$$r_2 = \sqrt{(u_2 - d/2)^2 + (v_2 - d/2)^2}$$

$$\theta_2 = \arctan(v_2 - d/2, u_2 - d/2)$$

Step 2. Project into half world space (front-cam-centered optical coordinates). Radius is arbitrary at this step so fix $\Gamma 1 = \Gamma 2 = 1$ without loss of generality:

$$\Theta_1 = \theta_1$$

$$\Phi_1 = vr_1/d = \pi r_1/d$$

$$\Theta_2 = \theta_2$$

$$\Phi_2 = vr_2/d = \pi r_2/d$$

Step 3. Convert to half world space (front-cam-centered Cartesian coordinates) (note: the next step assumes input vectors are normalized, which these are):

$$I_1 = \sin(\Phi_1)\cos(\Theta_1)$$

$$J_1 = \cos(\Phi_1)$$

$$K_1 = \sin(\Phi_1)\sin(\Theta_1)$$

$$I_2 = \sin(\Phi_2)\cos(\Theta_2)$$

$$J_2 = \cos(\Phi_2)$$

$$K_2 = \sin(\Phi_2)\sin(\Theta_2)$$

Step 4. Compute the central angle $\delta$ between two points on a sphere using a well-conditioned vector formula: $\delta = \arctan(|I_1 \times I_2|, I_1 \cdot I_2)$.

Step 5. Given the angle $\delta$, estimate the distance D in inches between the user and the front camera: $D = (S/2)/\tan(\delta/2)$. Great circle distance (as opposed to linear distance) may be accounted for to improve accuracy as the user approaches the camera.

Step 6. Compute the average eye location in fisheye image space (Cartesian coordinates):

$$u_a = (u_1 + u_2)/2$$

$$v_a = (v_1 + v_2)/2$$

Step 7. Convert to fisheye image space (polar coordinates):

$$r_a = \sqrt{(u_a - d/2)^2 + (v_a - d/2)^2}$$

$$\theta_a = \arctan(v_a - d/2, u_a - d/2)$$

Step 8. Project into half world space (front-cam-centered optical coordinates):

$$\Theta_a = \theta_a$$

$$\Phi_a = vr_a/d = \pi r_a/d$$

$$\Gamma_a = D$$

It will be appreciated that it may not be appropriate to simply average $\Theta_{1,2}$ and $\Phi_{1,2}$ to obtain $\Theta_a$ and $\Phi_a$ because the transformation from fisheye image space to half world space is nonlinear.

Step 9. Convert to half world space (front-cam-centered Cartesian coordinates):

$$I_a = \Gamma_a \sin(\Phi_a)\cos(\Theta_a)$$

$$J_a = \Gamma_a \cos(\Phi_a)$$

$$K_a = \Gamma_a \sin(\Phi_a)\sin(\Theta_a)$$

Step 10. Convert to full world space (screen-centered Cartesian coordinates):

$$X_a = -I_a$$

$$Y_a = K_a + 4.57$$

$$Z_a = J_a$$

B. Rear Image Warping

This technique may be used—given a target point $(x_0, y_0)$ in display image space (Cartesian coordinates), and the user's eye location $X_u = (X_u, Y_u, Z_u)(Z_u > 0)$ in full world space (screen-centered Cartesian coordinates)—to compute the source point $(u_0, v_0)$ in rear fisheye image space (Cartesian coordinates) that should be displayed at the target point. To do this, certain example embodiments may:

Step 1. Convert the target point to full world space (screen-centered Cartesian coordinates):

$$X_0 = (x_0 - w/2)/p$$

$$Y_0 = (y_0 - h/2)/p$$

Let $X_0 = (X_0, Y_0, 0)$ to denote it.

Step 2. The equation of the line in full world space (screen-centered Cartesian coordinates) passing through the target point $X_0$ and user's eyes $X_u$ is then $X = X_0 + \lambda D$ (1), where $D = (X_0 - X_u)/|X_0 - X_u|$ is a vector of length 1 pointing from the user's eyes $X_u$ to the target point $X_0$ and $\lambda$ is a real number that represents distance traveled in the direction of this vector starting from $X_0$.

Step 3. It would be desirable to display the correct portion of the half-space $\{Z<0\}$ according to the user's perspective. However, the image of that half-space is captured from the back camera's perspective. To attempt to allow correction for this perspective offset, imagine (normally) collapsing the half-space $\{Z<0\}$ onto the hemisphere $\{Z<0, |X-X_b|^2=R^2\}$ of radius R centered at the back camera location $X_b$. Then, either (1) pick R according to some heuristic, of (2) allow users to calibrate the value of R manually.

Step 4. To find the point on the hemisphere that should be displayed at $X_0$, imagine extending the line (1), tracing the user's line of sight until it intersects with the hemisphere. This intersection point is given by one root of the equation:

$$\lambda_0 = -(D \cdot (X_0 - X_b)) \pm \sqrt{(D \cdot (X_0 - X_b)) + R^2 - |X_0 - X_b|^2} \quad (2)$$

When $R \gg |X_b - X_u|, |X_0 - X_b|$, the solutions of this equation are approximately $\pm R$; the same solutions that would be expected if ignoring the perspective offset altogether. To determine whether to pick the positive or negative root in (5), consider the Z component of $X_0 + \mu_0 E$, which is $\mu_0 W/|X_0 - X_u|$. This should be positive, as the intersection point that lies behind the iPad should be picked rather than the intersection point in front of the iPad, which is possible when $\lambda_0 > 0$. The positive root in (2) therefore is picked.

$$\lambda_0 = -(D \cdot (X_0 - X_b)) + \sqrt{(D \cdot (X_0 - X_b)) + R^2 - |X_0 - X_b|^2} \quad (2)$$

Figure 33:
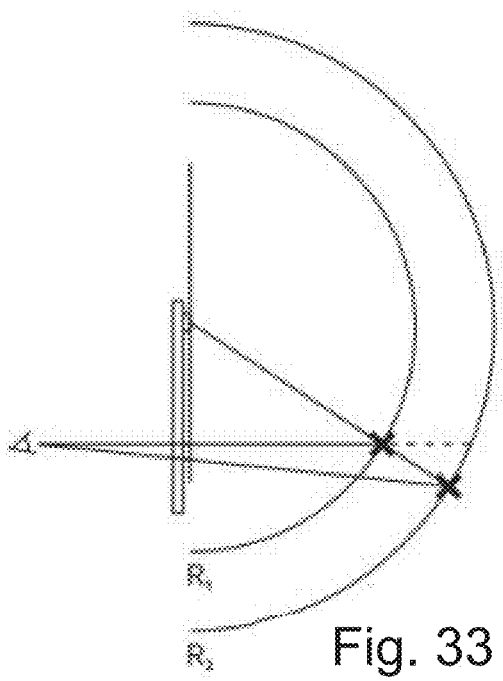
FIG. 33 helps demonstrate rear image warping techniques that may be used in connection with certain example embodiments.

See FIG. 33 for a schematic.

Step 5. The intersection point $X_i = X_0 + \lambda_0 D$ in full world space (screen-centered Cartesian coordinates) is now known. It should be converted to half world space (back-cam-centered Cartesian coordinates): $I_0 = X_i - 3.07$; $J_0 = -Z_i$; and $K_0 = Y_i - 4.55$.

Step 6. Convert to half world space (back-cam-centered optical coordinates):

$$\Theta_0 = \arctan(K_0, I_0)$$

$$\Phi_0 = \arctan(\sqrt{I_0^2 + K_0^2}, J_0)$$

$\Gamma$ = irrelevant here

Step 7. Collapse to fisheye image space (polar coordinates): $r_0 = d\Phi_0/v = d\Phi_0/\pi$ and $\theta_0 = \Theta_0$.

Step 8. Convert to fisheye image space (Cartesian coordinates): $u_0 = d/2 + r \cos(\theta_0)$ and $v_0 = d/2 + r \sin(\theta_0)$.

C. Front Image Warping

This technique may be used—given a target point $(x_0, y_0)$ in display image space (Cartesian coordinates), and the user's eye location $X_u = (X_u, Y_u, Z_u)(Z_u > 0)$ in full world space (screen-centered Cartesian coordinates)—to compute the source point $(u_0, v_0)$ in front fisheye image space (Cartesian coordinates) that should be displayed at the target point. To do this, certain example embodiments may:

Step 1. Convert the target point to full world space (screen-centered Cartesian coordinates):

$$X_0 = (x_0 - w/2)/p$$

$$Y_0 = (y_0 - h/2)/p$$

Let $X_0 = (X_0, Y_0, 0)$ to denote it.

Step 2. The equation of the line in full world space (screen-centered Cartesian coordinates) passing through the target point $X_0$ and user's eyes $X_u$ is then $X = X_0 + \lambda D$ (3), where $D = (X_0 - X_u)/|X_0 - X_u|$ is a vector of length 1 pointing from the user's eyes $X_u$ to the target point $X_0$ and $\lambda$ is a real number that represents distance traveled in the direction of this vector starting from $X_0$.

Step 3. The equation of the line in full world space (screen-centered Cartesian coordinates) representing the incident ray that will be reflected along the line (3) is then $X = X_0 + \mu E$ (4), where E is a reflected vector of length 1 pointing away from the target point $X_0$, and $\mu$ is a real number that represents distance traveled along this reflected vector starting from $X_0$. Here, because reflection occurs in the plane $\{Z=0\}$, E can be obtained from D by switching the sign of the Z-component.

Step 4. It would be desirable to display the correct portion of the half-space $\{Z>0\}$ according to the user's perspective. However, the image of that half-space is captured from the front camera's perspective. To attempt to allow correction for this perspective offset, imagine (normally) collapsing the half-space $\{Z>0\}$ onto the hemisphere $\{Z>0, |X-X_f|^2=R^2\}$ of radius R centered at the front camera location $X_f$. Then, either (1) pick R according to some heuristic, of (2) allow users to calibrate the value of R manually.

Step 5. To find the point on the hemisphere that should be displayed at $X_0$, imagine extending the line (4), tracing the user's reflected line of sight until it intersects with the hemisphere. This intersection point is given by one root of the equation:

$$\mu_0 = -(E \cdot (X_0 - X_f)) \pm \sqrt{(E \cdot (X_0 - X_f)) + R^2 - |X_0 - X_f|^2} \quad (5)$$

When $R \gg |X_f - X_u|, |X_0 - X_f|$, the solutions of this equation are approximately $\pm R$; the same solutions that would be expected if ignoring the perspective offset altogether. To determine whether to pick the positive or negative root in (2), consider the Z component of $X_0 + \lambda_0 D$, which is $-\lambda_0 W/|X_0 - X_u|$. This should be negative, as the intersection point that lies in front of the iPad should be picked rather than the intersection point behind the iPad, which is possible when $\mu_0 > 0$. The positive root in (5) therefore is picked.

$$\mu t_0 = -(E \cdot (X_0 - X_f)) + \sqrt{(E \cdot (X_0 - X_f)) + R^2 - |X_0 - X_f|^2}$$

Step 6. The intersection point $X_i = X_0 + \mu_0 E$ in full world space (screen-centered Cartesian coordinates) is now known. It should be converted to half world space (front-cam-centered Cartesian coordinates): $I_0 = -X_i$; $J_0 = Z_i$; and $K_0 = Y_i - 4.57$.

Step 6. Convert to half world space (front-cam-centered optical coordinates):

$$\Theta_0 = \arctan(K_0, I_0)$$

$$\Phi_0 = \arctan(\sqrt{I_0^2 + K_0^2}, J_0)$$

$\Gamma$ = irrelevant here

Step 7. Collapse to fisheye image space (polar coordinates): $r_0 = d\Phi_0/v = d\Phi_0/\pi$ and $\theta_0 = \Theta_0$.

Step 8. Convert to fisheye image space (Cartesian coordinates): $u_0 = d/2 + r \cos(\theta_0)$ and $v_0 = d/2 + r \sin(\theta_0)$.

III. Single Static Equirectangular to Device-Attitude-Adjusted

A. Equirectangular Image Warping

Here, a high-level goal may be thought of as—given a single equirectangular image representing a 360° by 180° scene, where the left half of the image represents the 180° by 180° scene captured by the front-facing portion of a 360° camera and the right half of the image represents the 180° by 180° scene captured by the rear-facing portion of a 360° camera, and information about the current device attitude relative to the reference attitude at which the equirectangular image was captured—construct the equirectangular image representing the original 360° by 180° scene as it would have been captured from the same position and the current device attitude. From an implementation perspective, this may be thought of as—given a target point $(s_0, t_0)$ in full equirectangular image space (Cartesian coordinates), and a CMAttitude instance describing relative device attitude—compute the source point $(s_1, t_1)$ in full equirectangular image space (Cartesian coordinates) that should be displayed at the target point. (CMAttitude according to Apple developer guidelines represents the device's orientation relative to a known frame of reference at a point in time.) This may be accomplished in certain example embodiments by:

Step 1. Convert to full equirectangular image space (geographic coordinates):

$$\alpha_0 = \pi\left(\frac{t}{\eta} - \frac{1}{2}\right)$$

$$\beta_0 = 2\pi\left(\frac{s}{\omega} - \frac{1}{4}\right)$$

Step 2. Project to full world space (360-cam-centered geographic coordinates). Radius is arbitrary (see step 5), so fix $C_0 = 1$ without loss of generality: $A_0 = \alpha_0$ and $B_0 = \beta_0$.

Step 3. Convert to full world space (screen-centered Cartesian coordinates): $X_0 = \cos(A_0) \sin(B_0)$; $Y_0 = \sin(A_0)$; and $Z_0 = -\cos(A_0) \cos(B_0)$.

Step 4. Given a CMAttitude instance that expresses current device attitude relative to a reference attitude, we can obtain a corresponding rotation matrix R. (A rotation matrix in linear algebra describes the rotation of a body in three-dimensional Euclidean space.) Values in R are to be interpreted in device-centered (equiv. screen-centered) Cartesian coordinates. Through experimentation, it has been determined that:

A pure relative pitch of $\psi$ radians produces the rotation matrix $$\begin{bmatrix} r_{11} & r_{12} & r_{13} \\ r_{21} & r_{22} & r_{23} \\ r_{31} & r_{32} & r_{33} \end{bmatrix} = \begin{bmatrix} 1 & 0 & 0 \\ 0 & \cos(\psi) & \sin(\psi) \\ 0 & -\sin(\psi) & \cos(\psi) \end{bmatrix}$$

A pure relative roll of $\psi$ radians produces the rotation matrix $$\begin{bmatrix} r_{11} & r_{12} & r_{13} \\ r_{21} & r_{22} & r_{23} \\ r_{31} & r_{32} & r_{33} \end{bmatrix} = \begin{bmatrix} \cos(\psi) & 0 & -\sin(\psi) \\ 0 & 1 & 0 \\ \sin(\psi) & 0 & \cos(\psi) \end{bmatrix}$$

A pure relative yaw of $\psi$ radians produces the rotation matrix $$\begin{bmatrix} r_{11} & r_{12} & r_{13} \\ r_{21} & r_{22} & r_{23} \\ r_{31} & r_{32} & r_{33} \end{bmatrix} = \begin{bmatrix} \cos(\psi) & \sin(\psi) & 0 \\ -\sin(\psi) & \cos(\psi) & 0 \\ 0 & 0 & 1 \end{bmatrix}$$

Consider any given point in full world space with position X in device-centered coordinates. After a device attitude change, that same point in full world space now has device-centered coordinates RX. For example, for a pure relative pitch with $\psi = \pi/4$, $$\begin{bmatrix} 1 & 0 & 0 \\ 0 & \frac{1}{\sqrt{2}} & \frac{1}{\sqrt{2}} \\ 0 & -\frac{1}{\sqrt{2}} & \frac{1}{\sqrt{2}} \end{bmatrix} \begin{bmatrix} 0 \\ 1 \\ 0 \end{bmatrix} = \begin{bmatrix} 0 \\ \frac{1}{\sqrt{2}} \\ -\frac{1}{\sqrt{2}} \end{bmatrix}$$

Because a source point for a given target point is being sought, the inverse operation is performed. In other words, given a point with position X0 in device-centered coordinates after device rotation, determine the position of that point in device-centered coordinates before rotation. This can be achieved by applying the inverse rotation matrix: $X_1 = R^{-1} X_0$. Because R is a rotation matrix, this is equivalent to $X_1 = R^T X_0$.

Step 5. Convert to full world space (360-cam-centered geographic coordinates): $A_1 = \arcsin(Y_1)$; $B_1 = \arctan(X_1, -Z_1)$; and $C_1$ is irrelevant here.

Step 6. Collapse to full equirectangular image space (geographic coordinates): $\alpha_1 = A_1$ and $\beta_1 = B_1$.

Step 7. Convert to full equirectangular image space (Cartesian coordinates):

$$s_1 = \left(\frac{\beta_1 + \frac{\pi}{2}}{2\pi}\right) \omega \bmod \omega$$

$$t_1 = \left(\frac{\alpha_1 + \frac{\pi}{2}}{\pi}\right) \eta \bmod \eta$$

B. Fisheye Image Extraction

Here, a high-level goal may be thought of as—given a single equirectangular image representing a 360° by 180° scene, where the $r_1$ pixel by $r_1$ pixel left half of the image represents the 180° by 180° scene captured by a front-facing camera assumed to have been located at the center of the screen, and the $r_1$ pixel by $r_1$ pixel right half of the image represents the 180° by 180° scene captured by a rear-facing camera assumed to have been located at the center of the screen—construct two fisheye images representing the two 180° by 180° scenes in the left (front-facing) and right (rear-facing) halves of the equirectangular image. From an implementation perspective, this may be thought of as— given a target point $(x_0, y_0)$ in fisheye image space (Cartesian coordinates)—compute the source point (so, to) in half equirectangular image space (cartesian coordinates) that should be displayed at the target point. This may be accomplished in certain example embodiments as follows. It will be appreciated that the steps that follow refer to the front scene/fisheye image, but the same steps and conversions work for the rear scene/fisheye image.

Step 1. Convert to fisheye image space (polar coordinates):

$$r_0 = \sqrt{(u_0-\eta/2)^2 + (v_0-\eta/2)^2}$$

$$\theta_0 = \arctan(v_0-\eta/2, \mu_0-\eta/2)$$

Step 2. Project into half world space (front-cam-centered optical coordinates). Radius is arbitrary (see step 5), so this can be fixed without loss of generality: $\Theta_0=\theta_0$ and $\Phi_0=vr_0/\eta=\pi r_0/\eta$.

Step 3. Convert to half world space (front-cam-centered Cartesian coordinates): $I_0=\sin(\Phi_0)\cos(\Theta_0)$; $J_0=\cos(\Phi_0)$; and $K_0=\sin(\Phi_0)\sin(\Theta_0)$.

Step 4. Convert to half world space (front-cam-centered geographic coordinates):

$$A_0 = \arctan(K_0, \sqrt{I_0^2+J_0^2})$$

$$B_0 = \arctan(I_0, J_0)$$

$C_0$—irrelevant here

Step 5. Collapse to half equirectangular image space (geographic coordinates): $\alpha_0=A_0$ and $\beta_0=B_0$.

Step 6. Convert to half equirectangular image space (cartesian coordinates):

$$s_0 = \left(\frac{\beta_0 + \frac{\pi}{2}}{\pi}\right)\eta \bmod \eta$$

$$t_0 = \left(\frac{\alpha_0 + \frac{\pi}{2}}{\pi}\right)\eta \bmod \eta$$

APPENDIX B: EXAMPLE TECHNIQUES FOR DUAL IMAGE CAPTURE AND BALANCING

The following description provides example techniques for transmitted/reflected image capture. For instance, the following description outlines steps that may be followed in a dynamic experience to capture separate front and rear input images, as if they were taken by the same camera subject to uniform exposure and white balance adjustments.

Step 1: Allow the user to capture a rear fisheye image using auto white balance and auto exposure.

Step 2: Configure the front camera using the metadata from the rear capture. The front capture duration is set to exactly match the rear capture duration. With some hardware, the front capture aperture is fixed at f/2.2; this cannot be balanced with the rear capture aperture, which is always f/1.8. To compensate for the forced difference in aperture, the ISO used for rear captures may be adjusted by a factor of $(2.2/1.8)$. The square accounts for the fact that f-number is linearly related to aperture diameter, but sensor illuminance is linearly related to aperture area. This compensation is valid independent of lens focal length differences, by design of the f-number scale.

In this regard, a 100 mm focal length f/4 lens has an entrance pupil diameter of 25 mm. A 200 mm focal length f/4 lens has an entrance pupil diameter of 50 mm. The 200 mm lens' entrance pupil has four times the area of the 100 mm lens' entrance pupil, and thus collects four times as much light from each object in the lens' field of view. But compared to the 100 mm lens, the 200 mm lens projects an image of each object twice as high and twice as wide, covering four times the area, and so both lenses produce the same illuminance at the focal plane when imaging a scene of a given luminance.

The front camera white balance (per-channel multiplicative) gains are set to match the rear camera white balance gains, with the exception of the red channel gain which is multiplied by a factor of about 1.82886/2.30566. This factor was determined experimentally by photographing a single scene under the same illumination with both front and rear cameras, and comparing the white balance gains computed by auto white balance adjustment.

APPENDIX C: EXAMPLE TECHNIQUES REGARDING GLAZING COLOR EFFECTS

The description that follows describes an example technique for adjusting RGB image color based on glazing spectral data. In general, the problem to be solved has the following form:

Given $I_{x,k} = \int_{390}^{700} L(\lambda)R_x(\lambda)C_k(\lambda)d\lambda$, where:

$k \in \{R,G,B\}$ $I_{x,k}$ represents the k-th channel pixel intensity corresponding to a point x in the scene $L(\lambda)$ represents the spectral power distribution of the scene illuminant, $R_x(\lambda)$ represents the spectral reflectance of a point x in the scene, and $C_k(\lambda)$ represents the capture system spectral sensitivity in the k-th channel compute $J_{x,k} = \int_{390}^{700} L(\lambda)R_x(\lambda)C_k(\lambda)d\lambda$, where $G(\lambda)$ represents the spectral attenuation due to a glazing sample.

In general, L, R, and $C_k$, and are unknown. Values for $G(\lambda)$ are available in the IGDB.

Assumptions may be made to help make this problem well-posed, e.g., to help compensate for the fact that integration discards information about the form of the integrand's components. Known capture system sensitivity and uniform scene luminance, for example, may be taken into account in this regard.

for example, if it is assumed that $L(\lambda)R_x(\lambda)=B_x$ throughout a lit scene—such that the scene radiance is constant across all wavelengths for each point x in the scene, and such that the capture system spectral sensitivities $C_k(\lambda)$ are known—then:

$$I_{x,k} \approx \int_{390}^{700} C_k(\lambda)d\lambda \text{ and}$$

$$J_{x,k} \approx \int_{390}^{700} G(\lambda)C_k(\lambda)d\lambda \text{ so that}$$

$$J_{x,k} \approx \frac{\int_{390}^{700} G(\lambda)C_k(\lambda)d\lambda}{\int_{390}^{700} C_k(\lambda)d\lambda}$$

This can be viewed as loosely analogous to the "gray world theory" used in white balancing algorithms, in which it is assumed that the scene "should" be 18% gray on average.

APPENDIX D: EXAMPLE TECHNIQUES FOR WHITE BALANCING

White balancing aims to solve the following problem: Given per-pixel generic RGB measurements of a scene, where those measurements are influenced by spectral properties/sensitivities of (at least) the scene, the illuminant(s), the camera lenses and coatings, the camera IR filter, the camera Bayer filter, and the camera sensor photosites themselves, compute the sRGB values that would have been observed by a human if the scene was instead illuminated by a known and relatively-spectrally-neutral light.

Solving this problem compensates for the fact that a human viewing the original scene under the original illumination would enjoy the benefits of color constancy when interpreting colors in the scene, but that same human viewing a photographic representation of the original scene under the original illumination would not enjoy those same benefits (because color constancy relies heavily on contextual cues that are missing when viewing the photographic representation, e.g. "ambient light").

This problem is complicated at least because:
(1) It is impossible to reverse information lost due to spectrally-limited light. In extreme cases, two spectrally-distinct materials subjected to unfortunate lighting may be recorded as identical generic RGB values. No amount of post-capture correction can recover this lost information; localized inference and restoration is required.
(2) The equivalence classes of colors identifiable by a camera and the equivalence classes of colors identifiable by humans are not identical. More plainly, there are some colors that a camera can distinguish that a human cannot, and vice versa. While this property of cameras does not directly impact white balancing, it could skew results if unacknowledged. This is reflected in the Sensitivity Metamerism Index for example.

Most solutions take a black box approach. That is, rather than attempting to reason in the spectral domain using knowledge of the spectral properties of camera components, all reasoning occurs in three-dimensional color spaces and the focus is on neutral output. This is a practical choice, since scene spectral data is almost never available.

There are a number of algorithms that may be used in connection with certain example embodiments. Color-Checker Correction is a first example. When many areas of known spectral properties are captured in the photographed scene (e.g. a ColorChecker chart with 24 swatches), it may be posited that the "actual" R/G/B at a given pixel (as would be observed under a more neutral illuminant) are functions of the observed R/G/B values:

$$R_{actual} = \rho_0 + \rho_1 R_{obs} + \rho_2 G_{obs} + \rho_3 B_{obs} + \rho_4 R^2_{obs} + \rho_5 G^2_{obs} + \rho_6 B^2_{obs} + \ldots$$

$$G_{actual} = \gamma_0 + \gamma_1 R_{obs} + \gamma_2 G_{obs} + \gamma_3 B_{obs} + \gamma_4 R^2_{obs} + \gamma_5 G^2_{obs} + \gamma_6 B^2_{obs} + \ldots$$

$$B_{actual} = \beta_0 + \beta_1 R_{obs} + \beta_2 G_{obs} + \beta_3 B_{obs} + \beta_4 R^2_{obs} + \beta_5 G^2_{obs} + \beta_6 B^2_{obs} + \ldots$$

The cross terms that mix observed color channels are usually unimportant, and higher powers typically fail to improve accuracy.)

Using 24 sets of 3 observed values, it is possible to write a system of 3 sets of 24 equations, each for 10 unknowns, then approximately solve for those 10 unknowns using linear least squares. It is possible for this approximation method to fail if matrices are ill-conditioned (e.g., when known-distinct ColorChecker colors appear identical to the observation device under the original illuminant).

Another algorithm approach that may be used is neutral patch correction. In this regard, if a known-neutral patch is captured in the photographed scene (e.g., a white balance card), it may be posited that the "actual" R/G/B at a given pixel (as would be observed under a more neutral illuminant) are linear functions of the observed R/G/B values:

$$R_{actual} = \rho R_{obs}$$

$$G_{actual} = \gamma G_{obs}$$

$$B_{actual} = \beta B_{obs}$$

Here, $\rho$, $\gamma$, and $\beta$ match the per-channel "white balance gains" as reported. Because the patch measured is known to be neutral, $R_{actual} = G_{actual} = B_{actual} = \lambda$. When scaled appropriately, these equations then become:

$$R_{actual} = \lambda R_{obs}/R'_{obs}$$

$$G_{actual} = \lambda G_{obs}/G'_{obs}$$

$$B_{actual} = \lambda B_{obs}/B'_{obs}$$

It is sometimes desirable to choose to avoid blowing or tinting highlights.

Yet another algorithm that may be used in connection with certain example embodiments is neutral estimate correction. If no known-neutral patch is captured in the photographed scene, a region of neutrality is guessed. This may be achieved using a gray world model (averaging the entire image), retinex theory (looking at the coloration of near-highlights), or similar. Then the steps from the neutral patch correction technique are repeated.

Additional information is provided in, for example:
http://www.odelama.com/photo/Developing-a-RAW-Photo-by-hand/
http://www.odelama.com/photo/Developing-a-RAW-Photo-by-hand/Developing-a-RAW-Photo-by hand_Part-2
https://www.dxomark.com/About/In-depth-measurements/Measurements/Color-sensitivity
http://therefractedlight.blogspot.com/2011/09/white-balance-part-2-gray-world.html
https://www.rawdigger.com/howtouse/color-is-a-slippery-trickster https://en.wikipedia.org/wiki/Colortemperature#Digitalphotography
https://en.wikipedia.org/wiki/Color balance
https://en.wikipedia.org/wiki/Whitepoint
https://www.mathworks.com/help/images/examples/comparison-of-auto-white-balance-algorithms.html
https://www.adobe.com/digitalimag/pdfs/understanding-_digitalrawcapture.pdf

APPENDIX E: EXAMPLE TECHNIQUES FOR HANDLING CHROMATIC ABERRATIONS

There are two types of chromatic aberration (CA): lateral and longitudinal. Image correction techniques for both involve estimating a distortion map based on the geometries of the three RGB channels captured in a RAW image. For longitudinal CA, the distortion is generally radial. For lateral CA, the distortion is generally modeled via some polynomial function with unknown coefficients. Landmark (edge) detection is then run separately on the three color channels and used to estimate unknown scaling/parameters via least squares.

These fixes are agnostic of all upstream capture technology and processing and thus need not be used in connection with certain example embodiments that relate to color modeling.

APPENDIX F: EXAMPLE TECHNIQUES FOR PAN/TILT MODE

The description that follows explains example computations that may be used if the device is used in a pan/tilt mode. Pan is the direction of the vector from the user's eyes (assumed to be fixed in space) to the center of the device, and tilt is the angle formed between the vector from the user's eyes to the center of the device and the vector normal to the device's screen.

In general, it is difficult to simultaneously infer pan and tilt from device attitude changes alone, since there is no reliable way to distinguish between (for example) a change in device roll due to the user rotating the device sideways about its center and a change in device roll due to the user translating the device sideways around themselves. However, if it is known whether the user is currently tilting or panning, it is possible to interpret observed changes in device attitude appropriately. The description that follows describes how this may be accomplished.

When dealing with iPads, for example, the total relative device attitude dictates which part of the static scene is in front of the iPad and which part of the static scene is behind the iPad. This is true whether the total relative device attitude was arrived at through panning the device, tilting the device, or some combination of the two. Furthermore, tilting the app influences the position of the user's eyes in screen-centered coordinates, whereas panning does not.

Certain example embodiments therefore receive as inputs the total relative device attitude, to compute the front and rear scenes from our static image; and the net tilt-only relative device attitude (e.g., the portion of the total relative device attitude due to movements made while in tilt mode), to compute the net user position in screen-centered coordinates.

The former is easily computed for each device motion update by comparing to the current center reference attitude, which changes infrequently. The latter can be more complicated because a subset of device attitude changes may need to be processed. The following may be implemented:

Step 1. Keep a reference to the last total relative device attitude received (so that it becomes possible to compute the change in device attitude for each frame).

Step 2. Keep a reference to a net tilt matrix that matches the net tilt-only relative device attitude (as a CMAttitude instance may not be usable to track this information because instances may not be modified or newly constructed).

Step 3. When a new total relative device attitude is in tilt mode, compute the change in device attitude since the last frame; convert this device attitude change to a tilt increment matrix; and update the net tilt matrix by multiplying it by the tilt increment matrix.

APPENDIX G: EXAMPLE TECHNIQUES FOR DISTORTION VALIDATION

The description that follows helps demonstrate how certain example embodiments can compute global transformation functions for certain limited device movements in order to allow validation of the fully-general transformations allowed by our primary image processing code. This includes, for example, pure roll. Consider a fixed Cartesian coordinate system whose origin coincides with the center of the iPad. (This is not the screen-centered coordinate system discussed above in Appendix A.) Imagine that the iPad lies in the plane $\{Z=0\}$.

When the iPad is rolled the center fixed in space, the fully-general image processing code should skew the image displayed on the iPad's screen so that it appears exactly stationary when viewed by a user located at (0, 0, D). Equivalently, the iPad can be thought of as a portal through which we are viewing a fixed scene. The skewing can be validated as being correct by taking the skewed image and mathematically projecting it back into the original reference plane $\{Z=0\}$. This skewed-then-projected image should exactly match the original image displayed by the iPad (possibly cropped) when overlaid.

This check for pure rolls may be performed as the calculation of the projection is relatively straightforward compared to general movements. The same applies to pure pitches and pure yaws.

In this regard, let the amount of roll in radians be $\alpha$, so that a point $(X_0, Y_0, 0)$ on the iPad's screen moves to $(X_0 \cos(a), Y_0, -X_0 \sin(\alpha))$.

The projection of this point back into the plane $\{Z=0\}$ as seen from the user located at $$(0, 0, D) \text{ is } (X_1, Y_1, Z_1) = \frac{D}{D + X_0 \sin(\alpha)}(X_0 \cos(\alpha), Y_0, 0).$$

To implement this projection as a CIFilter, it is useful to compute the reverse transformation (given a target (projected) point, find the source (screen) point):

$$(X_0, Y_0, Z_0) = \left(\frac{DX_1}{D\cos(\alpha) - X_1\sin(\alpha)}, \frac{DY_1\cos(\alpha)}{D\cos(\alpha) - X_1\sin(\alpha)}, 0\right).$$

APPENDIX H: EXAMPLE TECHNIQUES FOR IMPORTING IMAGES

The following description demonstrates how images can be imported and used in connection with certain example embodiments. Although any image can imported, it may be most desirable to use equirectangular 360 images.

Figure 34:
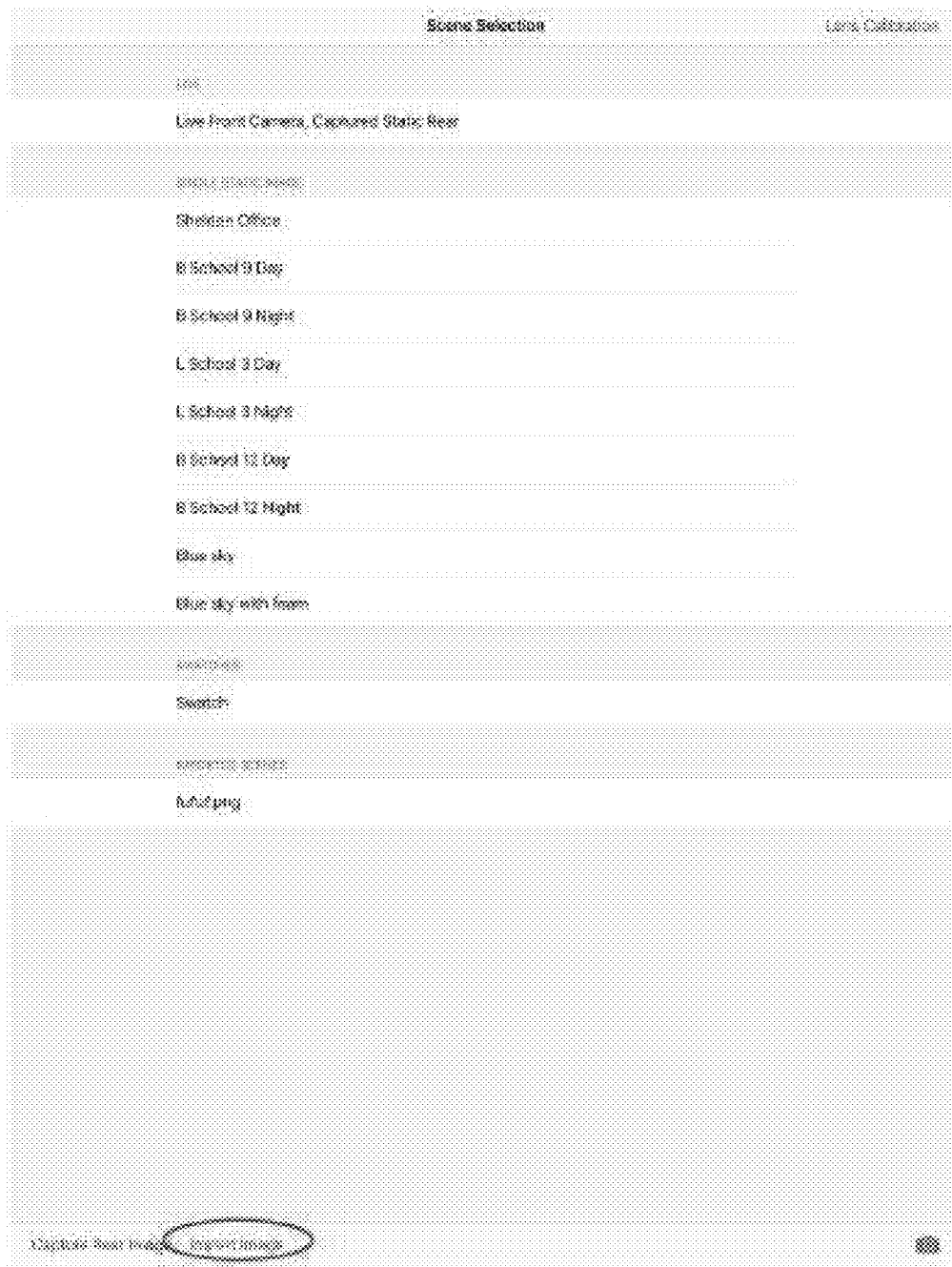
FIGS. 34-35 are example import screens that may be used in connection with certain example embodiments.
Figure 35:
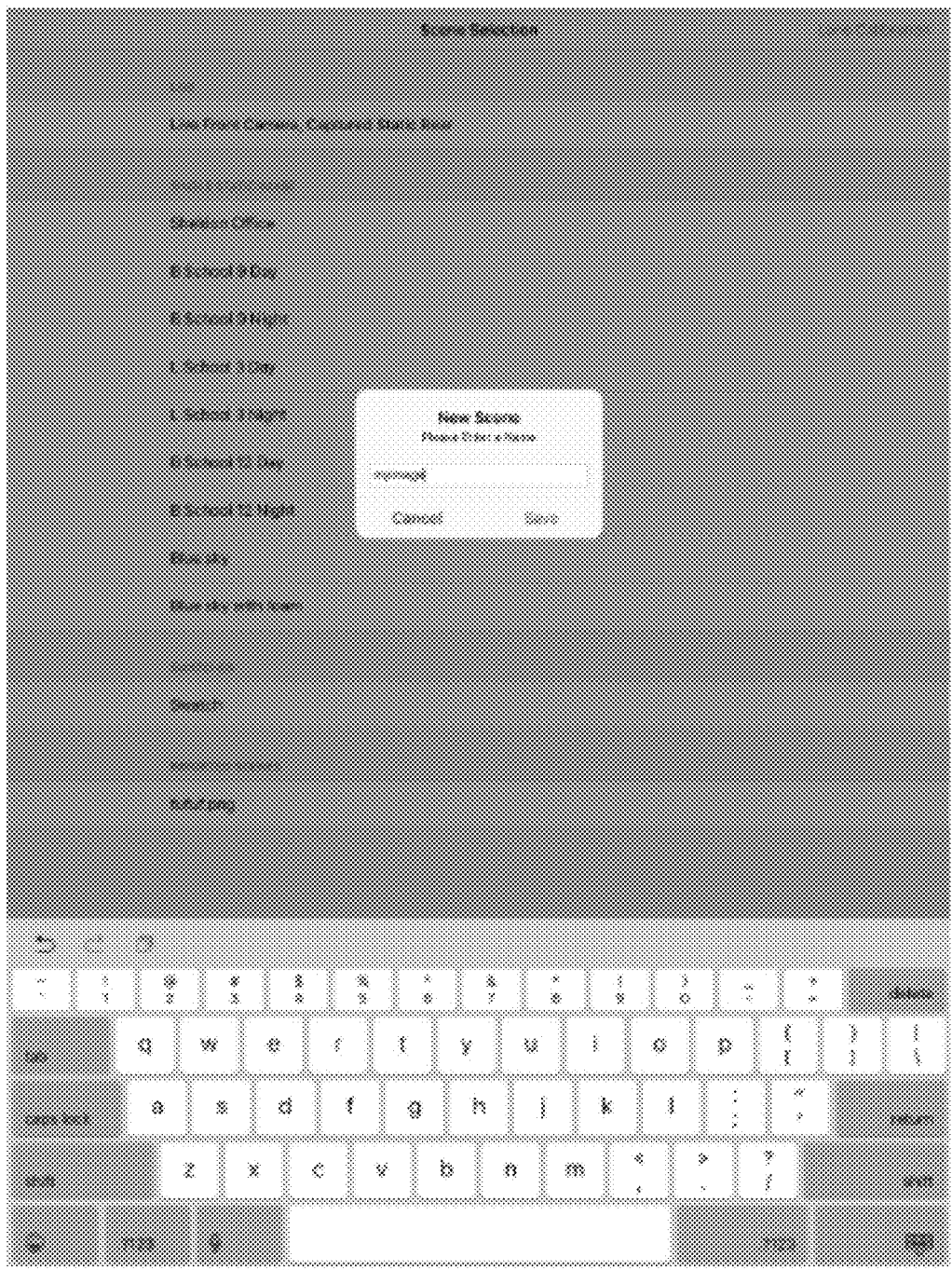

FIG. 34 is an example import screen that may be used in connection with certain example embodiments. As will be appreciated from FIG. 34, options are provided for switching to a "live" mode, and already-imported static images are shown in the list. Tapping on the import image button will open a file picker. Once the image is selected, it may be named. See FIG. 35 in this regard. Once the image is named, it will appear on the main list of scenes under the "Imported Scenes" header. The image may be removed by swiping on the image name in the list, pressing a delete confirmation button, and/or the like.

APPENDIX I: EXAMPLE TECHNIQUES FOR PROCESSING REFLECTION HIGHLIGHTS

The description that follows describes example processes that may be used to modify glazing filters to preserve more highlights in reflections. An example technique that may be used involves calculating the relative luminance, or perceptual brightness of pixels, to modify the reflective glazing filter. This relative luminance is calculated the same way that the Y value is calculated in CIE XYZ color space when being converted from Linear RGB.

Given a linear RGB value for a pixel, relative luminance is calculated with the formula $Y=0.2126R_{linear}+0.7152G_{linear}+0.0722B_{linear}$. This normalized Y value is applied to the glazing filter to alter the amount of filtering that is applied to the input image. As relative luminance for a pixel increases, less glazing effect and more of the original image are shown. The glazing effect is not completely removed in some implementations.

Additionally, this highlight emphasis $Y_{modified}$ has been parameterized around threshold p and linearity s of the effect using the following:

$$Y_{modified} = \begin{cases} f(x, p), & \text{if } 0 \leq x \leq p \\ 1 - f(1-x, 1-p) & \text{if } p < x < 1 \end{cases} \text{ using}$$

$$f(m, n) = \frac{m^c}{n^{(c-1)}} \text{ where}$$

$$c = \frac{2}{1-s}$$

This formula is used to de-linearize the highlight effect so that the parameters may be adjusted to attempt to achieve the desired effect in a given scene. This de-linearizing formula can break down when certain parameters are used due to divide by zero errors and thus may be replaced with other suitable algorithms.

For further information, see
https://en.wikipedia.org/wiki/Relative_luminance and
https://en.wikipedia.org/wiki/CIE1931color_space.

APPENDIX J: EXAMPLE TECHNIQUES FOR FISHEYE LENS CORRECTION

There are a number of known fisheye lens correction algorithms. One example that may be used in connection with certain example embodiments is described at http://paulbourke.net/dome/fisheyecorrect/, the entire contents of which is hereby incorporated by reference herein, and which is described in relevant part below.

APPENDIX K: EXAMPLE FISHEYE MATHEMATICS

Figure 36A:
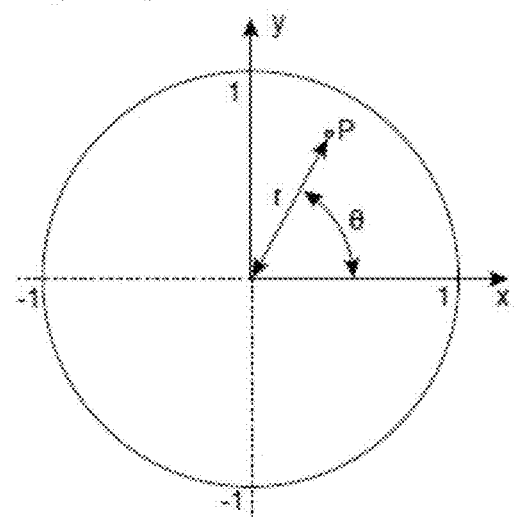
FIGS. 36A-36E help demonstrate aspects of fisheye images.
Figure 36B:
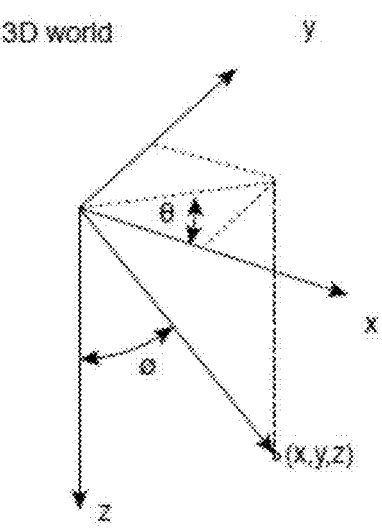

Any point P in a linear (mathematical) fisheye defines an angle of longitude and latitude and therefore a 3D vector into the world. See FIGS. 36A-36B in this regard. Any real fisheye can be turned into a linear fisheye using a 1D correction polynomial:

θ=longitude=a tan 2(P.y,P.x)
ø=latitude=r $ø_{max}$/2 where $ø_{max}$ is the field of view of the fisheye lens The vector into the word is given by:
x=sin(ø) cos(θ)
y=sin(ø) sin(θ)
z=cos(ø)

Figure 36C:
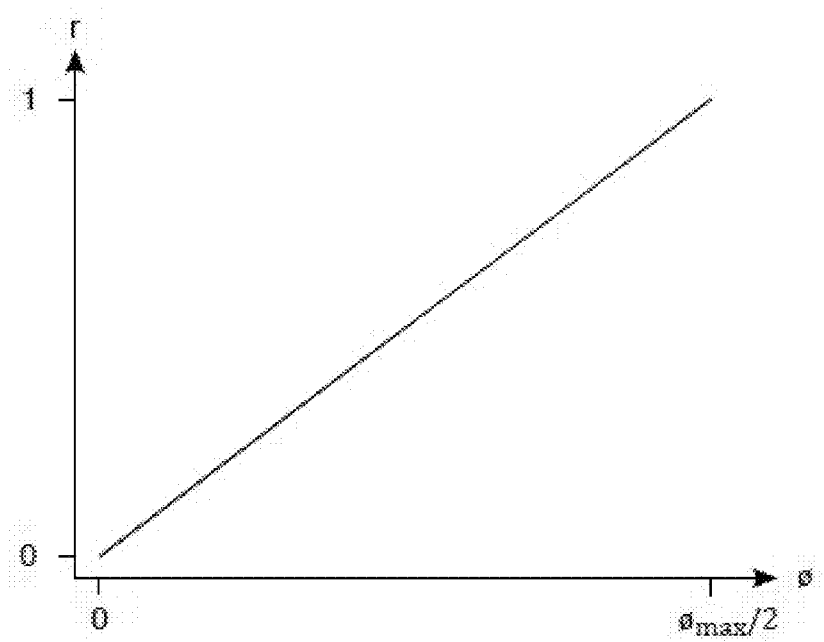

A key to a fisheye is the relationship between latitude ø of the 3D vector and radius on the 2D fisheye image, namely a linear one where ø(r)=r $ø_{max}$/2, where r is the radius of the point on the fisheye in normalized coordinates (−1 to 1 across the fisheye circle) and $ø_{max}$ is the field of view of the fisheye across the fisheye circle. Note that this one dimensional function for what is a 2 dimensional curve works because fisheye lenses, like other lenses, are formed from a spinning process and are thus radially symmetric. See FIG. 36C.

Where a real world fisheye deviates from the idealized relationship above is that real fisheye lenses are rarely (if ever) perfectly linear. Note a linear fisheye lens is often called a "true f-theta lens." Thus, at some stage of any fisheye mapping process, assuming the lens is not a true f-theta lens (or a close enough approximation), is a function that maps real points on the fisheye to their position on an ideal fisheye.

There are two possible functions depending on whether one needs to convert normalized radii to actual latitude, or whether one needs to convert latitude to actual radius. In both cases a 4th order polynomial function is usually adequate. The form will be $ax+bx^2+cx^3+dx^4$.

Noting that since the origin of the curve always passes through the origin there is no constant term, put another way, r=0 is always latitude=0.

Figure 36D:
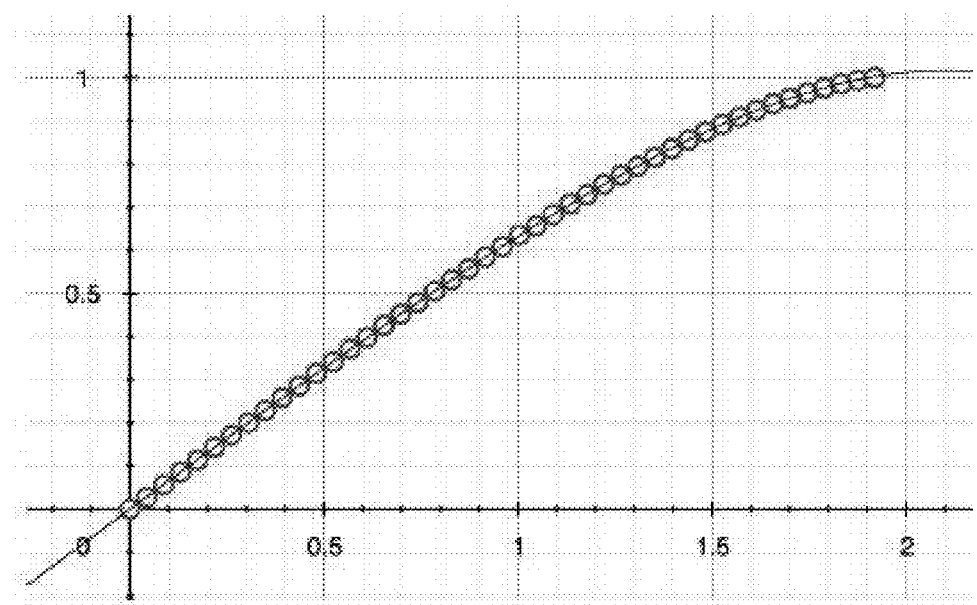

Illustrating this with an actual fisheye lens that is particularly nonlinear, the iZugar MKX22 220 degree fisheye, is shown in FIG. 36D. In FIG. 36D, the horizontal axis is latitude ø and the vertical axis is normalized radius (0 to 1). Fitting a 4th order polynomial gives the following:
r(ø)=0.6622ø−0.0163ø²+0.0029ø³−0.0169ø⁴.

In other words, given a latitude ø of a 3D vector the above gives the normalized radius on the fisheye. This is normally what is used for an image mapping of a fisheye into another image projection type, namely, one computes the 3D vector for each pixel in the output image and the above gives the radius of the pixel in the real fisheye image.

Figure 36E:
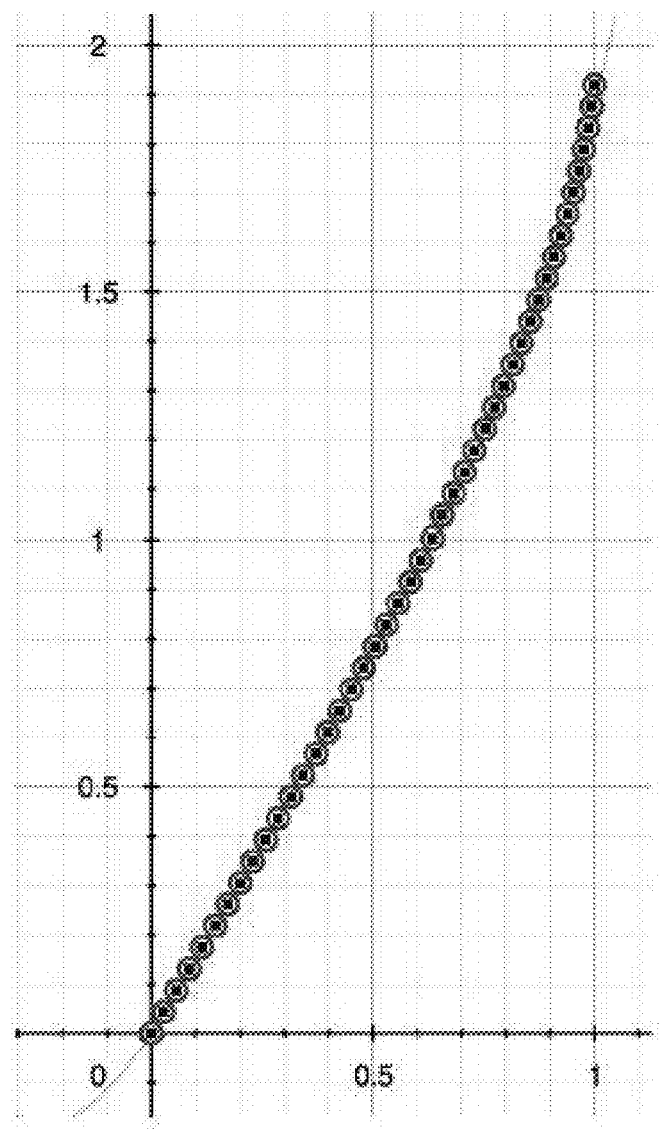

Sometimes, the other mapping is required. In this way, given a radius in the real fisheye image, a determination can be made as to the latitude of the corresponding 3D vector. While in some cases one can invert the polynomial or solve the inverse numerically, it may be easier to just fit another polynomial to the swapped data. FIG. 36E shows a normalized radius on the horizontal axis and latitude in radians on the vertical axis. The fitted polynomial is ø(r)=1.3202r+1.4539r²−2.9949r³+2.1007r⁴. In other words, given a normalized radius r on the fisheye image this gives the true latitude ø. This is the function one normally uses if mapping individual points from the fisheye into 3D space.

The description above provides examples of the r, ø curves and how polynomials can be fit to those to either derive the correct r on the fisheye image given a latitude, or calculate the correct latitude given r on the fisheye image. There a number of ways of calculating the points for these curves, and several examples will be set forth herein.

The concept of the zero parallax point of a fisheye lens/camera system is related to the "nodal point" in panorama photography. Rotating the lens about the zero parallax position ensures there will not be any stitching errors due to parallax. When doing measurements from a fisheye it is this zero parallax point that should be the origin.

Figure 37:
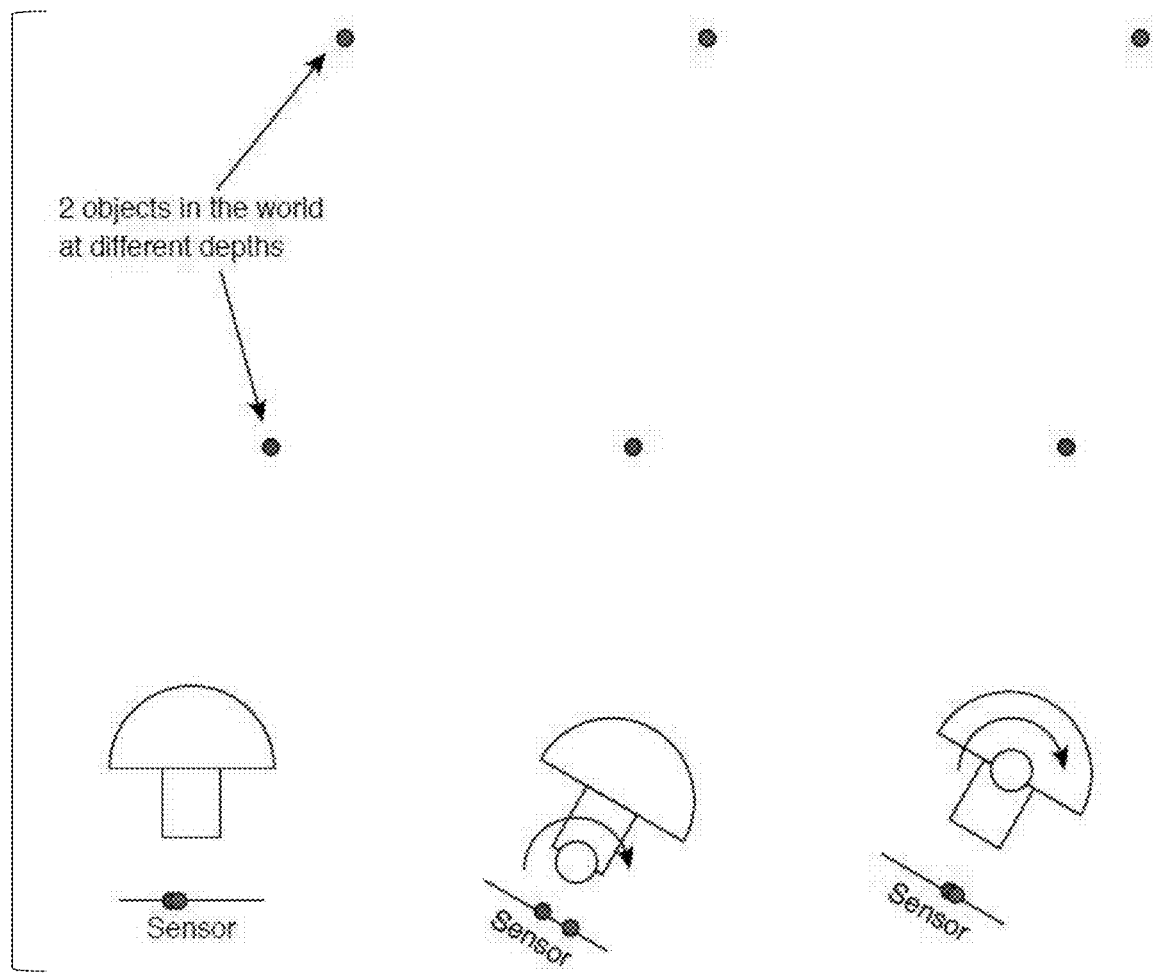
FIG. 37 helps demonstrate concepts related to the zero parallax point.
Figure 38:
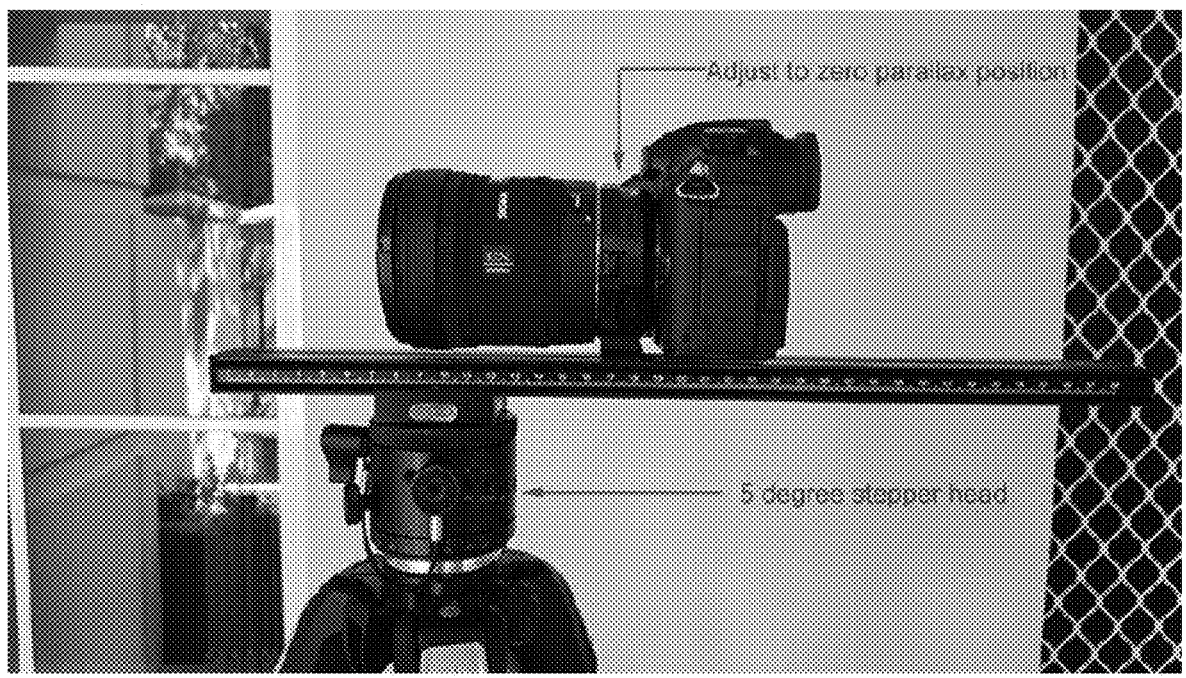
FIG. 38 shows an example setup for measuring the points for the linearizing curves.
Figure 39:
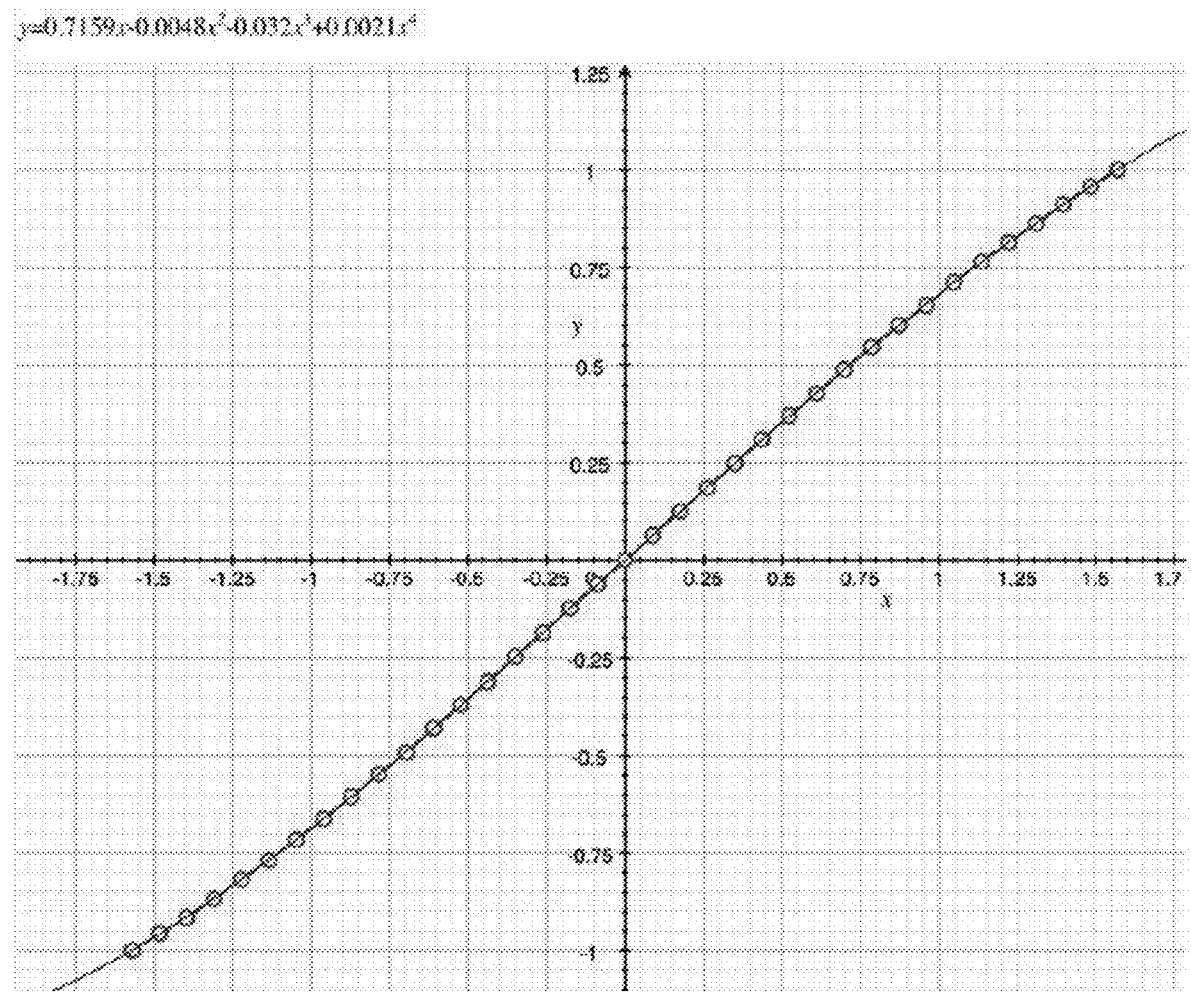
FIG. 39 is a graph showing example measurements taken using the FIG. 38 setup.

The zero parallax point is typically located somewhere along the barrel of the fisheye lens. Sometimes it is marked on the metal barrel of the lens. One can measure the zero parallax position by aligning two objects in a scene that are at different distances, then rotating the lens/camera and inspecting the two objects on the image. At zero parallax, the two objects will stay aligned, rotating about other positions will see the position of the near and far object separate. This is shown conceptually in FIG. 37, Once the zero parallax position is known, one can directly measure the points for the linearizing curves. One way is with a rotating camera head, e.g., with 5 (or other) degree increments. FIG. 38 shows an example setup for measuring the points for the linearizing curves, which may be used. In this setup, a marker for the scene (e.g. a line on a wall) is selected, and the camera/lens is rotated in equal angle steps, and photographs are taken. The position of the marker on each photograph is measured, giving r. Typically one first aligns the camera so the marker line is exactly center of the frame. One also typically rotates from $-\varnothing_{max}/2$ to $\varnothing_{max}/2$, for example. A graph such as that shown in FIG. 39 may be produced.

Figure 40:
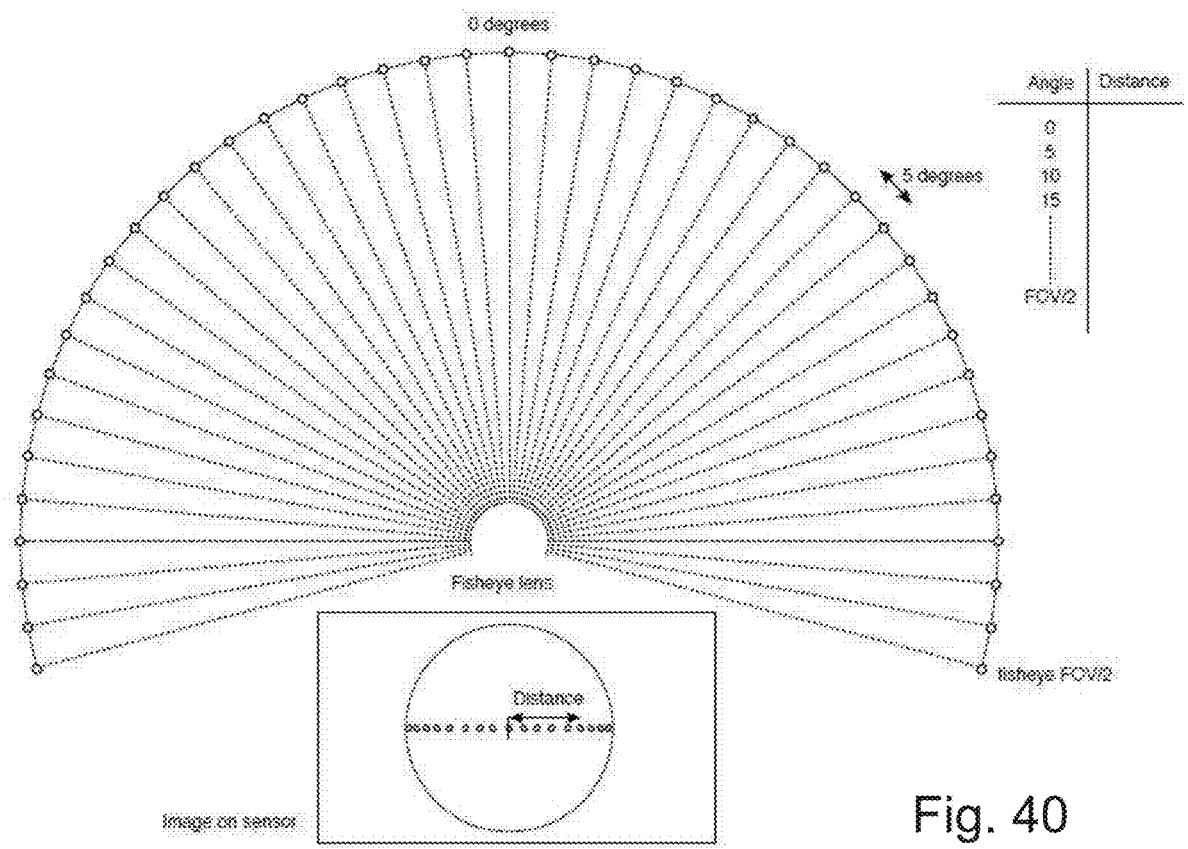
FIGS. 40-41 show another approach for measuring the points for the linearizing curves.
Figure 41:
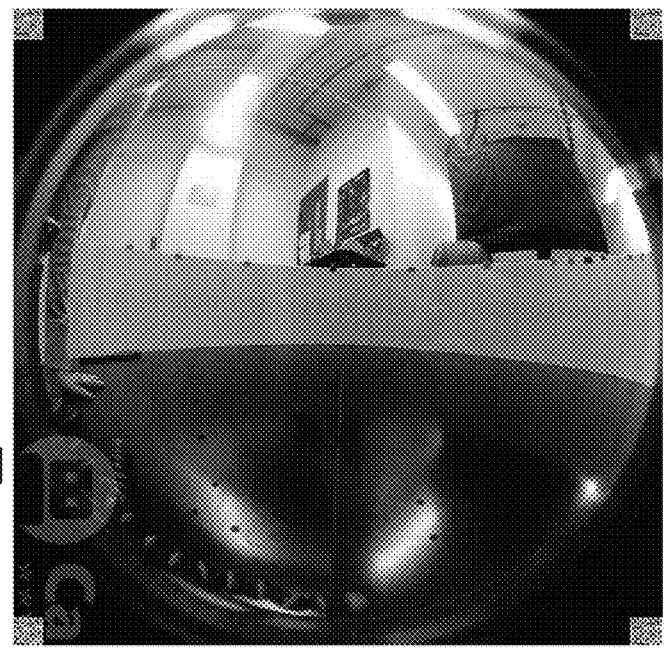

Another approach is to place a structure around the camera with markings of equal angle, or at least such that the angle can be measured. One reads off the angle markings on the camera image knowing their latitude in the real world. This is shown schematically in FIGS. 40-41.

Figure 42:
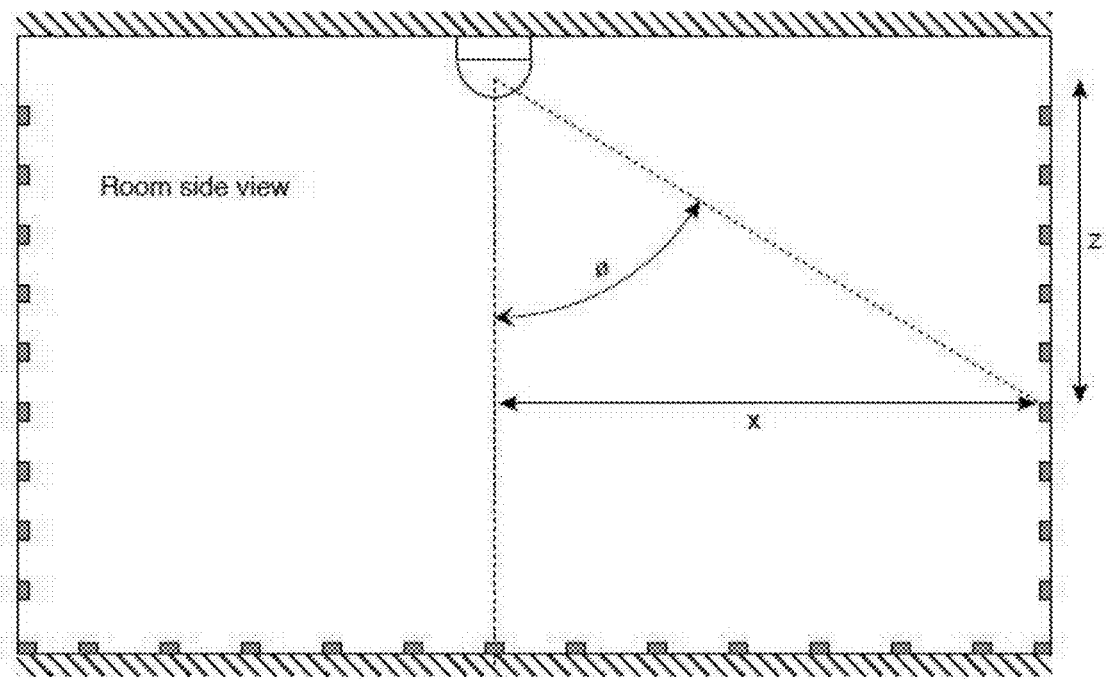
FIGS. 42-43 show still another approach for measuring the points for the linearizing curves.
Figure 43:
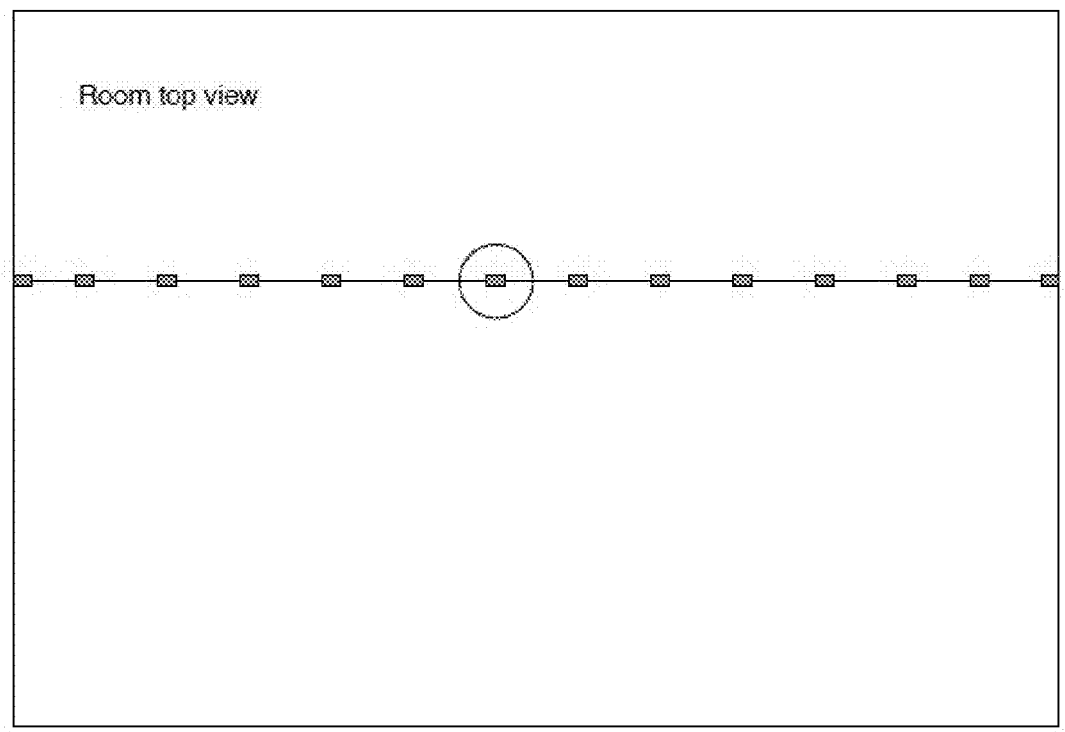

FIGS. 42-43 show still another approach for measuring the points for the linearizing curves. This approach involves placing markers at intervals along the floor and up opposite walls. The only real requirements is that the line of markers passes through an axis of the fisheye which in this example is pointing straight downwards from the ceiling. Measuring x and z allows one calculate the latitude 0. One then simply records the r value from the markers recorded in the camera image.

The origin for the measurements should be the zero parallax position on the lens barrel so as to reduce the parallax issues. However, because one often deals with small lenses, choosing the front face of the lens or the front plate of the camera is probably only going to be out by a centimeter or less and therefore may be acceptable in some implementations.

In theory, one only needs to do one half of one of the above (or other) procedures. But doing both halves can be a good test for symmetry (is the lens pointing straight down, are you measuring the center of the fisheye circle correctly, and so on), and thus may improve accuracy and reliability.

APPENDIX L: EXAMPLE FLOWCHARTS FOR COMPOSING IMAGE

Figure 44A:
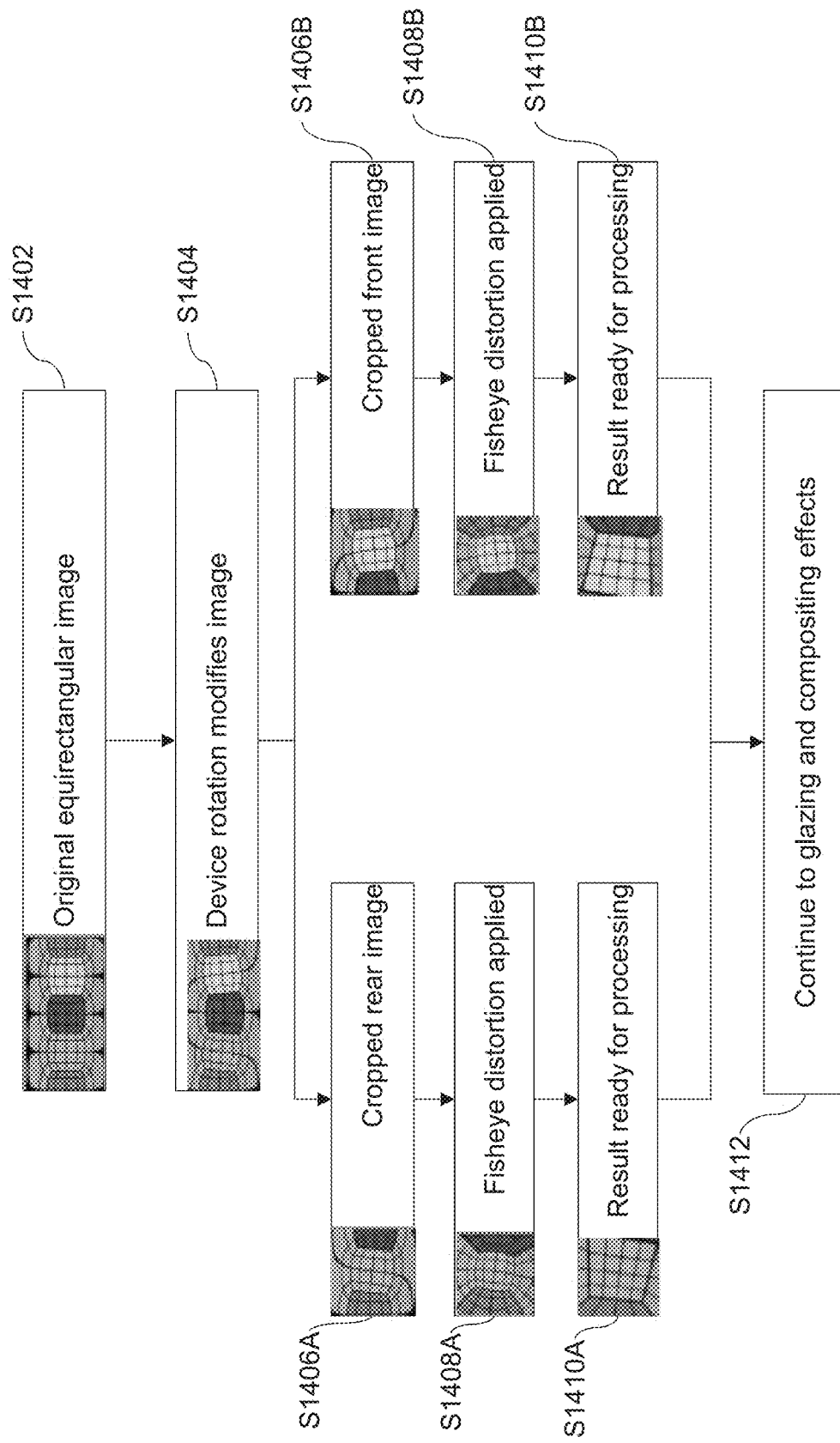
FIGS. 44A-44B are a flowchart showing how certain example techniques described herein can be used to view a composite image, in accordance with certain example embodiments.
Figure 44B:
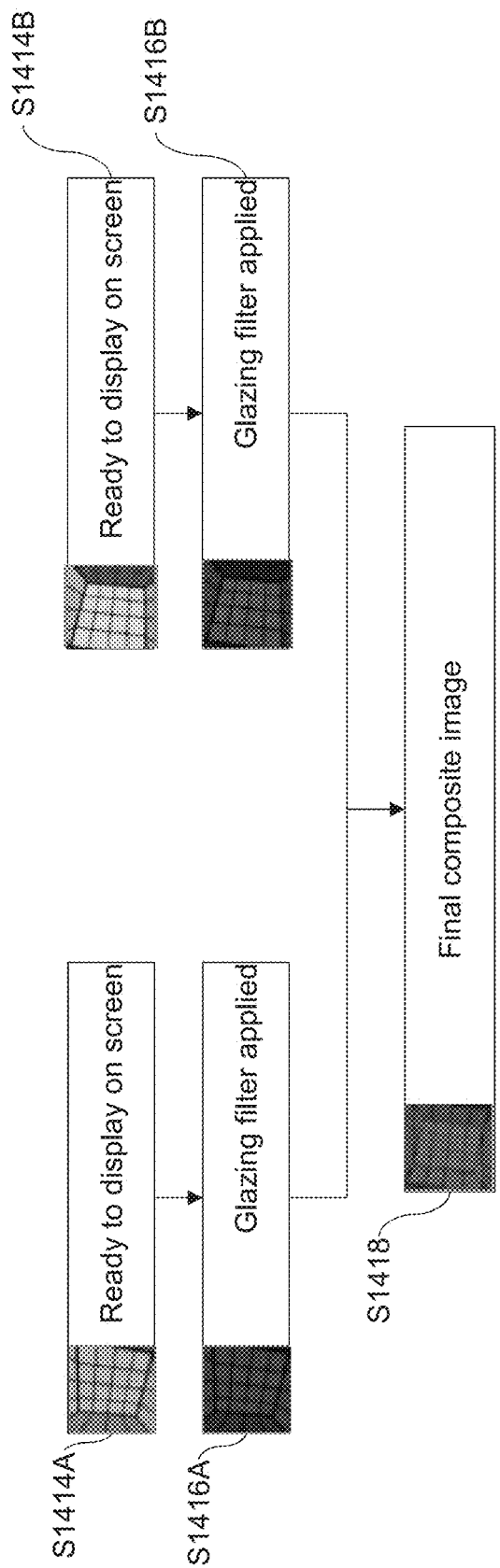

FIGS. 44A-44B are a flowchart showing how certain example techniques described herein can be used to view a composite image, in accordance with certain example embodiments. An original equirectangular image is selected or obtained in step S1402. If the device on which the image is selected is moved in some way in step S1404 (e.g., if it is rotated), this will be detected and the image will need to be modified. Rear and front portions of the images may be processed in parallel, in series, in dependence on whether only one perspective is to be taken in account, etc. In certain example embodiments, where a composite ultimately is to be generated, both the rear and front image will be modified. In this regard, the rear and front images will be cropped in steps S1406A-S1406B. Fisheye distortion will be taken into account for the rear and front images in steps S1408A-S1408B. Any other adjustments will be made, and the results will be considered ready for further processing (e.g., in steps S1410A-S1410B). Glazing selection and composite effects may be selected or specified in step S1412. Once this is complete, any further processing may be performed as appropriate to simulate the glazing and/or other effects selected, and the rear and front image results will be ready for display on the screen (e.g., in steps S1414A-S1414B). Glazing filters will be applied based on the selections in steps S1416A-S1416B, and a final composite image will be generated for displayed in step S1418.

What is claimed is:
1. An electronic device, comprising:
a user interface; and
processing resources including at least one processor and a memory, the memory storing a program executable by the processing resources to simulate a view of an image through a plurality of viewer-selected products virtually interposed between a viewer using the electronic device and the image by performing operations comprising:
acquiring the image from a camera operably connected to the electronic device;
facilitating viewer selection of the products in connection with the user interface;
retrieving display properties associated with the viewer-selected products;
generating, for each said viewer-selected product, a filter to be applied to the acquired image based on the retrieved display properties; and
generating, for display via the electronic device, an output image corresponding to the generated filters being applied to the acquired image such that at least a portion of a display screen of the electronic device itself simulates the products so that the viewer can look through the display screen as the user would look through the different products,
wherein no filters are applied to at least one part of the acquired image so that the output image includes an unfiltered area adjacent to filtered areas,
wherein the part of the acquired image to which no filters are applied is provided in a horizontally and vertically central area of the display screen around which the different respective filters are oriented such that each of the different respective filters is directly adjacent to the central area, and
wherein labels corresponding to the different products are provided on the display screen such that the different products are labeled with identifying information and/or optical information related thereto.
2. The electronic device of claim 1, wherein the facilitating viewer selection of the products comprises enabling the viewer to select the products from a plurality of possible preconfigured products.
3. The electronic device of claim 2, wherein the plurality of possible preconfigured products includes at least one coated article, at least one insulating glass (IG) unit, at least one vacuum insulating glass (VIG) unit, and/or at least one laminated product.

4. The electronic device of claim 2, wherein each said possible preconfigured product is specified in terms of its constituent parts, the constituent parts including possible substrate material(s), substrate thickness(es), coating(s), coating placement(s), and/or laminate material(s), as appropriate for the respective possible preconfigured products.

5. The electronic device of claim 1, wherein the facilitating viewer selection of the products comprises enabling the viewer to configure a customized product.

6. The electronic device of claim 1, wherein the display properties are associated with transmission, reflection, and color related optical properties of the viewer-selected products.

7. The electronic device of claim 1, wherein the display properties are calculated, the calculating of the display properties being based at least in part on characteristics of a display device to which the output image is to be provided.

8. The electronic device of claim 1, wherein the program is executable to perform further operations comprising:
detecting relative movement between the electronic device and the viewer; and
responsive to a detection of relative movement between the electronic device and the viewer, generating, for display via the electronic device, an updated output image reflecting the detected relative movement.

9. The electronic device of claim 8, wherein the program is executable to perform further operations comprising responsive to the detection of relative movement between the electronic device and the viewer:
determining whether the retrieved display properties associated with each of the viewer-selected products still apply following the relative movement; and
responsive to a determination that the retrieved display properties associated with at least one of the viewer-selected products no longer apply following the relative movement:
retrieving updated display properties associated with each of the viewer-selected products to which the retrieved display properties no longer apply;
generating, for each said viewer-selected product to which the retrieved display properties no longer apply, an updated filter to be applied to the acquired image based on the retrieved updated display properties; and
generating the updated output image in connection with the updated filter(s).

10. The electronic device of claim 9, wherein the updated display properties are associated with off-axis transmission, reflection, and color related optical properties of the viewer-selected product(s) to which the retrieved display properties no longer apply.

11. The electronic device of claim 8, wherein the relative movement corresponds to a shift of the viewer's gaze.

12. The electronic device of claim 8, wherein the relative movement includes physical movement of the electronic device itself, the electronic device being handheld.

13. The electronic device of claim 1, wherein the display properties correspond to different optical properties for the associated viewer-selected products.

14. An electronic device, comprising:
a user interface; and
processing resources including at least one processor and a memory, the memory storing a program executable by the processing resources to simulate a view of an image through a plurality of different viewer-selected products that are virtually interposed between a viewer using the electronic device and the image by performing operations comprising:
acquiring the image from a store of pre-stored images in response to a viewer-selection made in connection with the user interface;
facilitating viewer selection of the products in connection with the user interface;
retrieving display properties associated with each of the viewer-selected products;
generating, for each said viewer-selected product, a filter to be applied to the acquired image based on the retrieved display properties; and
generating, for display via the electronic device, an output image corresponding to the generated filters being applied to the acquired image such that at least a portion of a display screen of the electronic device itself simulates the products so that the viewer can look through the display screen as the user would look through the different products,
wherein no filters are applied to at least one part of the acquired image so that the output image includes an unfiltered area adjacent to filtered areas,
wherein the part of the acquired image to which no filters are applied is provided in a horizontally and vertically central area of the display screen around which the different respective filters are oriented such that each of the different respective filters is directly adjacent to the central area, and
wherein labels corresponding to the different products are provided on the display screen such that the different products are labeled with identifying information and/or optical information related thereto.

15. The electronic device of claim 14, wherein the acquired image is a static image or video.

16. The electronic device of claim 14, wherein the display properties correspond to different optical properties for the associated viewer-selected products.

17. A method of simulating a view of an image through a plurality of viewer-selected products virtually interposed between a viewer using an electronic device and the image, the electronic device including processing resources including at least one processor and a memory, the method comprising:
acquiring the image in real-time using the electronic device;
facilitating viewer selection of the products in connection with a user interface running on the electronic device;
retrieving display properties associated with the viewer-selected products;
generating, for each said viewer-selected product, a filter to be applied to the acquired image based on retrieved display properties; and
generating, for display via the electronic device, an output image corresponding to the generated filters being applied to the acquired image so that at least a portion of a display screen of the electronic device itself simulates the products so that the viewer can look through the display screen as the user would look through the different products,
wherein no filters are applied to at least one part of the acquired image so that the output image includes an unfiltered area adjacent to filtered areas,
wherein the part of the acquired image to which no filters are applied is provided in a horizontally and vertically central area of the display screen around which the different respective filters are oriented such that each of the different respective filters is directly adjacent to the central area, and wherein labels corresponding to the different products are provided on the display screen such that the different products are labeled with identifying information and/or optical information related thereto.

18. The method of claim 17, wherein the acquired image is a static image or video.

19. The method of claim 17, wherein the facilitating viewer selection of the products comprises enabling the viewer to select the products from a plurality of possible preconfigured products.

20. The method of claim 19, wherein the plurality of possible preconfigured products includes at least one coated article, at least one insulating glass (IG) unit, at least one vacuum insulating glass (VIG) unit, and/or at least one laminated product.

21. The method of claim 19, wherein each said possible preconfigured product is specified in terms of its constituent parts, the constituent parts including possible substrate material(s), substrate thickness(es), coating(s), coating placement(s), and/or laminate material(s), as appropriate for the respective possible preconfigured products.

22. The method of claim 17, wherein the facilitating viewer selection of the products comprises enabling the viewer to configure a customized product.

23. The method of claim 17, wherein the display properties correspond to optical properties of the viewer-selected products, and
wherein the display properties are associated with transmission, reflection, and color related optical properties of the at least one viewer-selected product.

24. The method of claim 17, wherein the display properties are calculated, the calculating of the display properties being based at least in part on characteristics of a display device to which the output image is to be provided.

25. The method of claim 17, further comprising:
detecting relative movement between the electronic device and the viewer; and
responsive to a detection of relative movement between the electronic device and the viewer, generating, for display via the electronic device, an updated output image reflecting the detected relative movement.

26. The method of claim 25, further comprising responsive to the detection of relative movement between the electronic device and the viewer:
determining whether the retrieved display properties associated with each of the viewer-selected products still apply following the relative movement; and
responsive to a determination that the retrieved display properties associated with at least one of the viewer-selected products no longer apply following the relative movement:

retrieving updated display properties associated with each of the at least viewer-selected products to which the retrieved display properties no longer apply;
generating, for each said viewer-selected product to which the retrieved display properties no longer apply, an updated filter to be applied to the acquired image based on the retrieved updated display properties; and
generating the updated output image in connection with the updated filter(s).

27. The method of claim 25, wherein the updated display properties are associated with off-axis transmission, reflection, and color related optical properties of the viewer-selected product(s) to which the retrieved display properties no longer apply.

28. The method of claim 25, wherein the relative movement includes physical movement of the electronic device itself, the electronic device being handheld.

29. A non-transitory computer readable storage medium tangibly storing a program that, when executed by a processor of a computing device, performs operations for simulating a view of an image through a plurality of viewer-selected products virtually interposed between a viewer using an computing device and the image, the operations comprising:
acquiring the image;
facilitating viewer selection of the products in connection with a user interface running on the computing device;
retrieving display properties associated with the viewer-selected products;
generating, for each said viewer-selected product, a filter to be applied to the acquired image based on retrieved display properties; and
generating, for display via the electronic device, an output image corresponding to the generated filters being applied to the acquired image such that at least a portion of a display screen of the computing device itself simulates the products so that the viewer can look through the display screen as the user would look through the different products,
wherein no filters are applied to at least one part of the acquired image so that the output image includes an unfiltered area adjacent to filtered areas,
wherein the part of the acquired image to which no filters are applied is provided in a horizontally and vertically central area of the display screen around which the different respective filters are oriented such that each of the different respective filters is directly adjacent to the central area, and
wherein labels corresponding to the different products are provided on the display screen such that the different products are labeled with identifying information and/or optical information related thereto.

* * * * *